United States Patent [19]
Machida et al.

[11] Patent Number: 6,121,402
[45] Date of Patent: *Sep. 19, 2000

[54] POLYETHYLENE, THERMOPLASTIC RESIN COMPOSITION CONTAINING SAME, AND PROCESS FOR PREPARING POLYETHYLENE

[75] Inventors: Shuji Machida; Haruo Shikuma; Ayami Hoshino; Yutaka Takakura, all of Sodegaura, Japan

[73] Assignee: Idemitsu Kosan Co., Ltd., Tokyo, Japan

[*] Notice: This patent is subject to a terminal disclaimer.

[21] Appl. No.: 09/045,913

[22] Filed: Mar. 23, 1998

Related U.S. Application Data

[63] Continuation of application No. 08/495,575, filed as application No. PCT/JP94/00168, Feb. 4, 1994, abandoned.

[30] Foreign Application Priority Data

| Feb. 5, 1993 | [JP] | Japan | 5-18977 |
| Feb. 22, 1993 | [JP] | Japan | 5-32021 |
| Aug. 5, 1993 | [JP] | Japan | 5-194972 |
| Sep. 14, 1993 | [JP] | Japan | 5-229200 |
| Oct. 22, 1993 | [JP] | Japan | 5-264789 |

[51] Int. Cl.$^7$ ............................. C08F 110/02
[52] U.S. Cl. ............ 526/352; 526/114; 526/119; 526/126; 526/127; 526/133; 526/134; 526/160; 525/240; 525/338
[58] Field of Search ................... 526/114, 119, 526/160, 352, 126, 127, 133, 134; 525/240, 338

[56] References Cited

U.S. PATENT DOCUMENTS

| 3,432,518 | 3/1969 | Kallenbach | 525/339 |
| 4,935,474 | 6/1990 | Ewen et al. | 526/160 |
| 4,937,299 | 6/1990 | Ewen et al. | 526/160 |
| 5,153,157 | 10/1992 | Hlatky et al. | 526/132 |
| 5,369,196 | 11/1994 | Matsumoto et al. | 526/160 |
| 5,444,134 | 8/1995 | Matsumoto | 526/160 |
| 5,556,928 | 9/1996 | Devore et al. | 526/352 |
| 5,747,620 | 5/1998 | Machida et al. | 526/114 |

FOREIGN PATENT DOCUMENTS

| 93-08221 | 4/1993 | WIPO . |

*Primary Examiner*—Fred Teskin
*Attorney, Agent, or Firm*—Oblon, Spivak, McClelland, Maier & Neustadt, P.C.

[57] ABSTRACT

Polyethylenes are disclosed herein which are derived from an ethylene monomer and in which any quaternary carbon atom is not present in a polymeric main chain; and the activation energy (Ea) of melt flow is in the range of 8 to 20 kcal/mol; as well as (1) a Huggins coefficient (k) and an intrinsic viscosity [η] meet the relation of the equation $$k \geq 0.2 + 0.0743 \times [\eta];$$

(2) a molar ratio [$CH_3/CH_2$] of a methyl group to a methylene group is in a region of 0.005 to 0.1 and meets the equation $$Tm \geq 131 - 1340[CH_3/CH_2];$$

(3) an Mw and a die swell ratio (DR) meet the equation $$DR > 0.5 + 0.125 \times \log Mw; \text{ or}$$

(4) in the measurement of a loss elastic modulus, a β-relaxation peak is present in the range of 0 to −100° C.

These polyethylenes are different from a usual HDPE, L-LDPE and LDPE, and they are excellent in working properties and permit the control of physical properties such as density, a melting point and crystallinity mainly in the state of a homopolymer.

25 Claims, 8 Drawing Sheets

POLYETHYLENE, THERMOPLASTIC RESIN COMPOSITION CONTAINING SAME, AND PROCESS FOR PREPARING POLYETHYLENE

This application is a Continuation of application Ser. No. 08/495,575, filed on Aug. 7, 1995, now abandoned, which was originally filed as International Application No. PCT/JP94/00168, filed on Feb. 4, 1994.

TECHNICAL FIELD

The present invention relates to a novel polyethylene, a thermoplastic resin composition containing the same, and a novel process for preparing the polyethylene. More specifically, the present invention relates to a polyethylene which can be derived from an ethylene monomer alone, is excellent in working properties, and has a good film moldability and blow moldability and in which the control of the activation energy of melt flow is possible and physical properties such as density, a melting point and crystallinity can be controlled mainly in the state of a homopolymer; a thermoplastic resin composition containing this polyethylene; and a process for efficiently preparing the polyethylene in which non-Newtonian properties are improved and which is excellent in working properties.

BACKGROUND ART

Heretofore, with regard to a polyethylene or an ethylene-α-olefin copolymer, its primary structure has been controlled by adjusting molecular weight, a molecular weight distribution or copolymerization properties (random properties, a blocking tendency and a branching degree distribution), or by adding a third component such as a diene so as to introduce branches.

On the other hand, for ethylenic polymers, various molding methods are usable, and typical known examples of the molding methods include injection molding, extrusion, blow molding, inflation, compression molding and vacuum forming. In such molding methods, the impartment of high-speed molding properties and the reduction of molding energy have been investigated for a long period of time in order to improve working properties and to thus lower a working cost, and so it is an important theme that optimum physical properties suitable for each use is imparted and the molding can be carried out with the optimum working properties.

In recent years, it has been elucidated that a uniform metallocene catalyst is excellent in the copolymerization properties between olefins, can obtain a polymer having a narrow molecular weight distribution, and has a much higher catalytic activity as compared with a conventional vanadium catalyst. Therefore, it has been expected that the metallocene catalyst will be developed in various technical fields by the utilization of such characteristics. However, a polyolefin obtained by the use of the metallocene catalyst is poor in molding and working properties, and for this reason, the application of the metallocene catalyst to the blow molding and the inflation is unavoidably limited.

A conventional known low-density polyethylene (LDPE) can be obtained by the high-pressure radical polymerization of ethylene and has both of long-chain branches and short-chain branches. It has been considered that the long-chain branches can be formed by the intermolecular hydrogen transfer reaction between the radical growth terminal of the polymer and the polymer. On the other hand, with regard to the mechanism for forming the short-chain branches, some theories have been reported. For example, a back-biting mechanism has been suggested [J. Am. Chem. Soc., Vol. 75, p. 6110 (1953)]. This suggested theory rationally explains that the butyl branch can be formed by the transfer of hydrogen after the formation of a six-membered intermediate at the growth radical terminal. According to another theory, it has been reported that the butyl branch is formed by the production of an associate of two ethylene molecules under a high pressure and a hydrogen transfer reaction at the radical growth terminal, and an ethyl branch can be introduced owing to the production of 1-butene by the hydrogen transfer reaction in the associate of two ethylene molecules [Makromol. Chem. Vol. 181, p. 2811 (1981)]. According to still another theory, it has been reported that the formation of the ethyl branch is accomplished by the transfer of hydrogen from the main chain of the polymer to an ethyl branch radical [J. Polym. Sci., Vol. 34, p. 569 (1959)].

As understood from the foregoing, it can be summarized that the formation of the long-chain branches and the short-chain branches in the low-density polyethylene is carried out by (1) the hydrogen transfer reaction based on a radical polymerization and (2) the change of radical polymerization reactivity by the association of ethylene molecules under a high pressure, and this is a usually recognized reaction mechanism. Therefore, in the above-mentioned reaction process, it is impossible to optionally control the amounts of the existing long-chain branches and short-chain branches as well as the number of carbon atoms in the short-chain branches. In particular, there have been limited the introduction and control of a methyl branch, a propyl branch, a hexyl branch and a short-chain branch derived from a branched α-olefin (e.g., a 4-methylpentene-1 branch).

Such a low-density polyethylene has a large melt tension and the large activation energy of melt flow by virtue of the long-chain branches, and therefore it is excellent in high-speed molding properties and suitable for the formation of films. However, since having a wide molecular weight distribution and containing a low-molecular weight component, the low-density polyethylene is inconveniently poor in environmental stress crack resistance (ESCR) and impact resistance.

On the other hand, various ethylenic polymers have been disclosed in which the long-chain branches are introduced into a high-density polyethylene skeleton. For example, there have been disclosed (1) an olefin copolymer having the long-chain branches obtained by the use of an α,ω-diene or a cyclic endomethylenic diene (Japanese Patent Application Laid-open No. 34981/1972), (2) a process for preparing a copolymer containing a higher non-conjugated diene content in a high-molecular weight segment than in a low-molecular weight segment which comprises carrying out polymerization in two steps to copolymerize the non-conjugated diene with an olefin (Japanese Patent Application Laid-open No. 56412/1984), (3) an ethylene-α-olefin-1,5-hexadiene copolymer obtained by the use of a metallocene/aluminoxane catalyst (Japanese Patent Application PCT-through Laid-open No. 501555/1989), (4) a process for introducing the long-chain branches by copolymerizing an α,ω-diene and ethylene in the presence of a catalyst comprising a zero-valent or a divalent nickel compound and a specific aminobis(imino) compound (Japanese Patent Application Laid-open No. 261809/1990), and (5) a polyethylene containing both of the short-chain branches and the long-chain branches which can be obtained by polymerizing ethylene alone by the use of the same catalytic component as in the above-mentioned (4) (Japanese Patent Application Laid-open No. 277610/1991).

However, in the copolymer of the above-mentioned (1), a crosslinking reaction takes place simultaneously with the formation of the long-chain branches by the diene component, and at the time of the formation of a film, a gel is generated. In addition, melt properties inversely deteriorate, and a control range is extremely narrow. Moreover, there is a problem that copolymerization reactivity is low, so that low-molecular weight polymers are produced, which leads to the deterioration of physical properties inconveniently. In the preparation process of the copolymer described in the aforesaid (2), the long-chain branches are introduced into the high-molecular weight component, so that the molecular weight noticeably increases due to crosslinking, and thus insolubilization, nonfusion or gelation might inconveniently occur. Furthermore, the control range is narrow, and the copolymerization reactivity is also low, and hence, there is a problem that owing to the production of the low-molecular weight polymers, the physical properties deteriorate inconveniently. In the copolymer of the above-mentioned (3), a molecular weight distribution is narrow, and for this reason, the copolymer is unsuitable for blow molding and film formation. In addition, since branch points are formed by the progress of the cyclizing reaction of 1,5-hexadiene, an effective monomer concentration is inconveniently low. In the process for introducing the long-chain branches described in the above-mentioned (4), there is a problem that a range for controlling the generation of a gel and the physical properties is limited. In addition, the polyethylene of the above-mentioned (5) is a polymer which contains neither ethyl branches nor butyl branches, and therefore the control of the physical properties, for example, the control of density is accomplished by methyl branches, so that the physical properties of the polyethylene tend to deteriorate.

Furthermore, there has been disclosed a method for preparing an ethylenic polymer to which working properties are imparted by the utilization of copolymerization, for example, a method which comprises forming a polymer ($[\eta]$=10–20 dl/g) by preliminary polymerization, and then preparing an ethylene-$\alpha$-olefin copolymer by main polymerization (Japanese Patent Application Laid-open No. 55410/1992). This method has an effect that melt tension can be increased by changing the melt properties of the obtained copolymer, but it has a drawback that a film gel tends to occur.

In addition, there have been disclosed ethylenic polymers obtained in the presence of a metallocene catalyst and methods for preparing the same, for example, (1) a method for preparing an ethylenic polymer in the presence of a constrained geometrical catalyst and an ethylenic copolymer obtained by this method (Japanese Patent Application Laid-open No. 163088/1991 and WO93/08221), (2) a method for preparing a polyolefin in the presence of a metallocene catalyst containing a porous inorganic oxide (an aluminum compound) as a carrier (Japanese Patent Application Laid-open No. 100808/1992), and (3) an ethylene-$\alpha$-olefin copolymer which can be derived from ethylene and the $\alpha$-olefin in the presence of a specific hafnium catalyst and which has a narrow molecular weight distribution and improved melt flow properties (Japanese Patent Application Laid-open No. 276807/1990).

However, in the technique of the above-mentioned (1), the control of density and the like can be accomplished by introducing an $\alpha$-olefin unit into an ethylene chain, and the resultant product is a substantially linear polymer. According to the preparation method of the above-mentioned (2), the obtained copolymer of ethylene and the $\alpha$-olefin has a large die swell ratio, but in view of the relation of the die swell ratio to the melting point of the ethylene-1-butene copolymer, it is apparent that the die swell ratio deteriorates with the rise of the melting point. Therefore, any copolymer cannot be provided in which the die swell ratio regarding a neck-in which is a trouble at the time of the formation of a film or a sheet is controllable in a wide melting point range.

On the other hand, the copolymer disclosed in the above-mentioned (3) contains an $\alpha$-olefin unit as an essential unit, and it does not cover a copolymer having a resin density of more than 0.92 g/cm$^3$. Furthermore, in the above-mentioned (1) and (3), when the branches are introduced, the melting point and the mechanical strength of the ethylene-$\alpha$-olefin copolymer noticeably deteriorate.

DISCLOSURE OF THE INVENTION

Under such circumstances, the present invention has been intended. An object of the present invention is to provide a novel polyethylene which can be derived from ethylene monomer alone, can control the activation energy of melt flow, is excellent in working properties, has good film moldability and blow moldability, can control physical properties such as density, a melting point and crystallinity mainly in the state of a homopolymer, has a higher melting point as compared under conditions of the same density, and is different from a usual high-density polyethylene (HDPE) as well as an ethylene-$\alpha$-olefin copolymers and a low-density polyethylene (LDPE) disclosed in the above-mentioned Japanese Patent Application Laid-open No. 163088/1991, WO93/08221 and Japanese Patent Application Laid-open No. 276809/1990.

The present inventors have intensively researched to achieve the above-mentioned object, and as a result, it has been found that a polyethylene derived from an ethylene monomer alone is fit for the accomplishment of the object. That is to say, this kind of polyethylene has a polymeric main chain containing no quaternary carbon and the activation energy (Ea) of melt flow in a specific range. Furthermore, in the polyethylene of the present invention, (1) a Huggins coefficient and an intrinsic viscosity stand in a specific relation to each other; (2) a molar ratio [$CH_3/CH_2$] of a methyl group and a methylene group present in a molecular chain is within a specific range, and this molar ratio and a melting point (Tm) meet a specific relative equation; (3) a weight-average molecular weight (Mw) and a die swell ratio (DR) meet a specific relative equation; or (4) in the measurement of a loss elastic modulus, a $\beta$-relaxation peak is present in the range of 0 to $-100°$ C. In addition, it has been found that when a specific catalyst for polymerization is used, the activation energy of melt flow and the relation between the Huggins coefficient and the intrinsic viscosity can be controlled to effectively obtain the polyethylene having improved non-Newtonian properties and excellent working properties. In consequence, the present invention has been completed on the basis of such a knowledge.

That is to say, according to the present invention, there can be provided:

(1) A polyethylene [1] which is derived from an ethylene monomer and in which (1) any quaternary carbon atom is not present in a polymeric main chain; (2) the activation energy (Ea) of melt flow is in the range of 8 to 20 kcal/mol; and (3) a Huggins coefficient (k) and an intrinsic viscosity [η] which are decided by the relation between a polymer concentration and a reduced viscosity measured at a temperature of 135° C. in a decalin solvent meet the relation of the equation $$k \geq 0.2 + 0.0743 \times [\eta].$$

(2) A polyethylene [2] which is derived from an ethylene monomer and in which (1) any quaternary carbon atom is not present in a polymeric main chain; (2) the activation energy (Ea) of melt flow is in the range of 8 to 20 kcal/mol; and (3) a molar ratio [$CH_3/CH_2$] of a methyl group in a region of 0.8 to 1.0 ppm to a methylene group in a region of 1.2 to 1.4 ppm observed by a proton nuclear magnetic resonance spectrum method ($^1$H-NMR) is in the range of 0.005 to 0.1, and a melting point (Tm) and the molar ratio [$CH_3/CH_2$] observed by a differential scanning calorimeter (DSC) meet the equation $$Tm \geq 131 - 1340[CH_3/CH_2].$$

(3) A polyethylene [3] which is derived from an ethylene monomer and in which (1) any quaternary carbon atom is not present in a polymeric main chain; (2) the activation energy (Ea) of melt flow is in the range of 8 to 20 kcal/mol; and (3) the relation between a weight-average molecular weight (Mw) in terms of the polyethylene measured by a gel permeation chromatography method and a die swell ratio (DR) meet the equation $$DR > 0.5 + 0.125 \times \log Mw.$$

(4) A polyethylene [4] which is derived from an ethylene monomer and in which (1) any quaternary carbon atom is not present in a polymeric main chain; (2) the activation energy (Ea) of melt flow is in the range of 8 to 20 kcal/mol; and (3) in the measurement of a loss elastic modulus, a β-relaxation peak is present in the range of 0 to −100° C.

Moreover, according to the present invention, there can be provided a polyethylene obtained by subjecting any one of the above-mentioned polyethylenes to a hydrogenation treatment, and a thermoplastic resin composition comprising any one of these polyethylenes.

In addition, according to the present invention, there can be provided a process for preparing a polyethylene which comprises the step of homopolymerizing ethylene in the presence of a catalyst comprising (a) a transition metal compound in which the relation between a monomer charge composition [a molar ratio [M] of 1-octene/(ethylene+1-octene)] and the product of a crystallization enthalpy (ΔH) and a melting point (Tm) of a produced copolymer meets the equation $$0 \leq \Delta H \cdot Tm \leq 27000 - 21600[M]^{0.56}$$

(under polymerization conditions using the component (a) together with an aluminoxane), (b) a transition metal compound capable of forming a terminal vinyl group in the homopolymerization of ethylene (under polymerization conditions using the component (b) together with the aluminoxane), and (c) a compound capable of forming an ionic complex from the above-mentioned components (a) and (b) or their derivatives (the transition metal compounds of the above-mentioned components (a) and (b) are compounds containing metals in the groups 3 to 10 or a lanthanide series of the periodic table.

BEST MODE FOR CARRYING OUT THE INVENTION

Figure 1:
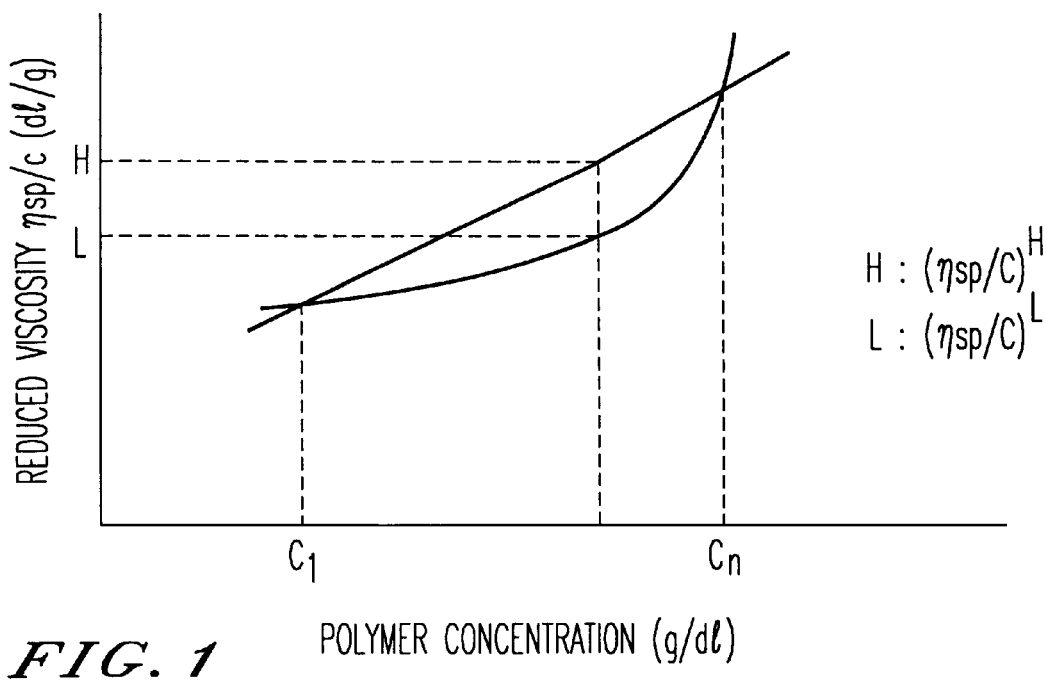
FIG. 1 is a graph for judging whether or not a polymer concentration and a reduced viscosity stand in a linear relation to each other.

A polyethylene of the present invention is different from a usual HDPE, L-LDPE (a linear low-density polyethylene) and LDPE (a high-pressure method), and some differences can be judged by (A) the evaluation of a primary structure and (B) the evaluation of physical properties which will be described hereinafter.

(A) Judgment by evaluation of primary structure (1) Comparison with HDPE, L-LDPE and LDPE According to the measurement of $^{13}$C-nuclear magnetic resonance spectra, it is apparent that the polyethylene of the present invention is different from the HDPE, L-LDPE and LDPE in structure.

(a) Comparison with HDPE (a relatively low-molecular weight polymer)

The terminal structure of a usual HDPE (a relatively low-molecular weight polymer) is represented by $$\underset{C}{-CH_2} - \underset{D}{CH_2} - \underset{B}{CH_2} - \underset{A}{CH_3}$$

A=13.99, B=22.84, C=30.00, and D=32.18 (unit=ppm) (A, B and D are minute peaks)
and any peak based on a branch is not present.

(b) Comparison with ethylene-α-olefin copolymers (Ethylene-1-butene copolymer)

The ethylene-1-butene copolymer has a structure represented by $$\underset{D}{-CH_2} - \underset{E}{CH_2} - \underset{C}{CH_2} - \underset{F}{CH_2} - \underset{G}{CH} - CH_2 - \\ \underset{B}{|} \\ \underset{B}{CH_2} - \underset{A}{CH_3}$$

A=11.14, B=26.75, C=27.35, D=30.00, E=30.49, F=34.11, and G=39.75 (unit=ppm)
as a structure in the vicinity of a branch point.

(Ethylene-1-hexene copolymer)

The ethylene-1-butene copolymer has a structure represented by

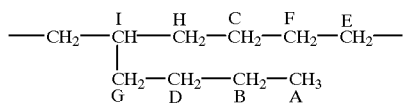

A=14.08, B=23.36, C=27.33, D=29.57, E=30.00, F=30.51, G=34.22, H=34.61, and I: 38.23 (unit=ppm) as a structure in the vicinity of the branch point.

(Ethylene-4-methylpentene-1 copolymer)

The ethylene-4-methylpentene-1 copolymer has a structure represented by

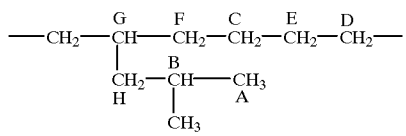

A=23.27, B=26.05, C=27.14, D=30.00, E=30.51, F=34.88, G=36.03, and H=44.83 (unit=ppm) as a structure in the vicinity of the branch point.

(Ethylene-1-octene copolymer)

The ethylene-1-octene copolymer has a structure represented by

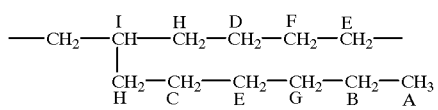

A=14.02, B=22.88, C=27.28, D=27.33, E=30.00, F=30.51, G=32.20, H=34.59, and I=38.25 (unit=ppm) as a structure in the vicinity of the branch point.

(Ethylene-propylene copolymer)

The ethylene-propylene copolymer has a structure represented by

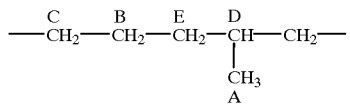

A=19.98, B=27.47, C=30.00, D=33.31, and E=37.59 (unit=ppm) as a structure in the vicinity of the branch point.

In each of the above-mentioned ethylene-α-olefin copolymers, a short-chain branch derived from the α-olefin is present, but any long-chain branch is not present.

(c) Comparison with LDPE

The $^{13}$C-NMR spectrum of the LDPE is complex, and it indicates that short-chain branches (ethyl and butyl branches) and long-chain branches (at least a hexyl branch and the like) are present in the LDPE. Furthermore, the LDPE is considered to mainly have the following structures (C-1) to (C-5) in the vicinity of the branches.

(C-1) Isolated branch (Bn)

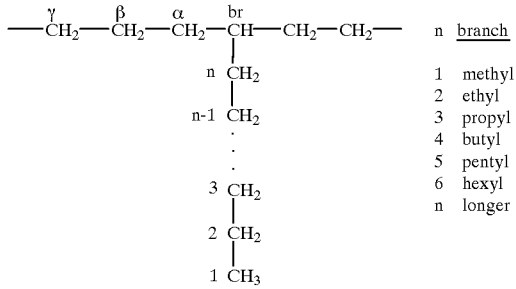

[xBn] (n=1, 2, 3 . . . , n)
(x=1, 2, 3 . . . , n, α, β, γ . . . )

(C-2) Ethyl-ethyl (1,3) branch bonded to a quaternary carbon (peq)

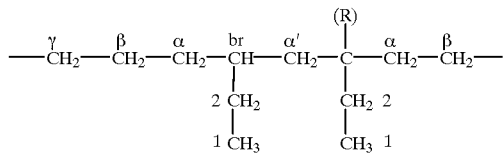

[(xB$_2$)$_{peq}$, (XB'$_2$)$_{peq}$]

(C-3) Isolated ethyl-ethyl (1,3) branch (pee)

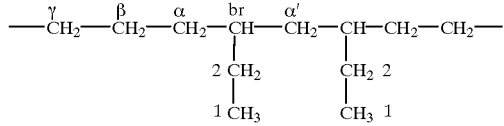

[(xB$_2$)$_{pee}$]

(C-4) Isolated ethyl-propyl (1,3) branch (pep)

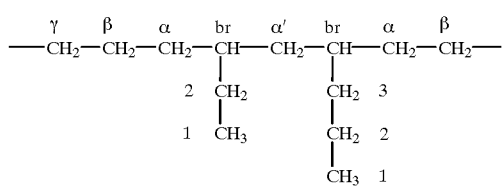

[(xB$_2$)$_{pep}$, (xB$_3$)$_{pep}$]

(C-5) Isolated methyl-ethyl (1,4) branch (pme)

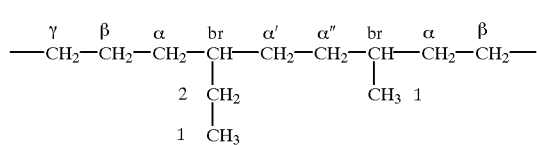

[(xB$_2$)$_{pme}$, (xB$_1$)$_{pme}$]

The LDPE is considered to mainly have the structures of the above-mentioned (C-1) to (C-5), and these structures have been identified [Macromolecules, Vol. 17, p. 1756 (1984)].

According to this literature, the identification has been made as shown in FIG. 1, and the presence of the long-chain branch (32.18 ppm) of at least a hexyl branch and an ethyl branch has been confirmed.

TABLE 1

| No. | Chemical Shift | Assignment |
|---|---|---|
| 1 | 42.86 | |
| 2 | 39.75 | $brB_2$ |
| 3 | 39.19 | |
| 4 | 38.23 | $brB_{4-n}$ |
| 5 | 37.38 | $(brB_2)_{pee}$ |
| 6 | 35.99 | |
| 7 | 35.00 | |
| 8 | 34.61 | $\alpha B_{4-n}$ |
| 9 | 34.22 | $4B_4$ |
| 10 | 32.70 | $3B_5$ |
| 11 | 32.18 | $3B_n$ |
| 12 | 30.00 | $CH_2$ Main Chain |
| 13 | 27.33 | $\beta B_{4-n}$ |
| 14 | 25.99 | $\beta B'_2$ |
| 15 | 24.36 | $\beta$-$CH_2$ (bonded to carbonyl group) |
| 16 | 23.36 | $2B_4$ |
| 17 | 22.88 | $2B_4$ |
|  | 22.84 | $2B_{6-n}$ |
| 18 | 20.15 | $2B_3$ |
|  | 20.04 | $1B_1$ |
| 19 | 14.59 | $1B_3$ |
| 20 | 14.08 | $1B_4$ |
|  | 14.02 | $1B_{5-n}$ |
| 21 | 11.22 | $1B_2$ or |
|  | 11.01 | |
|  | 10.85 | $(1B_2)_{pee}$ |
| 22 | 8.15 | $1B'_2$ |
|  | 7.87 | |

(2) Trial of presence confirmation of long-chain branch by $^{13}$C-nuclear magnetic resonance spectrum There has been suggested a technique which confirms the presence of the hexyl branch and determines the hexyl branch by comparison with an ethylene-1-octene copolymer having the hexyl branch [Macromolecules, Vol. 14, p. 215 (1981), and the same, Vol. 17, p. 1756 (1984)]. According to these magazines, it has been elucidated from the measurement of the $^{13}$C-nuclear magnetic resonance spectrum of a blend with the LDPE that a peak observed at about 27.3 ppm is different from a peak observed in the case of the ethylene-1-octene copolymer. Furthermore, in normal $C_{36}H_{74}$ which is used as a model substance of the long-chain branch, the third carbon signal from its terminal appears at 32.18 ppm. On the other hand, the third carbon signal from the terminal of the hexyl branch of the ethylene-1-octene copolymer appears at 32.22 ppm. In order to utilize a fact that the presence of the long-chain branch has an influence on a chemical shift, when the ethylene-1-octene copolymer is blended with the LDPE having the long-chain branch and a $^{13}$C-nuclear magnetic resonance spectrum is then measured, two peaks appear, whereby the long-chain branch of the LDPE can be identified and determined.

By such techniques, it can be confirmed that the LDPE has the long-chain branch.

(B) Judgment by evaluation of physical properties (1) Judgment by analysis of melt It is known that the long-chain branch is concerned with the fluid behavior of a melt viscosity, viscoelastic properties and the like of a melt, and it has a serious influence on mechanical properties such as workability, optical properties and environmental stress-crack resistance of a resin. Therefore, by measuring and evaluating them, the presence of the long-chain branch can be indirectly confirmed.

Furthermore, as reasons for supporting the presence of the long-chain branch, there are the following facts. The relation between the MI and the Mw of the LDPE deviates from the relation in the case of a straight-chain polyethylene (HDPE), as the number of the long-chain branches increases. That is to say, the LDPE shows the smaller MI on condition that the Mw is the same. In addition, by an Instron type capillary rheometer, the fluid characteristics can be inspected, and a shift factor can be then utilized to determine the activation energy (Ea) of the HDPE. Such a measured activation energy (Ea) of the HDPE is as small as 6 kcal/mol, and on the other hand, the Ea of the LDPE is as large as about 12 kcal/mol. In consequence, it can be confirmed that the fluid characteristics are affected by the long-chain branches.

(2) Discrimination by analysis of polymer solution (a) Judgment by Huggins coefficient It is known that among a reduced viscosity $\eta_{sp}/c$ (dl/g), an intrinsic viscosity $[\eta]$ (dl/g), a Huggins coefficient k and a polymer concentration c (g/dl), the relation of the general equation (a Huggins' equation)

$$\eta_{sp}/c=[\eta]+k[\eta]^2 c$$

can be established. The Huggins coefficient k is a value which denotes the intermolecular interaction of a polymer in a dilute solution state, and so this coefficient k is considered to be affected by the molecular weight of the polymer, a molecular weight distribution and the presence of the branch.

It has been elucidated that when the branch is introduced into a polymer structure, the Huggins coefficient increases in the case of a styrene-divinylbenzene copolymer [J. Polymer Sci., Vol. 9, p. 265 (1952)]. Furthermore, it has also been disclosed that the Huggins coefficient of the LDPE having the long-chain branch is larger than that of the straight-chain HDPE [Polymer Hand-book, published by John Wiley Sons, (1975)].

(b) Judgment by relation between intrinsic viscosity $[\eta]$ and molecular weight measured by gel permeation chromatography method or light-scattering method It is known that the relation between the intrinsic viscosity $[\eta]$ determined in a dilute polyethylene solution by the use of the above-mentioned Huggins' equation and the molecular weight measured by the gel permeation chromatography (GPC) method for determining the molecular weight in accordance with the size of a solute polymer or the light-scattering method can reflect the branch structure of the polymer. For example, the straight-chain HDPE is different from the LDPE having the long-chain branch in the relation between the intrinsic viscosity and the molecular weight measured by the GPC method, and it has been elucidated that when comparison is made on the condition that the intrinsic viscosity is constant, the molecular weight of the LDPE is smaller than that of the HDPE.

Next, reference will be made to characteristics of the polyethylene of the present invention.

In each of the polyethylenes [1] to [4] of the present invention, it is necessary that any quaternary carbon atom should not be present in a polymeric main chain and the activation energy (Ea) of melt flow should be in the range of 8 to 20 kcal/mol, preferably 8.5 to 19 kcal/mol, more preferably 9 to 18 kcal/mol. If the activation energy (Ea) is less than 8 kcal/mol, sufficient working properties cannot be obtained. Here, the activation energy (Ea) is a value obtained in the following manner. First, frequency dependences ($10^{-2}$ to $10^2$ rad/sec) of dynamic viscoelastic properties are measured at temperatures of 150° C., 170° C., 190° C., 210° C. and 230° C., and the activation energy (Ea) is then calculated on the basis of the shift factors of G', G" at the respective temperatures and the reciprocal number of an absolute temperature in accordance with the Arrhenius' equation by the use of a temperature-time conversion rule at a standard temperature of 170° C.

Furthermore, the polyethylenes [1] to [4] of the present invention can meet the above-mentioned requirements and have the following characteristics.

That is to say, in the polyethylene [1], the Huggins coefficient (k) and the intrinsic viscosity [η] which are decided by the relation between the polymer concentration and the reduced viscosity measured at a temperature of 135° C. in a decalin solvent is required to meet the relation of the equation $$k \geq 0.2 + 0.0743 \times [\eta],$$

preferably, $$20 \geq k \geq 0.2 + 0.0743 \times [\eta],$$

more preferably, $$15 \geq k \geq 0.22 + 0.0743 \times [\eta],$$

most preferably, $$10 \geq k \geq 0.24 + 0.0743 \times [\eta].$$

The preferable typical range of this Huggins coefficient (k) is $5 \geq k \geq 0.41$.

The above-mentioned Huggins coefficient (k) shows a different behavior sometimes in the case that the intrinsic viscosity [η] is extremely large, but the polyethylene [1] of the present invention can also be specified by the following ratio between the Huggins coefficients. That is to say, if the straight-chain high-density polyethylene and the polyethylene [1] of the present invention have the same intrinsic viscosity [η] measured at 135° C. in the decalin solvent, the polyethylene [1] has a ratio k/k' of their Huggins coefficients in the range of 1.05 to 5.0 wherein k is the Huggins coefficient of the polyethylene [1] of the present invention and k' is the Huggins coefficient of the straight-chain high-density polyethylene.

This ratio k/k' can meet a relation of, preferably $$1.07 \leq k/k' \leq 4.0$$

more preferably $$1.08 \leq k/k' \leq 3.7$$

further preferably $$1.10 \leq k/k' \leq 3.6$$

most preferably $$1.13 \leq k/k' \leq 3.4.$$

The intrinsic viscosity [η] and the Huggins coefficient k in the above-mentioned relation equations can be obtained as follows.

That is to say, it is known that among the reduced viscosity ηsp/c (dl/g), the intrinsic viscosity [η] (dl/g), the Huggins coefficient k and the polymer concentration c (g/dl), the relation of the Huggins' equation $$\eta_{sp}/c = [\eta] + k[\eta]^2 c$$

can be established. In the first place, the reduced viscosity ηsp/c is measured in the decalin solvent at a polymer concentration of 2.0 g/dl or less at a measuring temperature of 135° C.±0.01° C. at 5 or more measuring points at an interval of a substantially constant polymer concentration by the use of a Ubbelohde's viscometer. A measurement accuracy is such that a relative viscosity is 1.1 or more and an error of the relative viscosity is ±0.04% or less at each measuring point, and the measurement is carried out 5 times or more every polymer concentration. Furthermore, it is necessary that the polymer concentration at the measuring point on the side of the lowest concentration should be 45% or less of the polymer concentration at the measuring point on the side of the highest concentration.

Next, (1) the relation between the reduced viscosity and the polymer concentration is represented by a straight line in accordance with the method of least squares, and the intrinsic viscosity [η] is then calculated. Alternatively, (2) the intrinsic viscosity [η] can also be obtained by using the above-mentioned Huggins' equation, the Kraemer's equation $$\ln \eta_{rel}/c = [\eta] + k_2[\eta]^2 c$$

and the Schulz-Blashke's equation $$\eta_{sp}/c = [\eta] + k_3[\eta]\eta_{sp}$$

(wherein $\eta_{rel}$ is a relative viscosity; $\eta_{sp}$ is a specific viscosity; $k_2$ and $k_3$ are constants; ln denotes a natural logarithm; and the others are as defined in the case of the Huggins' equation), to extrapolate the polymer concentration or the specific viscosity. Furthermore, after it has been confirmed that the intrinsic viscosities [η] obtained by the above-mentioned three methods are coincident with each other, the Huggins coefficient can be calculated on the basis of an average value of these intrinsic viscosities and the Huggins' equation in accordance with the above-mentioned method (1).

In both of the above-mentioned methods (1) and (2), the decision of the Huggins coefficient is possible only when the relation between the reduced viscosity and the polymer concentration definitely is in a linear relation. When the polymer concentration is high or the molecular weight of the polymer is large, the linear relation is not obtained, and therefore it is necessary that after the decrease in the polymer concentration, the measurement should be made again. However, if the polymer concentration is extremely low, a region in which the reduced viscosity does not depend upon the polymer concentration and a region in which the reduced viscosity increases with the decrease in the polymer concentration might be present, and in these regions, the Huggins coefficient cannot be calculated.

Moreover, if the measuring point is present apparently below a straight line depicted by connecting a measuring point ($C_n$) at the highest concentration to a measuring point ($C_1$) at the lowest concentration, in this region, the Huggins coefficient cannot be calculated. However, this does not apply, as far as the following conditions are met. That is to say, it can be judged in the following manner whether or not the linear relation is established. In FIG. 1, the measuring point ($C_n$) at the highest concentration is first connected to the measuring point ($C_1$) at the lowest concentration with a straight line. Then, the respective measuring points are connected to each other with a smooth curve. Here, a most separate distance between the straight line and the curve ($[\eta_{sp}/c]^H - [\eta_{sp}/c]^L$) is calculated, and if $([\eta_{sp}/c]^H - [\eta_{sp}/c]^L)/[C_n - C_1]$ is 0.001 or less, it can be judged that the linear relation is established.

This polyethylene [1] usually is neither indissoluble nor infusible in a broad density range, and hence any gel is not contained, so that the polyethylene [1] is dissolved in decalin at a temperature of 135° C. Furthermore, the polyethylene [1] exerts a good solubility in aromatic hydrocarbons (tetrachlorobenzene and the like) and high-boiling hydrocarbons other than decalin, usually when heated. In the LDPE obtained by high-pressure radical polymerization, the formation of the gel is partially observed in view of its production mechanism.

The polyethylene [1] usually does not contain at least any ethyl branch as the branch, and so it is different from the LDPE obtained by the high-pressure method. In addition, the polyethylene [1] is also different from a conventional polyethylene in that it has the butyl branch.

Furthermore, the melting point (Tm) of the polyethylene [1] which can be observed by a differential scanning calorimeter (DSC) is usually in the range of 116 to 132° C., preferably 116 to 131.5° C., more preferably 117 to 131° C., and the crystallization enthalpy (ΔH) and the melting point (Tm) of the polyethylene [1] which can be observed by the DSC usually meet the equation $$0 \leq \Delta H \leq 250$$

and the equation $$0.02 \times \Delta H + 116 < Tm < 0.02 \times \Delta H + 126$$

preferably $$0.02 \times \Delta H + 117 < Tm < 0.02 \times \Delta H + 125$$

more preferably $$0.02 \times \Delta H + 118 < Tm < 0.02 \times \Delta H + 124.$$

The polyethylene [1] is a polymer which has a relatively high melting point but in which the crystallization enthalpy noticeably changes, and it can exert characteristics as a high-melting and low-crystalline elastomer in the category of an ethylenic polymer. Here, the crystallization enthalpy is a value obtained from an exothermic peak of crystallization observed at a time when a pressed sheet formed at a temperature of 190° C. by the use of the DSC (DSC7 model, made by Perkin Elmer Co., Ltd.) is molten at a temperature of 150° C. for 5 minutes and then cooled to −50° C. at a rate of 10° C./min. On the other hand, the melting point is a value obtained from a temperature at the maximum peak position of an endothermic peak of fusion at the time of temperature rise at a rate of 10° C./min.

In the polyethylene [2] of the present invention, a molar ratio [$CH_3/CH_2$] of a methyl group in a region of 0.8 to 1.0 ppm to a methylene group in a region of 1.2 to 1.4 ppm obtained by a proton nuclear magnetic resonance spectrum method ($^1$H-NMR) is in the range of 0.005 to 0.1, and it is necessary that the melting point (Tm) and [$CH_3/CH_2$] observed by the differential scanning calorimeter (DSC) should meet the equation $$Tm \geq 131 - 1340[CH_3/CH_2]$$

preferably $$Tm \geq 131 - 1230[CH_3/CH_2]$$

more preferably $$Tm \geq 131 - 1120[CH_3/CH_2].$$

Here, [$CH_3/CH_2$] can be decided by a known technique. That is to say, if an integrated value of a peak present in a region of 0.8 to 1.0 ppm is regarded as A and an integrated value of a peak present in a region of 1.2 to 1.4 ppm is regarded as B, [$CH_3/CH_2$] can be represented as [A/3]/[B/2]. On the other hand, the melting point is usually 135° C. or less.

The melting point (Tm) is a value obtained from a temperature at the maximum peak position of an endothermic peak of fusion at a time when the pressed sheet formed at a temperature of 190° C. by the use of the DSC (DSC7 model, made by Perkin Elmer Co., Ltd.) is molten at a temperature of 150° C. for 5 minutes, cooled to −50° C. at a rate of 10° C./min, and then heated at a rate of 10° C./min. In the polyethylene [2] of the present invention, a branched α-olefin having 5 to 20 carbon atoms, for example, the short-chain branch derived from 3-methylbutene-1 or 4-methylpentene-1 is not present. In obtaining an ethylene-α-olefin copolymer by a known polymerization method, if the conversion of the α-olefin into the polymer is noticeably improved by the use of a batch polymerizer, the ethylene-α-olefin copolymer and a high-density polyethylene are produced, so that the relation between the melting point and [$CH_3/CH_2$] might apparently deviate from each other. However, this is a mixture of different kinds of polymers, which is not intended by the present invention.

In the polyethylene [3] of the present invention, it is necessary that a weight-average molecular weight (Mw) in terms of the polyethylene measured by the gel permeation chromatography method and a die swell ratio (DR) meet the equation $$DR > 0.5 + 0.125 \times \log Mw,$$

preferably $$1.60 > DR > 0.36 + 0.159 \times \log Mw,$$

more preferably $$1.55 > DR > 0.16 + 0.21 \times \log Mw,$$

best preferably $$1.50 > DR > -0.11 + 0.279 \times \log Mw.$$

Here, the die swell ratio (DR) is a value ($D_1/D_0$) obtained by measuring a diameter ($D_1$, mm) of a strand formed by extrusion through a capillary nozzle [diameter ($D_0$)=1.275 mm, length (L)=51.03 mm, L/$D_0$=40, and entrance angle=90°] at an extrusion speed of 1.5 mm/min (shear rate=10 sec$^{-1}$) at a temperature of 190° C. by the use of a capillograph made by Toyo Seiki Seisakusho Co., Ltd., and then dividing this diameter by the diameter of the capillary nozzle.

The above-mentioned diameter ($D_1$) of the strand is an average value of values obtained by measuring long axes and short axes of central portions of 5 samples having a extruded strand length of 5 cm (a length of 5 cm from a nozzle outlet).

On the other hand, the polyethylene [4] of the present invention has a β-relaxation peak in the range of 0 to −100°

Figure 2:
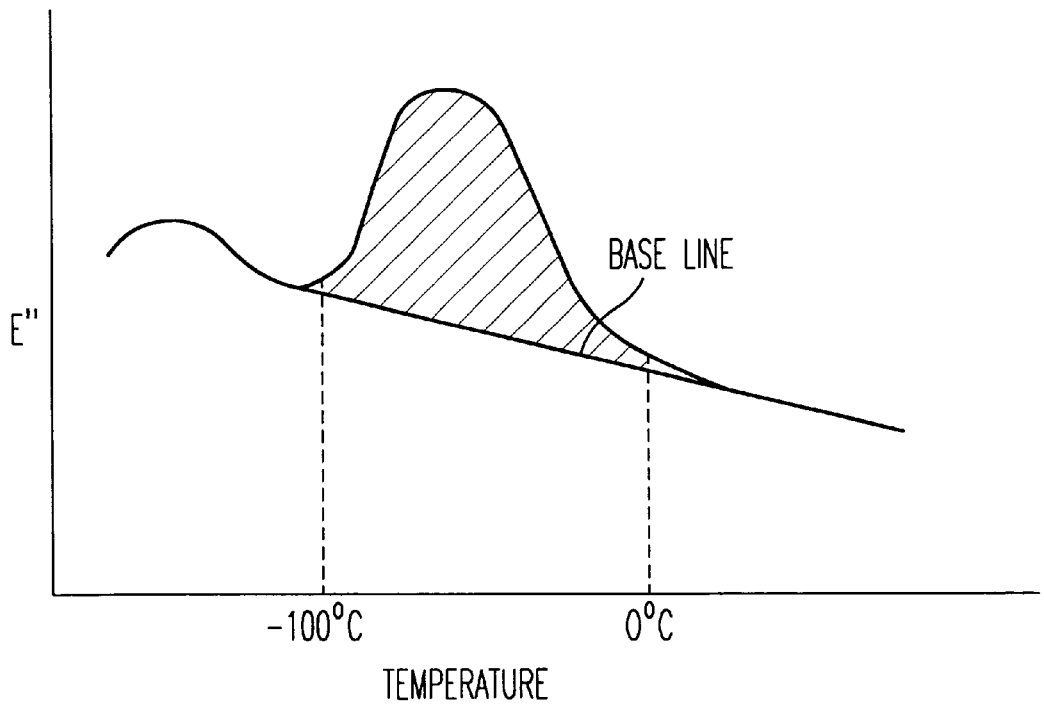
FIG. 2 is an illustrative view for calculating the area of a β-relaxation peak of a polyethylene.

C., preferably 5 to −70° C. in the measurement of a loss elastic modulus. The β-relaxation peak (area) as the index of a β-relaxation peak intensity is obtained as follows. In the first place, a temperature dispersion (in a temperature range of −150 to 200° C.) of solid viscoelasticity is measured at a frequency of 1 Hz in a strain quantity of 0.15% by the use of an RSA-II model made by Leometric Co., Ltd., and a storage elastic modulus (E'), a loss elastic modulus (E") and a dissipation ratio (tanδ) are then calculated on the basis of the temperature dispersion of the solid viscoelasticity. Next, the β-relaxation peak of the loss elastic modulus (E") in the temperature dispersion behavior of the calculated solid viscoelasticity is read by a digitizer, and its area is then calculated by a graphic measurement program (MEAS1). For the calculation of the area of the β-relaxation peak, as shown in FIG. 2, a base line is decided in a temperature range of −100 to 0° C. As a sample to be measured, a film having a thickness of 100 μm is used which is prepared by heating and melting the polyethylene at 190° C., molding it under pressure, and then quenching it. No particular restriction is put on the area of the β-relaxation peak, and it depends upon the density of the polyethylene, but it is 0.3 or more, preferably in the range of 0.5 to 30.

The polyethylenes [1] to [4] of the present invention usually have the following physical properties.

(1) A weight-average molecular weight (Mw) in terms of the polyethylene measured by the gel permeation chromatography (GPC) [device=Waters ALC/GPC 150C, column=made by Toso Co., Ltd., TSK HM+GMH6×2, flow rate=1.0 ml/min, and solvent=1,2,4-trichlorobenzene, 135° C.] is usually in the range of 5,000 to 2,000,000, preferably 9,000 to 1,500,000, more preferably 10,000 to 1,000,000. If this weight-average molecular weight (Mw) is less than 5,000, the exertion of mechanical properties is poor, and if it is more than 2,000,000, working properties deteriorates.

(2) A ratio Mw/Mn of a weight-average molecular weight (Mw) to a number-average molecular weight (Mn) in terms of the polyethylene measured by the GPC method is usually in the range of 1.5 to 70, preferably 1.6 to 60, more preferably 2.0 to 50.

(3) A resin density is usually in the range of 0.85 to 0.96 g/cm$^3$, preferably 0.860 to 0.955 g/cm$^3$, more preferably 0.870 to 0.950 g/cm$^3$. This resin density is a value obtained by measuring, with a density gradient tube, the pressed sheet formed at a temperature of 190° C. and then quenched.

(4) The intrinsic viscosity [η] measured in decalin at a temperature of 135° C. is usually in the range of 0.01 to 20 dl/g, preferably 0.05 to 17 dl/g, more preferably 0.1 to 15 dl/g. If this [η] is less than 0.01 dl/g, the exertion of the mechanical properties is poor, and if it is more than 20 dl/g, the working properties deteriorates.

Furthermore, in the polyethylenes [1] to [4] of the present invention, an unsaturated group is present at the terminal of each molecule, and this unsaturated group can easily be identified and determined by measuring the infrared absorption spectra of the pressed sheet (thickness=100 to 500 μm) formed at a temperature of 190° C.

| Kind of terminal unsaturated group | Position of absorption (cm$^{-1}$) |
| --- | --- |
| Vinylene group | 963 |
| Vinylidene group | 888 |
| Vinyl group | 907 |

In each polyethylene, the production ratio of the terminal vinyl group is usually 30 mol % or more, preferably 40 mol % or more, more preferably 50 mol % or more with respect to the sum of the above-mentioned unsaturated groups. In this connection, the amount of the terminal vinyl group can be calculated in accordance with the equation $$n=0.114A_{907}/[d \cdot t]$$

wherein n is the number of the terminal vinyl groups with respect to 100 carbon atoms; $A_{907}$ is an absorbance at 907 cm$^{-1}$; d is a resin density (g/cm$^3$); and t is the thickness of the film (mm).

In general, it is known that an interrelation is present between the amount of the unsaturated group at the terminal and the molecular weight, but in the polyethylenes of the present invention, a terminal vinyl type unsaturated group content (U) and a reciprocal number of the intrinsic viscosity [η] measured in decalin at a temperature of 135° C. usually meet the equation $$0.1 \times [\eta]^{-1} \leq U \leq 7 \times [\eta]^{-1}$$

preferably $$0.1 \times [\eta]^{-1} \leq U \leq 6.5 \times [\eta]^{-1}$$

more preferably $$0.15 \times [\eta]^{-1} \leq U \leq 6.5 \times [\eta]^{-1}$$

most preferably $$0.15 \times [\eta]^{-1} \leq U \leq 6 \times [\eta]^{-1}$$

wherein U is the number of the terminal vinyl groups with respect to 1000 carbon atoms.

Various functions such as adhesive properties, printability, coating properties, compatibility, moisture permeability and barrier properties, which are insufficient in a polyolefin, can be imparted to the polyethylene having the high unsaturated group content at the terminal by the modification of the unsaturated group, and simultaneously, the improvement of the working properties based on the branch can be expected. In addition, the polyethylene having the high terminal vinyl group content can be used as a branched micromonomer for the manufacture of various graft copolymers. On the other hand, in the polyethylene having a low terminal unsaturated group content, thermal stability can be improved, and the working properties based on the branch can be expected. Functions such as the adhesive properties and the printability can be sufficiently exerted by a practical modification even in the case of the polyethylene having the low terminal unsaturated group content.

The present invention also provides a polyethylene in which such a carbon-carbon unsaturated bond is hydrogenated, and in the polyethylene in which the unsaturated groups are reduced or lost by this hydrogenation treatment, the thermal stability can be improved.

The polyethylenes (the unhydrogenated polyethylenes and the hydrogenated polyethylenes) of the present invention can each be mixed with another thermoplastic resin and then used. Examples of the other thermoplastic resin include polyolefin resins, polystyrene resins, condensation series high-molecular weight polymers and addition polymerization series high-molecular weight polymers. Typical examples of the polyolefin resins include high-density polyethylenes, low-density polyethylenes, poly-3-methyl-butene-1, poly-4-methylpentene-1, straight-chain low-density polyethylenes obtained by the use of 1-butene, 1-hexene, 1-octene, 4-methylpentene-1 and 3-methylbutene-1 as comonomer components, ethylene-vinyl acetate copolymers, saponified ethylene-vinyl acetate copolymers, ethylene-acrylic acid copolymers, ethylene-acrylic acid ester copolymers, ethylenic ionomers and polypropylene. Typical examples of the polystyrene resins include general-purpose polystyrenes, isotactic polystyrenes and (rubber modified) high-impact polystyrenes. Typical examples of the condensation series high-molecular weight polymers include polyacetal resins, polycarbonate resins, polyamide resins such as 6-nylon and 6,6-nylon, polyester resins such as polyethylene terephthalates and polybutylene terephthalates, polyphenylene oxide resins, polyimide resins, polysulfone resins, polyethersulfone resins and polyphenylene sulfide resins. Examples of the addition polymerization series high-molecular weight polymers include polymers obtained from polar vinyl monomers and polymers obtained from diene monomers, typically, polymethyl methacrylate, polyacrylonitrile, acrylonitrile-butadiene copolymer, acrylonitrilebutadiene-styrene copolymer, diene polymers in which a diene chain is hydrogenated, and thermoplastic elastomers.

A thermoplastic resin composition of the present invention can be obtained by blending 100 parts by weight of the present invention with 2 to 500 parts by-weight, preferably 3 to 300 parts by weight, more preferably 5 to 200 parts by weight of the other thermoplastic resin (or the thermoplastic elastomer).

The polyethylenes [1] to [4] of the present invention can each be prepared by polymerizing an ethylene monomer in the presence of such a polymerization catalyst as to permit the preparation of the polyethylene having the above-mentioned characteristics.

An example of such a polymerization catalyst contains, as main components, (A) a transition metal compound and (B) a compound capable of forming an ionic complex from the transition metal compound or its derivative.

As the transition metal compound of the component (A) in the polymerization catalyst, there can be used a transition metal compound containing a metal in the groups 3 to 10 of the periodic table or a metal of a lanthanide series. Preferable examples of the transition metal include titanium, zirconium, hafnium, vanadium, niobium and chromium.

Examples of such a transition metal compound includes various kinds of compounds, and in particular, compounds containing transition metals in the groups 4, 5 and 6 can be suitably used. Particularly suitable are compounds represented by the general formulae

 (I)

 (II)

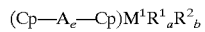 (III)

or the general formula

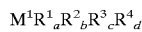 (IV)

and their derivatives.

In the above-mentioned general formulae (I) to (IV), $M^1$ represents a transition metal such as titanium, zirconium, hafnium, vanadium, niobium and chromium, and Cp represents a cyclic unsaturated hydrocarbon group or a chain unsaturated hydrocarbon group such as a cyclopentadienyl group, a substituted cyclopentadienyl group, an indenyl group, a substituted indenyl group, a tetrahydroindenyl group, a substituted tetrahydroindenyl group, a fluorenyl group or a substituted fluorenyl group. In this connection, a part of the carbon atoms in the cyclopentadienyl group may be substituted by a hetero-atom such as nitrogen or phosphorus. $R^1$, $R^2$, $R^3$ and $R^4$ each independently represents a σ-bond ligand, a chelate ligand or a ligand such as a Lewis base, and typical examples of the σ-bond ligand include a hydrogen atom, an oxygen atom, a halogen atom, an alkyl group having 1 to 20 carbon atoms, an alkoxy group having 1 to 20 carbon atoms, an aryl group, an alkylaryl group or an arylalkyl group having 6 to 20 carbon atoms, an acyloxy group having 1 to 20 carbon atoms, an allyl group, a substituted allyl group, and a substituent containing a silicon atom. In addition, examples of the chelate ligand include an acetylacetonato group and a substituted acetylacetonato group. A represents a crosslinkage by a covalent bond. a, b, c and d each is independently an integer of 0 to 4, and e is an integer of 0 to 6. Two or more of $R^1$, $R^2$, $R^3$ and $R^4$ may bond to each other to form a ring. In the case that the above-mentioned Cp has a substituent, this substituent is preferably an alkyl group having 1 to 20 carbon atoms. In the formulae (II) and (III), the two Cps may be the same or different from each other.

Examples of the substituted cyclopentadienyl group in the above-mentioned formulae (I) to (III) include a methylcyclopentadienyl group, an ethylcyclopentadienyl group, an isopropylcyclopentadienyl group, a 1,2-dimethylcyclopentadienyl group, a tetramethylcyclopentadienyl group, a 1,3-dimethylcyclopentadienyl group, a 1,2,3-trimethylcyclopentadienyl group, a 1,2,4-trimethylcyclopentadienyl group, a pentamethylcyclopentadienyl group and a trimethylsilylcyclopentadienyl group. Furthermore, typical examples of $R^1$ to $R^4$ in the above-mentioned formulae (I) to (IV) include a fluorine atom, a chlorine atom, a bromine atom and an iodine atom as the halogen atoms; a methyl group, an ethyl group, an n-propyl group, an isopropyl group, an n-butyl group, an octyl group and a 2-ethylhexyl group as the alkyl groups having 1 to 20 carbon atoms; a methoxy group, an ethoxy group, a propoxy group, a butoxy group and a phenoxy group as the alkoxy groups having 1 to 20 carbon atoms; a phenyl group, a tolyl group, a xylyl group and a benzyl group as the aryl groups, the alkylaryl groups or the arylalkyl groups having 6 to 20 carbon atoms; a heptadecylcarbonyloxy group as the acyloxy group having 1 to 20 carbon atoms; a trimethylsilyl group and a (trimethylsilyl)methyl group as the substituent containing a silicon atom; and ethers such as dimethyl ether, diethyl ether and tetrahydrofuran, a thioether such as tetrahydrothiophene, an ester such as ethyl benzoate, nitriles such as acetonitrile and benzonitrile, amines such as trimethylamine, triethylamine, tributylamine, N,N-dimethylaniline, pyridine, 2,2'-bipyridine and phenanthroline, phosphines such as triethylphosphine and triphenylphosphine, chain unsaturated hydrocarbons such as ethylene, butadiene, 1-pentene, isoprene, pentadiene, 1-hexene and their derivatives, and cyclic unsaturated hydrocarbons such as benzene, toluene, xylene, cycloheptatriene, cyclooctadiene, cyclooctatriene, cyclooctatetraene and their derivatives as the Lewis base. In addition, examples of the crosslinkage by the covalent bond of A in the formula (III) include a methylene crosslinkage, a dimethylmethylene crosslinkage, an ethylene crosslinkage, a 1,1'-cyclohexylene crosslinkage, a dimethylsilylene crosslinkage, a dimethylgermilene crosslinkage and a dimethylstanilene crosslinkage.

Examples of the compound represented by the general formula (I) include
(pentamethylcyclopentadienyl)trimethylzirconium,
(pentamethylcyclopentadienyl)triphenylzirconium, (pentamethylcyclopentadienyl)tribenzylzirconium,
(pentamethylcyclopentadienyl)trichlorozirconium,
(pentamethylcyclopentadienyl)trimethoxyzirconium,
(pentamethylcyclopentadienyl)triethoxyzirconium,
(cyclopentadienyl)trimethylzirconium,
(cyclopentadienyl)triphenylzirconium,
(cyclopentadienyl)tribenzylzirconium,
(cyclopentadienyl)trichlorozirconium,
(cyclopentadienyl)trimethoxyzirconium,
(cyclopentadienyl)triethoxyzirconium,
(cyclopentadienyl )dimethyl(methoxy)zirconium,
(methylcyclopentadienyl)trimethylzirconium,
(methylcyclopentadienyl )triphenylzirconium,
(methylcyclopentadienyl )tribenzylzirconium,
(methylcyclopentadienyl )trichlorozirconium,
(methylcyclopentadienyl)dimethyl (methoxy)zirconium,
(dimethylcyclopentadienyl)trichlorozirconium,
(trimethylcyclopentadienyl)trichlorozirconium,
(trimethylcyclopentadienyl)trimethylzirconium,
(tetramethylcyclopentadienyl)trichlorozirconium, and these compounds in which zirconium is replaced with titanium or hafnium.

Examples of the compound represented by the general formulae (II) include
bis(cyclopentadienyl)dimethylzirconium,
bis(cyclopentadienyl)diphenylzirconium,
bis(cyclopentadienyl)diethylzirconium,
bis(cyclopentadienyl)dibenzylzirconium,
bis(cyclopentadienyl)dimethoxyzirconium,
bis(cyclopentadienyl)dichlorozirconium,
bis(cyclopentadienyl)dihydridozirconium,
bis(cyclopentadienyl)monochloromonohydridozirconium,
bis(methylcyclopentadienyl)dimethylzirconium,
bis(methylcyclopentadienyl)dichlorozirconium,
bis(methylcyclopentadienyl)dibenzylzirconium,
bis(pentamethylcyclopentadienyl)dimethylzirconium,
bis(pentamethylcyclopentadienyl)dichlorozirconium,
bis(pentamethylcyclopentadienyl)dibenzyizirconium,
bis(pentamethylcyclopentadienyl)chloromethylzirconium,
bis(pentamethylcyclopentadienyl) hydridomethylzirconium,
(cyclopentadienyl)(pentamethylcyclopentadienyl) dichlorozirconium, and these compounds in which zirconium is replaced with titanium or hafnium.

Furthermore, examples of the compound represented by the general formula (III) include
ethylenebis(indenyl)dimethylzirconium,
ethylenebis(indenyl)dichlorozirconium,
ethylenebis(tetrahydroindenyl)dimethylzirconium,
ethylenebis(tetrahydroindenyl)dichlorozirconium,
dimethylsilylenebis(cyclopentadienyl)dimethylzirconium,
dimethylsilylenebis(cyclopentadienyl)dichlorozirconium,
isopropylidene(cyclopentadienyl)(9-fluorenyl) dimethylzirconium, isopropylidene(cyclopentadiednyl) (9-fluorenyl)-dichlorozirconium, [phenyl(methyl) methylene](9-fluorenyl)-(cycylopentadienyl) dimethylzirconium, diphenylmethylene- (cyclopentadienyl)(9-fluorenyl)dimethylzirconium, ethylene(9-fluorenyl)(cyclopentadienyl) dimethylzirconium, cyclohexalidene(9-fluorenyl) (cyclopentadienyl)dimethylzirconium, cyclopentylidene (9-fluorenyl)(cyclopentadienyl)dimethylzirconium, cyclobutylidene(9-fluorenyl)-(cyclopentadienyl) dimethylzirconium, dimethylsilylene(9-fluorenyl) (cyclopentadienyl)dimethylzirconium, dimethylsilylenebis(2,3,5-trimethylcyclopentadienyl) dichlorozirconium, dimethylsilylenebis(2,3,5- trimethylcyclopentadienyl)dimethylzirconium, dimethylsilylenebis(indenyl)dichlorozirconium, isopropylidenebis(cyclopentadienyl)dichlorozirconium and these compounds in which zirconium is replaced with titanium or hafnium.

Moreover, examples of the compound represented by the general formula (IV) include tetramethylzirconium, tetrabenzylzirconium, tetramethoxyzirconium, tetraethoxyzirconium, tetrabutoxyzirconium, tetrachlorozirconium, tetrabromozirconium, butoxytrichlorozirconium, dibutoxydichlorozirconium, bis (2,5-di-t-butylphenoxy)-dimethylzirconium, bis(2,5-di-t-butylphenoxy)dichlorozirconium, zirconium bis (acetylacetonato), and these compounds in which zirconium is replaced with titanium or hafnium.

Typical examples of the vanadium compound include vanadium trichloride, vanadyl trichloride, vanadium triacetylacetonate, vanadium tetrachloride, vanadium tributoxide, vanadyl dichloride, vanadyl bisacetylacetonate, vanadyl triacetylacetonate, dibenzenevanadium, dicyclopentadienylvanadium, dicyclopentadienylvanadium dichloride, cyclopentadienylvanadium dichloride and dicyclopentadienylmethylvanadium.

Next, typical examples of the chromium compound include tetramethylchromium, tetra(t-butoxy)chromium, bis (cyclopentadienyl)chromium, hydridotricarbonyl (cyclopentadienyl)chromium, hexacarbonyl (cyclopentadienyl)chromium, bis(benzene)chromium, tricarbonyltris(triphenyl phosphonate)chromium, tris(allyl) chromium, triphenyltris(tetrahydrofuran)chromium and chromium tris(acetylacetonate).

Furthermore, as the component (A), there can suitably be used a group 4 transition compound having, as the ligand, a multiple ligand compound in which in the above-mentioned general formula (III), two substituted or unsubstituted conjugated cyclopentadienyl groups (however, at least one of which is a substituted cyclopentadienyl group) is bonded to each other via an element selected from the group 14 of the periodic table.

An example of such a compound is a compound represented by the general formula (V)

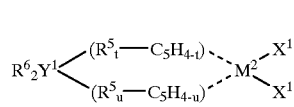

or its derivative.

In the above-mentioned general formula (V), $Y^1$ represents a carbon atom, a silicon atom, a germanium atom or a tin atom, $R^5{}_t$—$C_5H_{4-t}$ and $R^5{}_u$—$C_5H_{4-u}$ each represents a substituted cyclopentadienyl group, and t and u each are an integer of 1 to 4. Here, $R^5$s each represents a hydrogen atom, a silyl group or a hydrocarbon group, and they may be the same or different from each other. In at least either of the cyclopentadienyl groups, $R^5$ is present on at least either of carbon atoms adjacent to the carbon atom bonded to $Y^1$. $R^6$ represents a hydrogen atom, an alkyl group having 1 to 20 carbon atoms, or an aryl group, an alkylaryl group or an arylalkyl group having 6 to 20 carbon atoms. $M^2$ represents a titanium atom, a zirconium atom or a hafnium atom, $X^1$ represents a hydrogen atom, a halogen atom, an alkyl group having 1 to 20 carbon atoms, an aryl group, an alkylaryl group or an arylalkyl group having 6 to 20 carbon atoms, or an alkoxy group having 1 to 20 carbon atoms. $X^1$ may be the same or different from each other, and similarly, $R^6$ is may be the same or different from each other.

Moreover, examples of the substituted cyclopentadienyl group in the general formula (V) include a methylcyclopentadienyl group, an ethylcyclopentadienyl group, an isopropylcyclopentadienyl group, a 1,2-dimethylcyclopentadienyl group, a 1,3-dimethylcyclopentadienyl group, a 1,2,3-trimethylcyclopentadienyl group and a 1,2,4-trimethylcyclopentadienyl group. Typical examples of $X^1$ include F, Cl, Br and I as the halogen atoms; a methyl group, an ethyl group, an n-propyl group, an isopropyl group, an n-butyl group, an octyl group and a 2-ethylhexyl group as the alkyl group having 1 to 20 carbon atoms; a methoxy group, an ethoxy group, a propoxy group, a butoxy group and a phenoxy group as the alkoxy groups having 1 to 20 carbon atoms; and a phenyl group, a tolyl group, a xylyl group and a benzyl group as the aryl group, the alkylaryl group or the arylalkyl group having 6 to 20 carbon atoms. Typical examples of the $R^6$ include a methyl group, an ethyl group, a phenyl group, a tolyl group, a xylyl group and a benzyl group.

Examples of the compound having the general formula (V) include dimethylsilylenebis(2,3,5-trimethylcyclopentadienyl)zirconium dichloride, dimethylsilylenebis(2,3,5-trimethylcyclopentadienyl) titanium dichloride and dimethylsilylenebis(2,3,5-trimethylcyclopentadienyl)hafnium dichloride.

In addition, the compound having the general formula (V) also includes compounds represented by the general formula (VI):

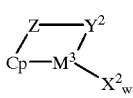

(VI)

In the compound of the general formula (VI), Cp represents a cyclic unsaturated hydrocarbon group or a chain unsaturated hydrocarbon group such as a cyclopentadienyl group, a substituted cyclopentadienyl group, an indenyl group, a substituted indenyl group, a tetrahydroindenyl group, a substituted tetrahydroindenyl group, a fluorenyl group or a substituted fluorenyl group. $M^3$ represents a titanium atom, a zirconium atom or a hafnium atom, $X^2$ represents a hydrogen atom, a halogen atom, an alkyl group having 1 to 20 carbon atoms, an aryl group, an alkylaryl group or an arylalkyl group having 6 to 20 carbon atoms, or an alkoxy group having 1 to 20 carbon atoms. Z represents $SiR^7_2$, $CR^7_2$, $SiR^7_2SiR^7_2$, $CR^7_2CR^7_2$, $CR^7_2CR^7_2CR^7_2$, $CR^7=CR^7$, $CR^7_2SiR^7_2$ or $GeR^7_2$, and $Y^2$ represents —N($R^8$)—, —O—, —S— or —P($R^8$)—. The above-mentioned $R^7$ is a group selected from the group consisting of a hydrogen atom, an alkyl group having 20 or less non-hydrogen atoms, an aryl group, a silyl group, a halogenated alkyl group, a halogenated aryl group and a combination thereof, and $R^8$ is an alkyl group having 1 to 10 carbon atoms or an aryl group having 6 to 10 carbon atoms, or $R^8$ may form a condensed ring of one or more $R^7$s and 30 or less non-hydrogen atoms. Moreover, w represents 1 or 2.

Typical examples of the compound represented by the general formula (VI) include (tert-butylamido)(tetramethyl-$\eta^5$-cyclopentadienyl)-1,2-ethanediylzirconium dichloride, (tert-butylamido)(tetramethyl-$\eta^5$-cyclopentadienyl)-1,2-ethanediyltitanium dichloride, (methylamido)(tetramethyl-$\eta^5$-cyclopentadienyl)-1,2-ethanediylzirconium dichloride, (methylamido)(tetramethyl-$\eta^5$-cyclopentadienyl)-1,2-ethanediyltitanium dichloride, (ethylamido)(tetramethyl-$\eta^5$-cyclopentadienyl)-methylenetitanium dichloride, (tert-butylamido)dimethyl(tetramethyl-$\eta^5$-cyclopentadienyl)-silanetitanium dichloride, (tert-butylamido)dimethyl-(tetramethyl-$\eta^5$-cyclopentadienyl)silanezirconium dibenzyl, (benzylamido)dimethyl(tetramethyl-$\eta^5$-cyclopentadienyl)-silanetitanium dichloride and (phenylphosphide)dimethyl-(tetramethyl-$\eta^5$-cyclopentadienyl)silanezirconium dibenzyl.

Furthermore, as the transition metal compound which is the component (A), there can also be used a reaction product of a transition metal compound represented by the general formula (IV) in which at least two halogen atoms, an alkoxy group, or the two halogen atoms and the alkoxy group are bonded to a central metal and any one of diols represented by the general formulae (VII) to (XII):

(VII)

(VIII)

(IX)

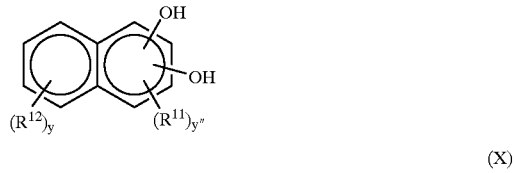

(X)

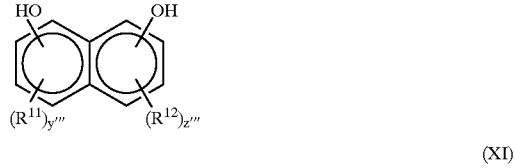

(XI)

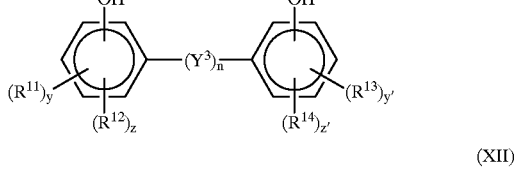

(XII)

In the compounds represented by the general formulae (VII) to (XII), $R^9$ and $R^{10}$ are each a hydrocarbon group having 1 to 20 carbon atoms, and they may be the same of different from each other, $Y^3$ is a hydrocarbon group having 1 to 20 carbon atoms, or a group represented by

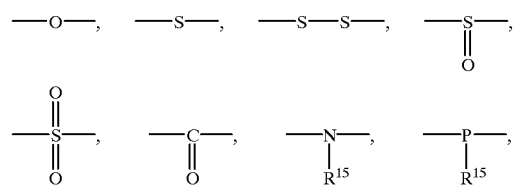

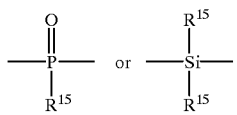

wherein $R^{15}$ is a hydrocarbon group having 1 to 6 carbon atoms. Examples of the hydrocarbon group having 1 to 20 carbon atoms which is represented by $R^9$, $R^{10}$ and $Y^3$ include methylene, ethylene, trimethylene, propylene, diphenylmethylene, ethylidene, n-propylidene, isopropylidene, n-butylidene and isobutylidene, and above all, methylene, ethylene, ethylidene, isopropylidene and isobutylidene are preferable. n is an integer of 0 or more, and 0 or 1 is particularly preferable.

Furthermore, $R^{11}$, $R^{12}$, $R^{13}$ and $R^{14}$ are each a hydrocarbon group having 1 to 20 carbon atoms, a hydroxyl group, a nitro group, a nitrile group, a hydrocarbyloxy group or a halogen atom, and they may be the same or different from each other. Examples of the hydrocarbon group having 1 to 20 carbon atoms include alkyl groups such as methyl, ethyl, n-propyl, isopropyl, n-butyl, isobutyl, t-butyl, n-amyl, isoamyl, n-hexyl, n-heptyl, n-octyl, n-decyl and n-dodecyl; aryl groups such as phenyl and naphthyl; cycloalkyl groups such as cyclohexyl and cyclopentyl; an alkenyl group such as propenyl; and an aralkyl group such as benzyl, and above all, the alkyl groups having 1 to 10 carbon atoms are preferable. y, y', y'', y''', z, z', z'' and z''' are each the number of substituents bonded to an aromatic ring, and y, y', z and z' are each an integer of 0 to 4, y'' and z'' are each an integer of 0 to 2, and y''' and z''' are each an integer of 0 to 3.

One example of the reaction product of the transition metal compound and each of the diols represented by the general formulae (VII) to (XII) is a compound represented by the general formula (XIII):

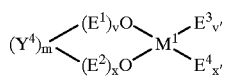

(XIII)

In the general formula (XIII), $M^1$ is as defined above, $E^1$ and $E^2$ are each a hydrocarbon group having 1 to 20 carbon atoms, v and x are each 0 or 1, and $E^1$ and $E^2$ form a crosslinking structure via $Y^4$. $E^3$ and $E^4$ are each a σ-bond ligand, a chelate ligand or a Lewis base, and they may be the same or different from each other.

v' and x' are each an integer of 0 to 2 [v'+x'=an integer of (the valence of $M^1$ −2)]. $Y^4$ is a hydrocarbon group having 1 to 20 carbon atoms, $E^5E^6Y^5$, an oxygen atom or a sulfur atom, and m is an integer of 0 to 4. $E^5$ and $E^6$ are each a hydrocarbon group having 1 to 20 carbon atoms, and $Y^5$ is a carbon atom or a silicon atom.

The polyethylene of the present invention can be obtained by various preparation methods, and no particular restriction is put on this method, but a catalyst and polymerization conditions should be suitably selected. In this case, preferable examples of the catalyst include alkoxytitanium compounds, and titanium and zirconium compounds in which a crosslinking is present between ligands.

Typical examples of the compound represented by the general formula (XIII) include

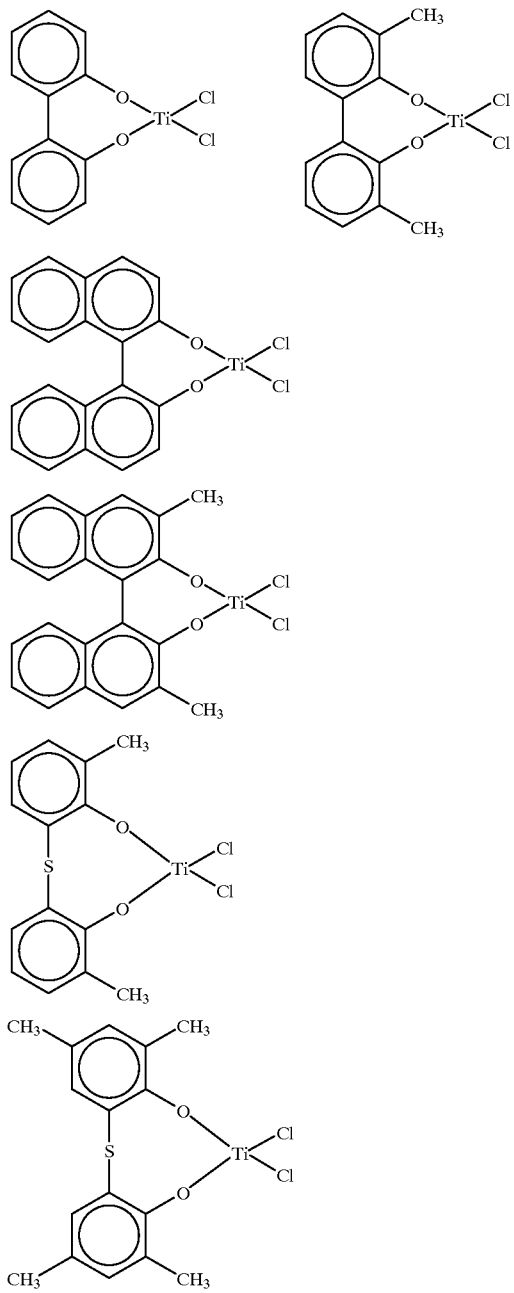

Furthermore, the compound of the general formula (XIII) also includes a compound represented by the general formula (XIV):

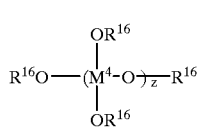

(XIV)

In the general formula (XIV), $R^{16}$s are each an alkyl group or an acyl group having 1 to 20 carbon atoms, a cycloalkyl group having 6 to 20 carbon atoms, or an aryl group, an alkylaryl group or an arylalkyl group having 6 to 20 carbon atoms, and the respective $R^{16}$s may be the same or different from each other. $M^4$ is a metallic element in the group 3 or 4 of the periodic table or in a lanthanide series, and z is an integer of 2 to 20.

Typical examples represented by the general formula (XIV) include $BuO[Zr(OBu)_2O]_4$—Bu, $EtO[Zr(OEt)_2O]_4$—Et, $iPrO[Zr(OiPr)_2O]_4$-iPr, $nPrO[Zr(OnPr)_2O]_4$-nPr, $BuO[Zr(OBu)_2O]_3$—Bu, $BuO[Zr(OBu)_2O]_2$—Bu, and these compounds in which zirconium is replaced with titanium or hafnium. In these formulae, Bu is a butyl group, Et is an ethyl group, iPr is an isopropyl group, and nPr is a normal propyl group.

The polyethylene of the present invention can be obtained by various preparation methods, and no particular restriction is put on this method, but a catalyst and polymerization conditions should be suitably selected. In this case, preferable examples of the catalyst include alkoxytitanium compounds, and titanium and zirconium compounds in which a crosslinking is present between ligands.

In the polymerization catalyst for use in the present invention, the transition metal compounds which are the component (A) may be used singly or in a combination of two or more thereof.

On the other hand, examples of a compound which can be used as the component (B) in the polymerization catalyst and which is capable of forming an ionic complex from the transition metal compound of the component (A) or its derivative include (B-1) an inonic compound for reacting with the transition metal compound of the component (A) to form an ionic complex, (B-2) an aluminoxane, and (B-3) a Lewis acid.

As the inonic compound of the component (B-1), any inonic compound can be used, so far as it reacts with the transition metal compound of the component (A) to form the ionic complex. However, there can be suitably used a compound comprising a cation and an anion in which a plurality of groups are bonded to an element, particularly a coordinate complex compound comprising a cation and an anion in which a plurality of groups are bonded to an element. The compound comprising a cation and an anion in which a plurality of groups are bonded to an element is a compound represented by the general formula

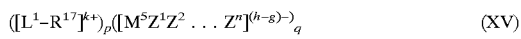 (XV)

or

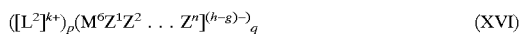 (XVI)

wherein $L^2$ is $M^7$, $R^{18}R^{19}M^8$, $R^{20}_3C$ or $R^{21}M^8$.

[in the formulae (XV) and (XVI), $L^1$ is a Lewis base; $M^5$ and $M^6$ are each an element selected from the groups 5, 6, 7, 8–10, 11, 12, 13, 14 and 15 of the periodic table, preferably an element selected from the groups 13, 14 and 15; $M^7$ and $M^8$ are each an element selected from the groups 3, 4, 5, 6, 7, 8–10, 1, 11, 2, 12 and 17 of the periodic table; $Z^1$ to $Z^n$ are each a hydrogen atom, a dialkylamino group, an alkoxy group having 1 to 20 carbon atoms, an aryloxy group having 6 to 20 carbon atoms, an alkyl group having 1 to 20 carbon atoms, an aryl group, an alkylaryl group or an arylalkyl group having 6 to 20 carbon atoms, a halogen-substituted hydrocarbon having 1 to 20 carbon atoms, an acyloxy group having 1 to 20 carbon atoms, an organic metalloid group or a halogen atom, and $Z^1$ to $Z^n$ may bond to each other to form a ring. $R^{17}$ is a hydrogen atom, an alkyl group having 1 to 20 carbon atoms, or an aryl group, an alkylaryl group or an arylalkyl group having 6 to 20 carbon atoms; $R^{18}$ and $R^{19}$ are each a cyclopentadienyl group, a substituted cyclopentadienyl group, an indenyl group or a fluorenyl group; and $R^{20}$ is an alkyl group having 1 to 20 carbon atoms, an aryl group, an alkylaryl group or an arylalkyl group. $R^{21}$ is a large cyclic ligand such as tetraphenylporphyrin or phthalocyanine. g is a valence of each of $M^5$ and $M^6$, and it is an integer of 1 to 7; h is an integer of 2 to 8; k is an ion valence of $[L^1-R^{17}]$ or $[L^2]$ and it is an integer of 1 to 7; and p is an integer of 1 or more, and $q=(p\times k)/(h-g)$.

Here, typical examples of the Lewis base represented by the $L^1$ include ammonia, amines such as methylamine, aniline, dimethylamine, diethylamine, N-methylaniline, diphenylamine, trimethylamine, triethylamine, tri-n-butylamine, N,N-dimethylaniline, methyldiphenylamine, pyridine, p-bromo-N,N-dimethylaniline and p-nitro-N,N-dimethylaniline, phosphines such as triethylphosphine, triphenylphosphine and diphenylphosphine, ethers such as dimethyl ether, diethyl ether, tetrahydrofuran and dioxane, thioethers such as diethyl thioether and tetrahydrothiophene, and an ester such as ethyl benzoate.

Furthermore, typical examples of $M^5$ and $M^6$ include B, Al, Si, P, As and Sb, and B and P are preferable. Typical examples of $M^7$ include Li, Na, Ag, Cu, Br and I, and typical examples of M8 include Mn, Fe, Co, Ni and Zn. Typical examples of $Z^1$ to $Z^n$ include a dimethylamino group and a diethylamino group as the dialkylamino group; a methoxy group, an ethoxy group and an n-butoxy group as the alkoxy group having 1 to 20 carbon atoms; a phenoxy group, a 2,6-dimethylphenoxy group and a naphthyloxy group as the aryloxy group having 6 to 20 carbon atoms; a methyl group, an ethyl group, an n-propyl group, an isopropyl group, an n-butyl group, an n-octyl group and a 2-ethylhexyl group as the alkyl groups having 1 to 20 carbon atoms; a phenyl group, a p-tolyl group, a benzyl group, a 4-t-butylphenyl group, a 2,6-dimethylphenyl group, a 3,5-dimethylphenyl group, a 2,4-dimethylphenyl group and a 2,3-dimethylphenyl group as the aryl groups, alkylaryl groups or arylalkyl groups having 6 to 20 carbon atoms; a p-fluorophenyl group, a 3,5-difluorophenyl group, a pentachlorophenyl group, a 3,4,5-trifluorophenyl group, a pentafluorophenyl group and a 3,5-di(trifluoromethyl)phenyl group as the halogen-substituted hydrocarbons having 1 to 20 carbon atoms; F, Cl, Br and I as the halogen atoms; and a pentamethylantimony group, a trimethylsilyl group, a trimethylgermil group, a diphenylarsine group, a dicyclohexylantimony group and a diphenylboron group as the organic metalloid groups. Typical examples of $R^{17}$, $R^{20}$ are as mentioned above. Typical examples of the substituted cyclopentadienyl group of $R^{18}$ and $R^{19}$ include alkyl group-substituted groups such as a methylcyclopentadienyl group, a butylcyclopentadienyl group and a pentamethylcyclopentadienyl group. Here, the alkyl group usually has 1 to 6 carbon atoms, and the number of the substituted alkyl groups is an integer of 1 to 5.

Among the compounds represented by the general formulae (XV) and (XVI), the compounds in which $M^5$ and $M^6$ are boron are preferable. Of the compounds of the general formulae (XV) and (XVI), typically, the following examples can particularly preferably be used.

Examples of the compound of the general formula (XV) include triethylammonium tetraphenylborate, tri(n-butyl) ammonium tetraphenylborate, trimethylammonium tetraphenylborate, tetraethylammonium tetraphenylborate, methyltri(n-butyl)ammonium tetraphenylborate, benzyltri (n-butyl)-ammonium tetraphenylborate, dimethyldiphenylammonium tetraphenylborate, methyltriphenylammonium tetraphenylborate, trimethylanilinium tetraphenylborate, methylpyridinium tetraphenylborate, benzylpyridinium tetraphenylborate, methyl(2-cyanopyridinium) tetraphenylborate, trimethylsulfonium tetraphenylborate, benzylmethylsulfonium tetraphenylborate, triethylammonium tetrakis(pentafluorophenyl)-borate, tri(n-butyl) ammonium tetrakis(pentafluorophenyl)-borate, triphenylammonium tetrakis(pentafluorophenyl)-borate, tetrabutylammonium tetrakis(pentafluorophenyl)-borate, tetraethylammonium tetrakis(pentafluorophenyl)-borate, [methyltri(n-butyl)ammonium] tetrakis(pentafluorophenyl) borate, [benzyltri(n-butyl)ammonium] tetrakis(pentafluorophenyl)borate, methyldiphenylammonium tetrakis(pentafluorophenyl)borate, methyltriphenylammonium tetrakis(pentafluorophenyl)borate, dimethyldiphenylammonium tetrakis(pentafluorophenyl)borate, anilinium tetrakis(pentafluorophenyl)borate, methylanilinium tetrakis(pentafluorophenyl)borate, dimethylanilinium tetrakis(pentafluorophenyl)borate, trimethylanilinium tetrakis(pentafluorophenyl)borate, dimethyl(m-nitroanilinium) tetrakis(pentafluorophenyl)borate, dimethyl(p-bromoanilinium)tetrakis(pentafluorophenyl)borate, pyridinium tetrakis(pentafluorophenyl)borate, (p-cyanopyridinium) tetrakis(pentafluorophenyl)borate, (N-methylpyridinium) tetrakis(pentafluorophenyl)borate, (N-benzylpyridinium) tetrakis(pentafluorophenyl)borate, (2-cyano-N-methylpyridinium) tetrakis(pentafluorophenyl) borate, (4-cyano-N-methylpyridinium) tetrakis (pentafluorophenyl)borate, (4-cyano-N-benzylpyridinium) tetrakis(pentafluorophenyl)borate, trimethylsulfonium tetrakis(pentafluorophenyl)borate, benzyldimethylsulfonium tetrakis(pentafluorophenyl)borate, tetraphenylphosphonium tetrakis(pentafluorophenyl)borate, dimethylanilinium tetrakis(3,5-ditrifluoromethylphenyl)borate, dimethylanilinium tris(pentafluorophenyl)(p-trifluoromethyltetrafluorophenyl)borate, triethylammonium tris(pentafluorophenyl)(p-trifluoromethyltetrafluorophenyl) borate, pyridinium tris(pentafluorophenyl)(p-trifluoromethyltetrafluorophenyl)borate, (N-methylpyridinium) tris(pentafluorophenyl)-(p-trifluoromethyltetrafluorophenyl)borate, (2-cyano-N-methylpyridinium) tris(pentafluorophenyl)(p-trifluoromethyltetrafluorophenyl)borate, (4-cyano-N-benzylpyridinium) tris(pentafluorophenyl)(p-trifluoromethyltetrafluorophenyl)borate, triphenylphosphonium tris(pentafluorophenyl)(p-trifluoromethyltetrafluorophenyl)borate, dimethylanilinium tris(pentafluorophenyl)(2,3,5,6-tetrafluoropyridinyl)borate, triethylammonium tris(pentafluorophenyl)-(2,3,5,6-tetrafluoropyridinyl)borate, pyridinium tris (pentafluorophenyl)(2,3,5,6-tetrafluoropyridinyl)borate, (N-methylpyridinium) tris(pentafluorophenyl)(2,3,5,6-tetrafluoropyridinyl)borate, (2-cyano-N-methylpyridinium) tris(pentafluorophenyl)(2,3,5,6-tetrafluoropyridinyl)-borate, (4-cyano-N-benzylpyridinium) tris(pentafluorophenyl)(2,3,5,6-tetrafluoropyridinyl)borate, triphenylphosphonium tris (pentafluorophenyl)(2,3,5,6-tetrafluoropyridinyl)borate, dimethylanilinium tris(pentafluorophenyl)(phenyl)borate, dimethylanilinium tris(pentafluorophenyl) [3,5-di (trifluoromethyl)phenyl]borate, dimethylanilinium tris (pentafluorophenyl)(4-trifluoromethylphenyl)borate, dimethylanilinium triphenyl(pentafluorophenyl)borate and triethylammonium hexafluoroarsenate.

On the other hand, examples of the compound of the general formula (XVI) include ferrocenium tetraphenylborate, silver tetraphenylborate, trityl tetraphenylborate, tetraphenylporphyrinmanganese tetraphenylborate, ferrocenium tetrakis(pentafluorophenyl) borate, (1,1'-dimethylferrocenium) tetrakis (pentafluorophenyl)borate, decamethylferrocenium tetrakis (pentafluorophenyl )borate, acetylferrocenium tetrakis (pentafluorophenyl)borate, formylferrocenium tetrakis (pentafluorophenyl)borate, cyanoferrocenium tetrakis (pentafluorophenyl)borate, silver tetrakis (pentafluorophenyl)borate, trityl tetrakis(pentafluorophenyl) borate, lithium tetrakis(pentafluorophenyl)-borate, sodium tetrakis(pentafluorophenyl)borate, tetraphenylporphyrin-manganese tetrakis(pentafluorophenyl)borate, tetraphenylporphyriniron chloride tetrakis(pentafluorophenyl) borate, tetraphenylporphyrinzinc chloride tetrakis (pentafluorophenyl)borate, silver tetrafluoroborate, silver hexafluoroarsenate and silver hexafluoroantimonate.

In addition to the compounds of the above-mentioned general formulae (XV) and (XVI), there can also be used, for example, tris(pentafluorophenyl)boron, tris[3,5-di (trifluoromethyl)phenyl]boron and triphenylboron.

The ionic compounds, which are the components (B-1), capable of reacting with the transition metal compound of the above-mentioned component (A) to form an ionic complex may be used singly or in a combination of two or more thereof. Furthermore, a component comprising the transition metal compound of the component (A) and the ionic compound, which is the component (B-1), capable of forming an ionic complex may be a polycationic complex.

On the other hand, as the aluminoxane of the component (B-2), there can be mentioned a chain aluminoxane represented by the general formula (XVII)

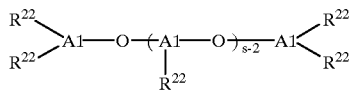

(XVII)

(wherein $R^{22}$s are each independently a halogen atom, or a hydrocarbon group such as an alkyl group, a cycloalkyl group, an alkenyl group, an aryl group or an arylalkyl group having 1 to 20 carbon atoms, preferably 1 to 12 carbon atoms, and the alkyl group is more preferable; and s denotes a polymerization degree, and it is an integer of usually 3 to 50, preferably 7 to 40), and a cyclic aluminoxane represented by the general formula (XVIII)

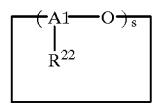

(XVIII)

(wherein $R^{22}$s and s are as defined above).

Among the compounds of the general formulae (XVII) and (XVIII), the aluminoxanes having a polymerization degree of 7 or more are preferable. In the case that the aluminoxane having a polymerization degree of 7 or more, or a mixture of these aluminoxanes is used, a high activation can be obtained. Furthermore, modified aluminoxanes can also suitably be used which can be obtained by modifying the aluminoxanes represented by the general formulae (XVII) and (XVIII) with a compound such as water having an active hydrogen and which are insoluble in usual solvents.

As a preparation method of the above-mentioned aluminoxanes, a method can be mentioned in which an alkylaluminum is brought into contact with a condensation agent such as water, but no particular restriction is put on its means, and the reaction can be carried out in a known manner. For example, there are (1) a method which comprises dissolving an organic aluminum compound in an organic solvent, and then bringing the solution into contact with water, (2) a method which comprises first adding an organic aluminum compound at the time of polymerization, and then adding water, (3) a method which comprises reacting water of crystallization contained in a metallic salt or water adsorbed by an inorganic substance or an organic substance with an organic aluminum compound, and (4) a method which comprises reacting a tetraalkyldialuminoxane with a trialkylaluminum, and further reacting with water.

These aluminoxanes may be used singly or in a combination of two or more thereof.

Furthermore, no particular restriction is put on the Lewis acid which is the component (B-3), and this Lewis acid may be an organic compound or a solid inorganic compound. As the organic compound, boron compounds and aluminum compounds are preferably used, and as the inorganic compound, magnesium compounds and aluminum compounds are preferably used. These Lewis acids may be used singly or in a combination of two or more thereof.

In the present invention, as the catalytic component (B), the above-mentioned components (B-1), (B-2) and (B-3) may be used singly or in a combination of two or more thereof.

In the polymerization catalyst which can be used in the present invention, if desired, as a component (C), an organic aluminum compound can be used which is represented by the general formula (XIX)

$$R^{23}{}_r AlQ_{3-r} \qquad (XIX)$$

wherein $R^{23}$ is an alkyl group having 1 to 10 carbon atoms; Q is a hydrogen atom, an alkoxy group having 1 to 20 carbon atoms, an aryl group having 6 to 20 carbon atoms or a halogen atom; and r is an integer of 1 to 3.

In particular, when the ionic compound (B-1) which is capable of reacting with the transition metal compound of the component (A) to form an ionic complex is used as the component (B) together with the organic aluminum compound (C), a high activity can be obtained.

Typical examples of the compound represented by the general formula (XIX) include trimethylaluminum, triethylaluminum triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride and ethylaluminum sesquichloride.

Next, in the present invention, at least one of the catalyst components (A), (B) and, if desired, (C) can be supported on a suitable carrier and then used.

No particular restriction is put on the kind of carrier, and inorganic oxide carriers, other inorganic carriers and organic carriers all can be used, but the inorganic oxide carriers and the other inorganic carriers are particularly preferable.

Typical examples of the inorganic oxide carriers include $SiO_2$, $Al_2O_3$, MgO, $ZrO_2$, $TiO_2$, $Fe_2O_3$, $B_2O_3$, CaO, ZnO, BaO, $ThO_2$ and mixtures thereof, for example, silica-alumina, zeolite, ferrite, sepiolite and glass fiber.

Above all, $SiO_2$ and $Al_2O_3$ are particularly preferable. In this connection, the above-mentioned inorganic oxide carrier may contain a small amount of a carbonate, a nitrate, a sulfate or the like.

On the other hand, examples of the carriers other than mentioned above include magnesium compounds such as $MgCl_2$ and $Mg(OC_2H_5)_2$ and their complex salts as well as organic magnesium compounds represented by the general formula $MgR^{24}{}_i X^3{}_j$. Here, $R^{24}$ represents an alkyl group having 1 to 20 carbon atoms, an alkoxy group having 1 to 20 carbon atoms or an aryl group having 6 to 20 carbon atoms; $X^3$ is a halogen atom or an alkyl group having 1 to 20 carbon atoms; i is 0 to 2; and j is 0 to 2.

Furthermore, examples of the organic carriers include polymers such as polystyrenes, styrene-divinyl-benzene copolymers, polyethylenes, polypropylenes, substituted polystyrenes and polyarylates, starch and carbon.

The state of the carrier which can be used herein depends upon its kind and a manufacturing process, but its average particle diameter is usually in the range of 1 to 300 $\mu$m, preferably 10 to 200 $\mu$m, more preferably 20 to 100 $\mu$m.

If the particle diameter is small, the fine power of the polymer increases, and if the particle diameter is large, the coarse particles of the polymer increase, which causes the deterioration of a bulk density and the clogging of a hopper.

Moreover, the specific surface area of the carrier is usually in the range of 1 to 1000 $m^2/g$, preferably 50 to 500 $m^2/g$, and its pore volume is usually in the range of 0.1 to 5 $cm^3/g$, preferably 0.3 to 3 $cm^3/g$.

If either of the specific surface area and the pore volume deviates from the above-mentioned range, a catalyst activity deteriorates sometimes. In this connection, the specific surface area and the pore volume can be calculated from the volume of an adsorbed nitrogen gas in accordance with a BET method [refer to Journal of the American Chemical Society, Vol. 60, p. 309 (1983)].

Furthermore, it is desirable that the above-mentioned carrier, when used, is calcined usually at 150 to 1000° C., preferably 200 to 800° C.

No particular restriction is put on a method for supporting the catalytic components on the carrier, and a conventional usual method can be used.

Next, a ratio between the respective catalytic components which can be used in the present invention will be described. In the case (1) that the catalytic components (A) and (B-1) are used, both the components are suitably used so that a molar ratio of the component (A)/the component (B-1) may be in the range of 1/0.1 to 1/100, preferably 1/0.5 to 1/10, more preferably 1/1 to 1/5. In the case (2) that the catalytic components (A), (B-1) and (C) are used, a molar ratio of the component (A)/the component (B-1) is the same as in the above-mentioned case (1), but a molar ratio of the component (A)/the component (C) is in the range of 1/2,000 to 1/1, preferably 1/1,000 to 1/5, more preferably 1/500 to 1/10.

Furthermore, in the case (3) that the catalytic components (A) and (B-2) are used, both the components are suitably used so that a molar ratio of the component (A)/the component (B-2) may be in the range of 1/20 to 1/10,000, preferably 1/100 to 1/5,000, more preferably 1/200 to 1/2,000. In the case (4) that the catalytic components (A), (B-2) and (C) are used, a molar ratio of the component (A)/the component (B-2) is the same as in the above-mentioned case (3), but a molar ratio of the component (A)/the component (C) is in the range of 1/2,000 to 1/1, preferably 1/1,000 to 1/5, more preferably 1/500 to 1/10.

In addition, in the case (5) that the catalytic components (A) and (B-3) are used, both the components are suitably used so that a molar ratio of the component (A)/the component (B-3) may be in the range of 1/0.1 to 1/2,000, preferably 1/0.2 to 1/1,000, more preferably 1/0.5 to 1/500. In the case (6) that the catalytic components (A), (B-3) and (C) are used, a molar ratio of the component (A)/the component (B-3) is the same as in the above-mentioned case (5), but a molar ratio of the component (A)/the component (C) is in the range of 1/2,000 to 1/1, preferably 1/1,000 to 1/5, more preferably 1/500 to 1/10.

In the present invention, a polyethylene having improved non-Newtonian properties and excellent working properties in which the Huggins coefficient and the intrinsic viscosity [η] measured in a decalin solvent at a temperature of 135° C. meet the relation of the equation $$k \geq 0.2 + 0.0743 \times [\eta]$$

can efficiently be obtained, for example, as in the case of the above-mentioned polyethylene [1], by homopolymerizing ethylene in the presence of a catalyst comprising (a) a transition metal compound in which the relation between a monomer charge composition [a molar ratio [M] of 1-octene/(ethylene+1-octene)] and the product of a crystallization enthalpy (ΔH) and a melting point (Tm) of a produced copolymer meets the equation $$0 \leq \Delta H \cdot Tm \leq 27{,}000 - 21{,}600[M]^{0.56}$$

(however, under polymerization conditions using the component (a) together with an aluminoxane), (b) a transition metal compound capable of forming a terminal vinyl group in the homopolymerization of ethylene (however, under polymerization conditions using the component (b) together with the aluminoxane), and (c) a compound capable of forming an ionic complex from the above-mentioned components (a) and (b) or their derivatives, which components (a), (b) and (c) are selected from transition metal compounds of the components (A) which contain a metal in the groups 3 to 10 of the periodic table or in a lanthanide series, preferably titanium, zirconium, hafnium, chromium, vanadium or a metal in the lanthanide series.

Also in the case that such a polymerization catalyst is used, as described above, the organic aluminum compound which is the above-mentioned component (C) may additionally be used, and at least one of the catalytic components may be supported on the suitable carrier. Furthermore, a use ratio between the component (a) and the component (b) depends upon a single catalytic activity of each component, and so it cannot sweepingly be decided, but when the ratio of the component (a) is increased, the polyethylene having the high non-Newtonian properties can be obtained. In general, the molar ratio of the component (a)/the component (b) is selected in a range of 1/1,000 to 1,000/1, preferably 1/500 to 500/1, more preferably 1/300 to 300/1.

The transition metal compound which is the component (a) has the catalytic component whose copolymerization properties are in a specific range, and on the other hand, the transition metal compound which is the component (b) is the catalytic component capable of forming a terminal vinyl group. When such two kinds of transition metal compounds are combined and used, the polyethylene having the non-Newtonian properties can be obtained. The fact that the polyethylene has the non-Newtonian properties is supposed to be due to the presence of long-chain branches, and in view of the formation mechanism of the branches, it can be presumed that a comb-shaped polymer is not merely produced but a branch is further formed on the branched chain in the system.

Next, reference will be made to the formation of the terminal vinyl group and copolymerization properties by the above-mentioned catalyst.

(a) Formation of terminal vinyl group

The formation of the terminal vinyl group is usually considered to be due to the elimination chain transfer of β hydrogen and a β alkyl group at the growing terminal in a polymerization system in which ethylene or propylene is concerned. It can be determined by evaluating a polymer produced by ethylene polymerization using the transition metal compound of the component (b) and the aluminoxane whether or not the catalyst has the ability of forming the terminal vinyl group. However, in the case that the production of the polymer is small, it is necessary to employ polymerization conditions for molecular weight reduction such as the increase in a catalyst concentration and the decrease in a monomer concentration.

The determination of the terminal vinyl group can be carried out by calculating the number n of the terminal vinyl groups with respect to 100 carbon atoms on the basis of a peak of the terminal vinyl group which appears at 907 cm$^{-1}$ by IR measurement in accordance with the equation $$n = 0.114 \times A_{907}/(d \times T)$$

wherein $A_{907}$ is an absorbance at 907 cm$^{-1}$; d is density (g/ml); and T is a thickness of a film to be measured.

As the catalytic component which can produce the polymer having a large number of the terminal vinyl groups thus calculated, i.e., the suitably usable transition metal compound of the component (b), there can be mentioned compounds containing a metal such as titanium, zirconium, hafnium, vanadium or chromium.

The number of the terminal vinyl groups does not always mean the easiness of the production of the vinyl groups, because when the catalyst is used which can easily produce the vinyl groups and can easily react the vinyl groups with the monomer to form the branches, the number of the vinyl groups finally becomes small. On the contrary, when the catalyst is used which can easily form the vinyl groups and has the bad copolymerization properties, many vinyl groups remain.

Thus, it is necessary to inspect the easiness of the branch formation. This can be evaluated by a ratio between a number-average molecular weight Mn in terms of the polyethylene measured by gel permeation chromatography (GPC) and a number-average molecular weight Mn calculated on the basis of a ratio between the methylene groups on the main chain and the terminal groups measured by $^1$H-NMR. In carrying out the branch evaluation on the basis of this Mn ratio, it is necessary to comprehensively judge and determine the Mn ratio in consideration of (1) that the Mn measured by the GPC does not always denote a real molecular weight in the case that the polymer has a branch structure, and (2) that when a molecular weight distribution is wide, the accuracy of the Mn value is low.

Preferable examples of the transition metal compound as the catalytic component (b) having such terminal vinyl group formation properties include (1) compounds having a —OR group (wherein R is an alkyl group, an aryl group, an alkylaryl group, an arylalkyl group, a cycloalkyl group, a halogenated alkyl group or a halogenated aryl group having 1 to 20 carbon atoms), (2) $Cp_2 M^1 R^1_a R^2_b$ . . . (II)

(3) $(Cp—A_e—Cp) M^1 R^1_a R^2_b$ . . . (III)

(wherein Cp, A, $M^1$, $R^1$, $R^2$, a, b and e are as defined above)

(b) Copolymerization Properties

In order to copolymerize the formed terminal vinyl group with ethylene or another comonomer, high copolymerization properties are required. In particular, the copolymerization properties of a high α-olefin usually extremely deteriorate, as the number of carbon atoms decreases and the ratio of the vinyl group per molecular weight decreases.

In the present invention, a copolymerization system is required in which the relation between a monomer composition ratio [a molar ratio [M] of 1-octene/(ethylene+1-octene)] and the product of a crystallization enthalpy ($\Delta H$) and a melting point (Tm) of a produced copolymer meets the equation $$0 \leq \Delta H \cdot Tm \leq 27,000 - 21,600[M]^{0.56}$$

and in order to meet the requirements, the transition metal compound which is the component (a) is used. Furthermore, the polymerization conditions are evaluated by selecting excellent polymerizable conditions using the transition metal compound of the component (a) and the aluminoxane.

(Method for verifying the relation of the above equation)

The crystallization enthalpy ($\Delta H$) can be obtained as follows. That is to say, the crystallization enthalpy ($\Delta H$) (unit=J/g) can be calculated on the basis of an exothermic peak of crystallization observed at a time when a sample sheet hot-pressed at a temperature of 190° C. is molten at a temperature of 150° C. for 5 minutes by the use of a differential scanning calorimeter (DSC7 model, made by Perkin Elmer Co., Ltd.), and then cooled to −50° C. at a rate of 10° C./min.

On the other hand, copolymerization conditions are (1) that the polymerization may be carried out under atmospheric pressure or an increased pressure, (2) that batch polymerization in which ethylene alone is continuously fed (however, a monomer conversion=20% or less), or continuous polymerization is acceptable, (3) that a polymerization temperature is within ±10° C. of a temperature at which a maximum polymerization activity is obtained, or a temperature at which the polyethylenic polymer having the non-Newtonian properties can be prepared in an actual mixed catalyst system, (4) that copolymerization reaction is initiated after a composition ratio between ethylene and the comonomer and the total concentration have reached a steady state, (5) that the molecular weight of the produced copolymer is more than a critical molecular weight, and the polymerization must not be carried out in a region where a melting point increases with the increase in the molecular weight, (6) that an ethylene concentration and a gaseous monomer concentration are calculated on the basis of the weight of the ethylene or the monomer which is dissolved in a polymerization solvent and with which the polymerization solvent is saturated at a certain temperature, (7) that in the case of gaseous polymerization, a monomer charge composition ratio is calculated on the basis of a partial pressure or a monomer feed ratio, (8) that polymerization conditions under which a monomer composition in the system changes by the diffusion of ethylene or a gaseous monomer are unacceptable, (9) that the polymerization must not be continued in a condition that ethylene is not consumed by the polymerization, and (10) that the molar ratio between the respective catalytic components is such that the transition metal compound (a)/aluminoxane is in the range of 1/100 to 1/2,000.

The relation between a monomer charge composition ratio [M] and the product of the $\Delta H$ and the melting point (Tm) of the produced ethylenic polymer is required to meet the equation $$0 \leq \Delta H \cdot Tm \leq 27,000 - 21,600[M]^{0.56}$$

and if the product of the $\Delta H$ and the melting point (Tm) is more than this range, the transition metal compound (a) does not exert the preferable copolymerization properties.

This relation is preferably $$0 \leq \Delta H \cdot Tm \leq 27,000 - 22,000[M]^{0.53}$$

more preferably $$0 \leq \Delta H \cdot Tm \leq 27,000 - 23,000[M]^{0.53}$$

further preferably $$0 \leq \Delta H \cdot Tm \leq 27,000 - 24,000[M]^{0.47}$$

further more preferably $$0 \leq \Delta H \cdot Tm \leq 27,000 - 26,000[M]^{0.40}$$

most preferably $$0 \leq \Delta H \cdot Tm \leq 27,000 - 27,000[M]^{0.27}.$$

Preferable examples of the transition metal compound which is the catalytic component (a) having such copolymerization properties include compounds represented by the general formulae

and

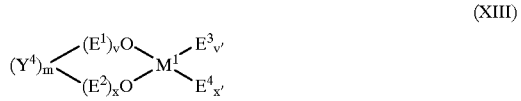

wherein Cp, A, E, $E^1$, $E^2$, $E^3$, $E^4$, $M^1$, $M^3$, $X^2$, $Y^2$, $Y^4$, Z, $R^1$ to $R^3$, a, b, c, e, w, m, v, v', x and x' are as defined above. Of these compounds, titanium compounds, zirconium compounds and vanadium compounds are more preferable. Above all, the compounds represented by the formulae (VI) and (III) are particularly preferable, because of having a high polymerization activity.

The polymerization using the above-mentioned catalyst can be carried out by one-step polymerization or the following two-step polymerization in the presence of the catalytic components (a), (b) and (c). That is to say, ethylene is homopolymerized in the presence of the catalytic system comprising the components (b) and (c) to substantially produce a polymer, and the catalytic component (a) is then added to the polymerization system to continue the polymerization. According to this process, the control of a molecular weight distribution is possible, and a branching degree distribution can be changed. Therefore, a molecular design which can comply with the requirement of physical properties in a wide range is possible. Furthermore, in the two-step copolymerization, the polyethylene can be provided in which the amount of carbon-carbon unsaturated bonds in the produced polyethylene decreases and thermal stability is improved. On the other hand, the polyethylene obtained by the one-step polymerization is suitable for a material for a chemically modifiable ethylenic polymer, because of having relatively large unsaturated groups.

In the present invention, no particular restriction is put on a polymerization method for preparing the polyethylene, and there can be utilized a solvent polymerization method using an inert hydrocarbon or the like (a suspension polymerization or a solution polymerization), a bulk polymerization method in which the polymerization is carried out in the substantial absence of an inert hydrocarbon solvent, and a gaseous phase polymerization method.

Examples of a hydrocarbon solvent which can be used in the polymerization include saturated hydrocarbons such as butane, heptane, hexane, heptane, octane, nonane, decane, cyclopentane and cyclohexane; aromatic hydrocarbons such as benzene, toluene and xylene; and chlorine-containing solvents such as chloroform, dichloromethane, ethylene dichloride and chlorobenzene.

Polymerization temperature is usually in the range of −100 to 200° C., preferably −50 to 100° C., more preferably 0 to 100° C., and polymerization pressure is usually in the range of atmospheric pressure to 100 kg/cm$^2$, preferably atmospheric pressure to 50 kg/cm$^2$, more preferably atmospheric pressure to 20 kg/cm$^2$.

The control of the molecular weight of the obtained polymer is carried out by a usual means, for example, (1) hydrogen, (2) temperature, (3) a monomer concentration or (4) a catalyst concentration.

In a hydrogenation treatment of the polyethylene above obtained, a hydrogenation catalyst can be used. No particular restriction is put on the kind of hydrogenation catalyst, and there can be employed the catalysts previously mentioned in detail and catalysts which can usually be used at the time of the hydrogenation of an olefin compound. For example, the following catalysts can be mentioned.

Examples of a heterogeneous catalyst include nickel, palladium and platinum as well as solid catalysts obtained by supporting these metals on carriers such as carbon, silica, diatomaceous earth, alumina and titanium oxide, for example, nickel-silica, nickel-diatomaceous earth, palladium-carbon, palladium-silica, palladium-diatomaceous earth and palladium-alumina. Examples of the nickel catalyst include Raney nickel catalysts, and examples of the platinum catalyst include a platinum oxide catalyst and platinum black. Examples of a homogeneous catalyst include catalysts containing metals in the groups 8 to 10 of the periodic table as basic components, for example, catalysts comprising Ni and Co compounds and organic metallic compounds of metals selected from the groups 1, 2 and 3 of the periodic table such as cobalt naphthenate-triethylaluminum, cobalt octenoate-n-butyllithium, nickel acetylacetonato-triethylaluminum, and Rh compounds.

In addition, Ziegler hydrogenation catalysts disclosed by M. S. Saloan et al. [J. Am. Chem. Soc., 85, p. 4014 (1983)] can also effectively used. Examples of these catalysts include the following compounds.

Ti(O—iC$_3$H$_7$)$_4$—(iC$_4$H$_9$)$_3$Al,
Ti(O—iC$_3$H$_7$)$_4$—(C$_2$H$_5$)$_3$Al,
(C$_2$H$_5$)$_2$TiCl$_2$—(C$_2$H$_5$)$_3$Al,
Cr(acac)$_3$—(C$_2$H$_5$)$_3$Al
(wherein acac represents acetylacetonato),
Na(acac)—(iC$_4$H$_9$)$_3$Al,
Mn(acac)$_3$—(C$_2$H$_5$)$_3$Al,
Fe(acac)$_3$—(C$_2$H$_5$)$_3$Al,
Ca(acac)$_2$—(C$_2$H$_5$)$_3$Al, and
(C$_7$H$_5$COO)$_3$Co—(C$_2$H$_5$)$_3$Al.

The amount of the catalyst to be used in the hydrogenation step is suitably selected so that a molar ratio of the remaining unsaturated groups to the hydrogenation catalyst components in the polyethylene and (II) may be in the range of 107:1 to 10:1, preferably 106:1 to 102:1.

Furthermore, the charge pressure of hydrogen is suitably in the range of from atmospheric pressure to 50 kg/cm$^2$G. Besides, a reaction temperature is preferably on a higher side in the range in which the polyethylene obtained in the polymerization process do not decompose, and it is usually selected in the range of −100 to 300° C., preferably −50 to 200° C., more preferably 10 to 180° C.

Next, the present invention will be described in more detail with reference to examples, but the scope of the present invention should not be limited to these examples.

EXAMPLE 1

(1) Preparation of methylaluminoxane (MAO)

In a 500-ml glass container which had been purged with argon were placed 200 ml of toluene, 17.8 g (71 mmols) of copper sulfate pentahydrate (CuSO$_4$.5H$_2$O) and 24 ml (250 mmols) of trimethylaluminum, and the mixture was then reacted at 40° C. for 8 hours.

Afterward, from a solution obtained by removing solid components, toluene was further distilled off under reduced pressure to obtain 6.7 g of a catalytic product (methylaluminoxane).

(2) Preparation of catalytic component

A 100-ml egg-plant type flask was dried and purged with nitrogen, and 30 ml of toluene and 3.6 ml of an n-butyllithium solution in hexane (1.66 mol/l) were then placed in the flask, followed by cooling the solution to −78° C. Afterward, 0.56 g of cyclopentanol was added dropwise thereto, and the solution was then warmed up to −50° C. over 60 minutes.

Next, 26 ml of a pentamethylcyclopentadiene trichloride titanium solution in toluene (0.0769 mol/l) was added dropwise to the solution over 60 minutes. The solution was further warmed up to −25° C., and reaction was then carried out for 120 minutes. Afterward, the solution was warmed up to 20° C., and then allowed to stand for 24 hours.

The resultant reaction solution was light yellow, and a white precipitate of lithium chloride was produced on the bottom of the flask.

(3) Polymerization of ethylene

Under a nitrogen atmosphere, 300 ml of toluene and 60 mmol of methylaluminoxane prepared in the above-mentioned (1) were placed in a 1-liter flask equipped with a stirrer. Afterward, the solution was heated up to 60° C., and an ethylene gas was then introduced thereinto under atmospheric flow conditions. Next, 6.0 ml of the solution portion alone of the catalytic component prepared in the above-mentioned (2) was thrown into the flask.

Reaction temperature was controlled to 60° C., and polymerization was carried for 120 minutes while ethylene was continuously fed. After the completion of the polymerization, a large amount of methanol was thrown thereinto, and the resultant product was washed, and then dried under reduced pressure to obtain 8.5 g of a polyethylene.

(4) Evaluation of polyethylene (a) Measurement of Huggins coefficient

In 17.996 g of decalin was dispersed 0.1005 g of the polyethylene obtained in the above-mentioned (3), and the mixture was then molten at 135° C. The concentration of the polymer obtained in the case that the density of the decalin at 135° C. was 0.79055 g/ml was 0.4415 g/dl.

This polymer was transferred to a Ubbelode's viscometer, and after the temperature of the polymer had reached a constant temperature of 135° C., measurement was started. The measurement was repeated 6 times, and as a result, its average value was 3.043 dl/g in terms of a reduced viscosity.

Figure 3:
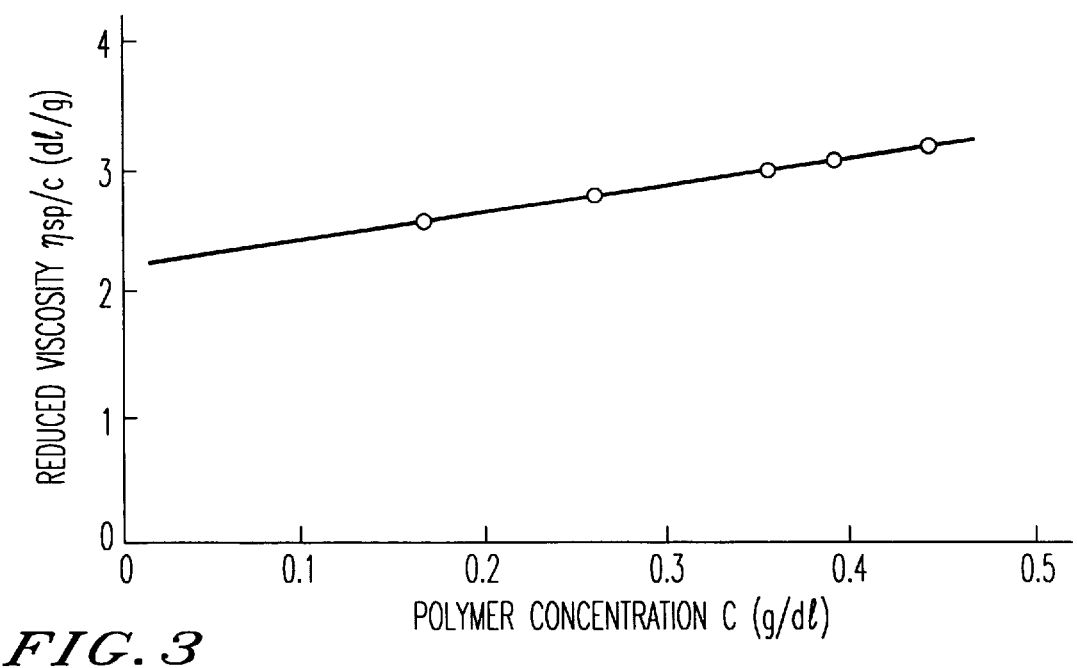
FIG. 3 is a graph showing the relation between the polymer concentration and the reduced viscosity in a polyethylene obtained in Example 1.

Furthermore, the reduced viscosity was measured at 5 points in the same manner as described above, while the polymer as a mother liquor was diluted with decalin. The relation between a polymer concentration [c] and the reduced viscosity is shown in FIG. 3.

A Huggins coefficient obtained at the 5 points was 0.412, and an intrinsic viscosity [η] was 2.18 dl/g. In addition, its coefficient of correlation was 0.999.

Moreover, a ratio of an HDPE having the same intrinsic viscosity [η] to the Huggins coefficient was 1.14.

(b) Measurement by NMR

The measurement of $^{13}$C-NMR [100 MHz, measurement temperature=130° C., solvent=1,2,4-trichlorobenzene/heavy benzene (molar ratio=8/2)] was carried out. As a result, any absorption of a methyl group having an ethyl branch at 11.14 ppm was not present. However, judging from a fact that methylene carbon at 38–39 ppm, methylene carbon at 34–36 ppm and the methyl group at 13.8–14.1 ppm are present in a polymer chain, it can be considered that a long chain branch is present. In addition, any absorption was not observed at 8.15 ppm, which makes it apparent that any quaternary carbon is not present.

Figure 4:
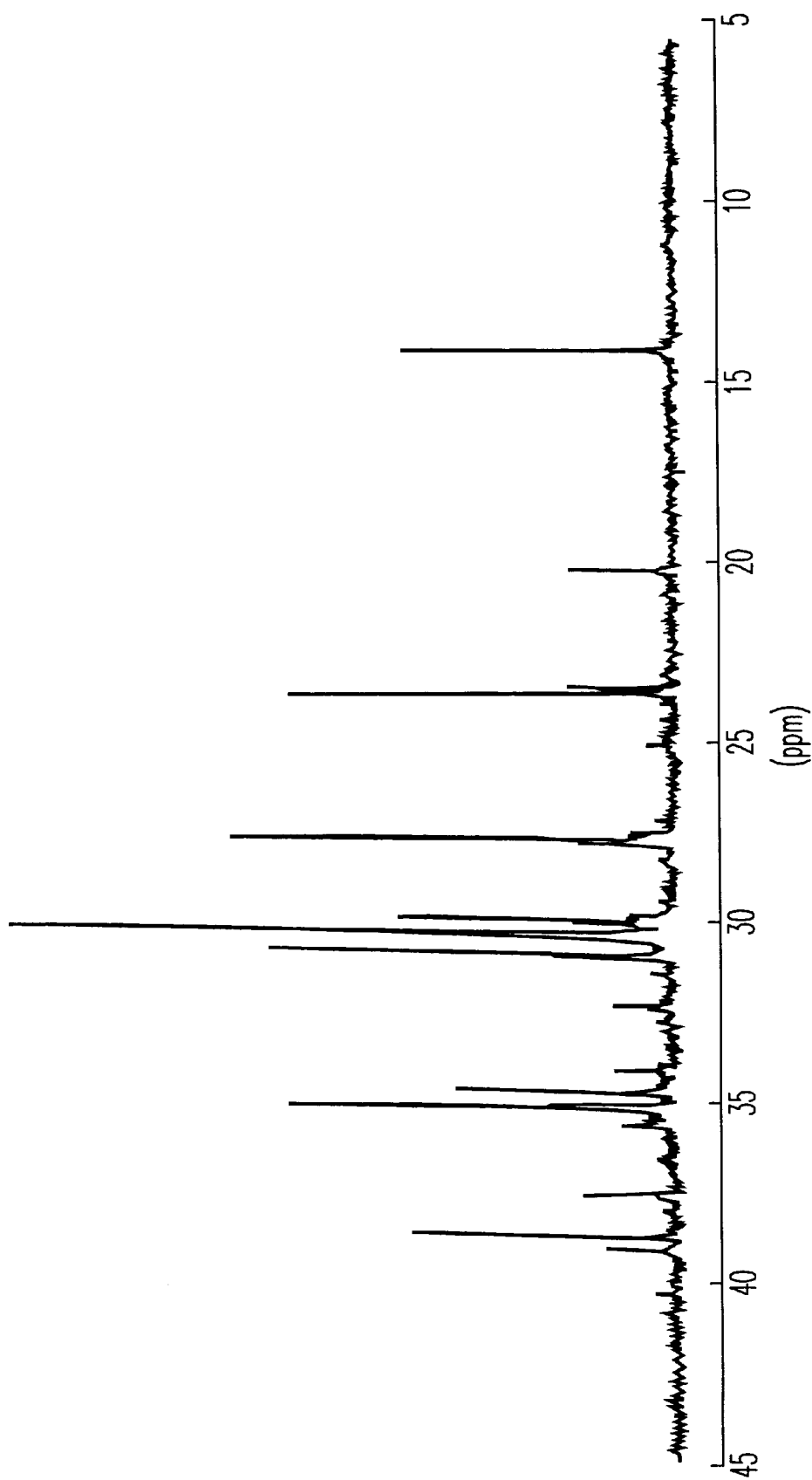
FIG. 4 shows a $^{13}$C-NMR spectrum of the polyethylene obtained in Example 1.

Furthermore, an absorption based on a butyl branch was observed at 29.57 ppm. A spectrum chart is shown in FIG. 4.

(c) Evaluation of thermal behavior

A sheet hot-pressed at a temperature of 190° C. was used as a sample, and measurement was made by the use of a differential scanning calorimeter DSC7 model made by Perkin Elmer Co., Ltd. That is to say, the crystallization enthalpy (ΔH) was calculated on the basis of an exothermic peak of crystallization observed at a time when the sheet was molten at a temperature of 150° C. for 5 minutes, and then cooled to −50° C. at a rate of 10° C./min. A melting point (Tm) was obtained from an endothermic peak observed at a time when the sheet was heated at a rate of 10° C./min.

As a result, the crystallization enthalpy (ΔH) was 5 J/g, and the melting point (Tm) was 121° C.

(d) Measurement of density

A sample molded by hot press at 190° C. was used, and measurement was made in accordance with a density gradient tube method. As a result, the density was 0.887 g/cm$^3$. In addition, the annealing treatment of the sample was not carried out.

(e) Measurement of terminal vinyl groups

A pressed sheet having a thickness of 100 μm was prepared, and a transmitted infrared absorption spectrum was measured. The number of terminal vinyl groups was calculated on the basis of an absorbance ($A_{907}$) based on the terminal vinyl groups in the vicinity of 907 cm$^{-1}$, a film thickness (t) and a resin density (d) in accordance with the equation $n = 0.114 A_{907}/[d \cdot t]$ wherein d=g/cm$^3$, t=mm, and n=the number of the vinyl groups with respect to 100 carbon atoms.

As a result, the number of the terminal vinyl groups was 0.2 with respect to 1,000 carbon atoms.

(f) Measurement of molecular weight distribution

A molecular weight in terms of the polyethylene was measured by the use of a device: Waters ALC/GPC150C, a column: TSK HM+GMH6×2 made by Toso Co., Ltd., a solvent: 1,2,4-trichlorobenzene, a temperature: 135° C. and a flow rate: 1.0 ml/min in accordance with a GPC method. As a result, a weight-average molecular weight (Mw) was 258,000, a number-average molecular weight (Mn) was 14,700, and an Mw/Mn was 17.6.

(g) Measurement of activation energy (Ea) of melt flow

The activation energy (Ea) of melt flow was measured by the use of a device RMS E-605 made by Rheometrics Co., Ltd. in accordance with the following procedure. That is to say, frequency dependences ($10^{-2}$ to $10^2$ rad/sec) of dynamic viscoelastic properties were measured at measurement temperatures of 150° C., 170° C., 190° C., 210° C. and 230° C., and the activation energy (Ea) was then calculated on the basis of the shift factors of G', G" at the respective temperatures and the reciprocal number of an absolute temperature in accordance with the Arrhenius' equation by the use of a temperature-time conversion rule in which 170° C. was used as a standard temperature.

As a result, the activation energy (Ea) was 12.1 kcal/mol. In this connection, the Ea of an HDPE was 6.3 kcal/mol [Polym. Eng. Sci., Vol. 8, p. 235 (1968)].

EXAMPLE 2

Under a nitrogen flow, 400 ml of toluene, 0.5 mmol of triisobutylaluminum and 10 mmol of methylaluminoxane prepared in Example 1-(1) were placed in a stainless steel autoclave, and the mixture was then heated up to 70° C. Afterward, 1.5 ml of the solution portion of the catalytic component prepared in Example 1 (2) was added thereto, and ethylene was continuously fed for 10 minutes under a pressure of 6 kg/cm$^2$G to polymerize ethylene.

After the completion of the polymerization, the pressure of ethylene was released, and a large amount of methanol was thrown thereinto. The solution was washed, and then dried to obtain 3.6 g of a polyethylene.

From the polyethylenes obtained in Examples 1 and 2, films were formed, and a tensile test was then carried out. The results are shown in Table 2. In addition, the results of evaluation are shown in Table 3.

TABLE 2

|  | Modulus of Elasticity (kg/cm$^2$) | Breaking Strength (kg/cm$^2$) | Breaking Extension (%) |
| --- | --- | --- | --- |
| Example 1 | 360 | 100 | 470 |
| Example 2 | 9,000 | 230 | 1,030 |

EXAMPLE 3

Figure 5:
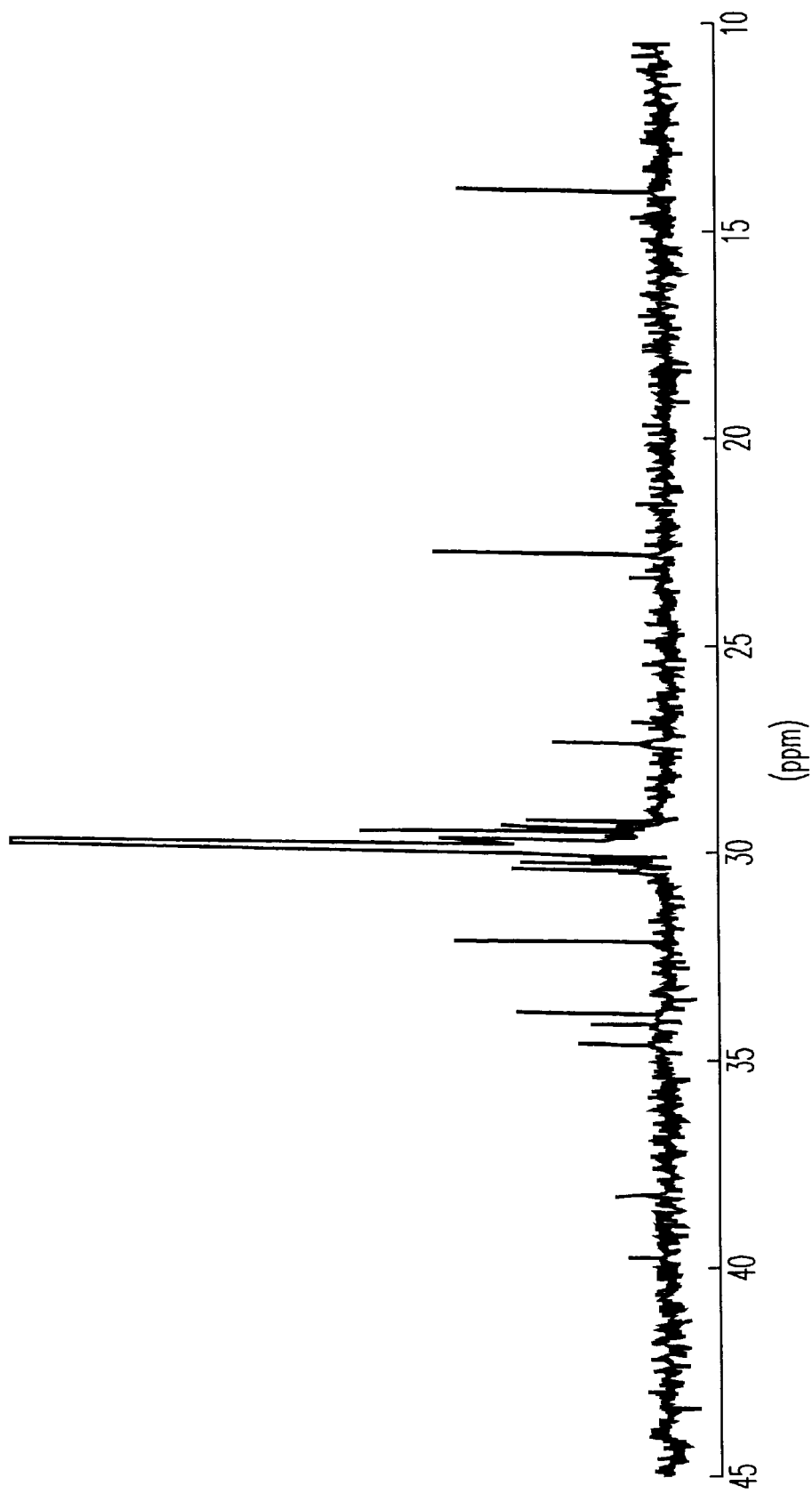
FIG. 5 shows a $^{13}$C-NMR spectrum of the polyethylene obtained in Example 3.

The same procedure as in Example 2 was carried out except that an ethylene feed pressure was set to 7.5 kg/cm$^2$G, to obtain 8.5 g of a polyethylene. The thus obtained polyethylene was evaluated, and the results are shown in Table 3. The $^{13}$C-NMR spectrum of the obtained polyethylene is shown in FIG. 5.

TABLE 3

|  | Example 2 | Example 3 |
| --- | --- | --- |
| Huggins Coefficient (Coefficient of correlation) | 0.799 (0.999) | 0.504 (0.999) |
| $^{13}$C-NMR | No absorption | No absorption |

TABLE 3-continued

|  | Example 2 | Example 3 |
|---|---|---|
|  | at 8.15 ppm and 11.14 ppm Absorption was present at 29.57 ppm. | at 8.15 ppm and 11.14 ppm Absorption was present at 29.57 ppm. |
| Melting Point (° C.) | 124.0 | 125.2 |
| Crystallization Enthalpy (J/g) | 191.2 | 200.2 |
| Density (g/cm$^3$) | 0.957 | 0.958 |
| Terminal vinyl groups (to 1000 carbon atoms) | 4.5 | 3.7 |
| Mw/Mn[1] | 21.6 | 30.7 |
| Intrinsic Viscosity [η] (dl/g) | 1.07 | 1.20 |
| k/k'[2] | 2.75 | 1.71 |
| Activation Energy of Melt Flow | 11.5 | 11.2 |

The activation energy of melt flow: kcal/mol.
Notes:
[1] Mw/Mn = Weight-average molecular weight/number-average molecular weight.
[2] The ratio between the Huggins coefficients of the polyethylene and an HDPE under conditions of the same [η].

EXAMPLE 4

The polyethylene obtained in Example 2 was hydrogenated under conditions of a temperature of 140° C., a polyethylene concentration of 9% by weight, a hydrogen pressure of 30 kg/cm$^2$G, a carbon-supporting ruthenium catalyst (a Ru content=5% by weight) concentration of 4% by weight and a reaction time of 6 hours in a decalin solvent, and the obtained polymer was then isolated from the reaction solution.

From this polymer, a pressed sheet having a thickness of 300 μm was formed, and an infrared absorption spectrum was then measured. As a result, any absorption of unsaturated groups present in the range of 885 to 970 cm$^{-1}$ was not observed.

EXAMPLE 5

(1) Preparation of catalytic component

A titanium catalytic component was prepared in the same manner as in Example 1-(2).

(2) Polymerization of ethylene

Under a nitrogen flow, 200 ml of toluene, 4 mmol of triisobutylaluminum (TIBA), 0.4 mmol of a boron compound [Me$_2$PhNH][B(C$_6$F$_5$)$_4$] and 0.05 mmol, in terms of titanium, of titanium catalytic component prepared in the above-mentioned (1) were placed in a stainless steel autoclave, and the mixture was then heated up to 30° C. Afterward, ethylene was continuously fed for 60 minutes to polymerize ethylene.

After the completion of the polymerization, the polymer was thrown into a large amount of methanol, and the solution was washed, and then dried to obtain 5.0 g of a polyethylene. The procedures and the results of the evaluation of the obtained polyethylene will be described hereinafter. Moreover, polymerization conditions and the evaluation results are shown in FIGS. 4 and 5.

(3) Evaluation of polyethylene (a) Measurement by NMR

The measurement of $^1$H-NMR [400 MHz, measurement temperature=130° C., solvent=1,2,4-trichlorobenzene/heavy benzene (molar ratio=8/2)] was carried out. As a result, a molar ratio of [CH$_3$/CH$_2$] calculated on the basis of an integrated value of the absorption of a methyl group at 0.8–1.0 ppm and the absorption of a methylene group at 1.2–1.4 ppm was 0.007. Furthermore, $^{13}$C-NMR was measured in the same manner, and as a result, any absorption was not observed at 8.15 ppm of a methyl group in the vicinity of quaternary carbon which was observed in an LDPE.

(b) Evaluation of thermal behavior

A sheet hot-pressed at a temperature of 190° C. was used as a sample, and measurement was made by the use of a differential scanning calorimeter DSC7 model made by Perkin Elmer Co., Ltd. That is to say, a melting point (Tm) was obtained from an endothermic peak observed at a time when the sheet was molten at a temperature of 150° C. for 5 minutes, cooled to −50° C. at a rate of 10° C./min, and then heated at a rate of 10° C./min.

As a result, the melting point (Tm) was 131.1° C.

(c) Measurement of density

Measurement was made in the same manner as in Example 1-(4)-(d). As a result, the density was 0.945 g/cm$^3$. In addition, the annealing treatment of the sample was not carried out.

(d) Measurement of molecular weight distribution

Measurement was carried out in the same manner as in Example 1-(4)-(f), and as a result, a weight-average molecular weight (Mw) was 210,000, a number-average molecular weight (Mn) was 46,600, and an Mw/Mn ratio was 4.5.

(e) Measurement of activation energy (Ea) of melt flow

Measurement was carried out in the same manner as in Example 1-(4)-(g), and as a result, an activation energy (Ea) was 12.5 kcal/mol.

EXAMPLE 6

(1) Preparation of methylaluminoxane (MAO)

The same procedure as in Example 1-(1) was repeated to obtain 6.7 g of a catalytic product (methylaluminoxane), and the product was then subjected to a heat treatment at 120° C. for 10 hours under reduced pressure to dissolved and disperse the same in toluene.

(2) Preparation of catalytic component

The same procedure as in Example 1-(2) was repeated except that cyclopentanol in Example 1-(2) was replaced with 0.38 g of isopropanol, to prepare a catalytic component.

(3) Polymerization of ethylene

The same procedure as in Example 5-(2) was carried out under conditions shown in Table 4 to prepare a polyethylene. Polymerization conditions and evaluation results are shown in Tables 4 and 5.

EXAMPLES 7 AND 8

Ethylene was polymerized under conditions shown in Table 4 to prepare a polyethylene, followed by evaluation. The results are shown in Table 5.

TABLE 4

| | Toluene (ml) | TIBA (mmol) | [B] (mmol) | MAO (mmol) | Transition Metal Components Kind | mmol |
|---|---|---|---|---|---|---|
| Example 5 | 200 | 4 | 0.4 | — | Titanium component (I) | 0.2 |
| Example 6 | 300 | — | — | 60 | Titanium component (II) | 0.3 |
| Example 7 | 300 | — | — | 60 | Titanium component (II) | 0.3 |
| | | | | | Zirconium component | 0.001 |
| Example 8 | 300 | — | — | 60 | Titanium component (II) | 0.3 |
| | | | | | Zirconium component | 0.002 |

| | Ethylene Pressure ($kg/cm^2G$) | Temperature (° C.) | Time (min) | Yield (g) |
|---|---|---|---|---|
| Example 5 | Flowable | 30 | 60 | 5.0 |
| Example 6 | Flowable | 60 | 60 | 8.4 |
| Example 7 | Flowable | 60 | 60 | 20.7 |
| Example 8 | Flowable | 60 | 60 | 29.5 |

(Notes)
[B]: [$Me_2PhNH$][$B(C_6F_5)_4$].
Titanium component [I]: Catalyst prepared in Example 5-(1).
Titanium component [II]: Catalyst prepared in Example 6-(1).
Zirconium component: $Et[Ind]_2ZrCl_2$.

TABLE 5

| | Density ($g/cm^3$) | Branching Degree | Weight-Average Molecular Weight [Mw] | Molecular Weight Distribution [Mw/Mn] |
|---|---|---|---|---|
| Example 5 | 0.945 | 0.007 | 210,000 | 4.5 |
| Example 6 | 0.890 | 0.062 | 265,000 | 2.9 |
| Example 7 | 0.922 | 0.045 | 178,000 | 2.2 |
| Example 8 | 0.935 | 0.017 | 165,000 | 2.2 |

| | Activation Energy of Melt Flow [Ea] (kcal/mol) | Melting Point (° C.) |
|---|---|---|
| Example 5 | 12.5 | 131.1 |
| Example 6 | 12.5 | 125.9 |
| Example 7 | 12.0 | 117.9 |
| Example 8 | 11.8 | 123.0 |

(Note)
The branching degree: A [$CH_3/CH_2$] molar ratio calculated by $^1$H-NMR.

EXAMPLE 9

The polyethylene obtained in Example 7 was hydrogenated under conditions of a temperature of 140° C., a polyethylene concentration of 9% by weight, a hydrogen pressure of 30 $kg/cm^2G$, a carbon-supporting ruthenium catalyst (a Ru content=5% by weight) concentration of 4% by weight and a reaction time of 6 hours in a decalin solvent, and the obtained polymer was then isolated from the reaction solution.

From this polymer, a pressed sheet having a thickness of 300 μm was formed, and an infrared absorption spectrum was then measured. As a result, any absorption of unsaturated groups present in the range of 885 to 970 $cm^{-1}$ was not observed.

In addition, density, molecular weight, a melting point and fluid activation energy were the same as in Example 7.

COMPARATIVE EXAMPLE 1

An ethylene/1-octene copolymer was prepared under conditions shown in Table 6, and polymerization conditions and evaluation results are shown in Tables 6 and 7.

TABLE 6

| | Comp. Example 1 |
|---|---|
| Toluene (ml) | 400 |
| MAO (mmol) | 3 |
| Transition Metal Component (mmol) | Titanium Component (III) 1 |
| Ethylene Pressure ($kg/cm^2G$) | 8 |
| Temperature (° C.) | 80 |
| Time (min) | 20 |
| Yield (g) | 57.5 |

(Note)
1-octene: 40 ml.
Titanium component [III]: (tertiary butylamido)dimethyl(tetramethyl-$\eta^5$-cyclopentadienyl)silanetitanium dichloride.

TABLE 7

| | Comp. Example 1 |
|---|---|
| Density ($g/cm^3$) | 0.868 |
| Branching Degree | 0.052 |
| Weight-Average Molecular Weight [Mw] | 230,000 |
| Molecular Weight Distribution [Mw/Mn] | 9.9 |
| Activation Energy of Melt Flow [Ea] (kcal/mol) | 7.5 |
| Melting Point (° C.) | 56.4 |

EXAMPLE 10

(1) Preparation of Methylaluminoxane (MAO)

The same procedure as in Example 1-(1) was repeated to obtain 6.7 g of a catalytic product (methylaluminoxane).

(2) Preparation of titanium catalytic component

A titanium catalytic component was prepared in the same manner as in Example 1-(2).

(3) Preparation of catalytic component

A 50-ml flask was dried and purged with nitrogen, and 20 ml of toluene, 0.1 ml of the titanium catalytic component prepared in the above-mentioned (2) and 0.02 mmol of (tertiary butylamido)dimethyl(tetramethyl-$\eta^5$-cyclopentadienyl)silanetitanium dichloride were placed in the flask, followed by stirring at 25° C. Afterward, 0.6 mmol of methylaluminoxane prepared in the above-mentioned (1) was added, and reaction was then carried out for 2 hours.

The resultant reaction product was used as the catalytic component.

(4) Preparation of polyethylene

In a 1-liter stainless steel pressure-resistant autoclave were placed 600 ml of toluene, 15 mmol of the methylaluminoxane prepared in the above-mentioned (1) and 0.3 mmol of triisobutylaluminum (TIBA), and the mixture was then heated up to 90° C. Afterward, 0.036 mmol, in terms of titanium, of the catalytic component prepared in the above-mentioned (3) was added thereto.

Next, ethylene was continuously fed to the autoclave under a pressure of 3.2 kg/cm$^2$G to carry out polymerization reaction for 60 minutes.

After the completion of the polymerization reaction, the pressure was released, and the resultant polyethylene was collected, washed with methanol, and then dried to obtain 35 g of the polyethylene.

(5) Evaluation of polyethylene (a) Measurement of density

Measurement was made in the same manner as in Example 1-(4)-(d). As a result, the density was 0.928 g/cm$^3$. In addition, the annealing treatment of the sample was not carried out.

(b) Measurement of molecular weight distribution

Measurement was carried out in the same manner as in Example 1-(4)-(f), and as a result, a weight-average molecular weight (Mw) was 85,000, a number-average molecular weight (Mn) was 25,000, and an Mw/Mn was 3.4.

(c) Measurement of activation energy (Ea) of melt flow

Measurement was carried out in the same manner as in Example 1-(4)-(g), and as a result, an activation energy (Ea) was 12.1 kcal/mol.

(d) Measurement of die swell ratio

A die swell ratio (DR) was obtained as ($D_1/D_0$) by measuring a diameter ($D_1$, mm) of a strand formed by extrusion through a capillary nozzle [diameter ($D_0$)=1.275 mm, length (L)=51.03 mm, L/$D_0$=40, and entrance angle=90°] at an extrusion speed of 1.5 mm/min (shear rate=10 sec$^{-1}$) at a temperature of 190° C. by the use of a capillograph made by Toyo Seiki Seisakusho Co., Ltd., and then dividing this diameter by the diameter of the capillary nozzle.

The diameter ($D_1$) of the strand was an average value of values obtained by measuring long axes and short axes of central portions of 5 samples having a extruded strand length of 5 cm (a length of 5 cm from a nozzle outlet).

As a result, the die swell ratio was 1.41.

(e) Measurement by NMR

The measurement of $^{13}$C-NMR was carried out, and as a result, any absorption was not observed at 8.15 ppm of a methyl group in the vicinity of quaternary carbon which was observed in an LDPE.

EXAMPLE 11

(1) Preparation of titanium catalytic component

A 100-ml egg-plant type flask was dried and purged with nitrogen, and 30 ml of toluene and 3.6 ml of an n-butyllithium solution in hexane (1.66 mols/l) were then placed in the flask, followed by cooling the solution to −78° C. Afterward, 0.49 g of n-butanol was added dropwise thereto, and the solution was then warmed up to −50° C. over 60 minutes.

Next, 26 ml of a pentamethylcyclopentadiene trichloride titanium solution in toluene (0.0769 mol/l) was added dropwise to the solution over 60 minutes. The solution was further warmed up to −25° C., and reaction was then carried out for 120 minutes. Afterward, the solution was warmed up to 20° C., and then allowed to stand for 24 hours.

The resultant reaction solution was light yellow, and a white precipitate of lithium chloride was produced on the bottom of the flask.

(2) Preparation of catalytic component

The same procedure as in Example 10-(3) was repeated except that the titanium catalytic component obtained in Example 10-(2) was replaced with 0.25 mmol of the titanium catalytic component obtained in the above-mentioned (1) and 0.01 mmol of (tertiary butylamido)dimethyl (tetramethyl-η$^5$-cyclopentadienyl)silanetitanium dichloride and 0.8 mmol of methylaluminoxane were used, thereby preparing a catalytic component.

(3) Preparation of polyethylene

The same procedure as in Example 10-(4) was carried out under conditions shown in Table 8 to prepare a polyethylene. The results are shown in Table 8.

COMPARATIVE EXAMPLE 2

A polyethylene was prepared under conditions shown in Table 8. The results are shown in Table 8.

TABLE 8

|  | Example 11 | Comp. Example 1 |
|---|---|---|
| Toluene (ml) | 400 | 400 |
| MAO (mmol) | 30 | 10 |
| Catalyst (mmol) | 0.26 | 0.01 |
| Temperature (° C.) | 90 | 150 |
| Ethylene (kg/cm$^2$G) | 3 | 8 |
| Time (min) | 60 | 30 |
| Yield (g) | 45.9 | 42.7 |
| Density (g/cm$^3$) | 0.912 | 0.962 |
| Weight-Average Molecular Weight [Mw] | 60,000 | 71,400 |
| Molecular Weight Distribution [Mw/Mn] | 3.7 | 3.4 |
| Activation Energy of Melt Flow [Ea] (kcal/mol) | 12.5 | 11.5 |
| Die Swell Ratio [$D_R$] | 1.35 | 1.06 |

MAO: Methylaluminoxane.
Catalyst of Example 11: Catalytic component prepared in Example 11-(2).
Catalyst of Comparative Example 2: (Tertiary butylamido)dimethyl (tetramethyl-η$^5$-cyclopentadienyl)silanetitanium dichloride.
(Note) In both of Example 11 and Comparative Example 2, the measured results of $^{13}$C-NMR indicate that any absorption was not present at 8.15 ppm.

EXAMPLE 12

The polyethylene obtained in Example 10 was hydrogenated under conditions of a temperature of 140° C., a polyethylene concentration of 9% by weight, a hydrogen pressure of 30 kg/cm$^2$G, a carbon-supporting ruthenium catalyst (a Ru content=5% by weight) concentration of 4% by weight and a reaction time of 6 hours in a decalin solvent, and the obtained polymer was then isolated from the reaction solution.

From this polymer, a pressed sheet having a thickness of 300 μm was formed, and an infrared absorption spectrum was then measured. As a result, any absorption of unsaturated groups present in the range of 885 to 970 cm$^{-1}$ was not observed.

In addition, density, molecular weight, a melting point and fluid activation energy were the same as in Example 10.

EXAMPLE 13

(1) Preparation of methylaluminoxane (MAO)

The same procedure as in Example 1-(1) was repeated to obtain 6.7 g of a catalytic product (methylaluminoxane).

(2) Preparation of catalytic component

A titanium catalytic component was prepared in the same manner as in Example 11-(1).

(3) Polymerization of ethylene

Under a nitrogen atmosphere, 300 ml of toluene and 30 mmol of methylaluminoxane prepared in the above-mentioned (1) were placed in a 1-liter flask equipped with a stirrer. Afterward, the solution was heated up to 60° C., and an ethylene gas was then introduced thereinto under atmospheric flow conditions. Next, 6.0 ml (0.2 mmol) of the solution portion alone of the catalytic component prepared in the above-mentioned (2) was thrown into the flask.

Reaction temperature was controlled to 60° C., and polymerization was carried for 120 minutes while ethylene was continuously fed. After the completion of the polymerization, a large amount of methanol was thrown thereinto, and the resultant product was washed, and then dried under reduced pressure to obtain 10.2 g of a polyethylene.

(4) Evaluation of polyethylene (a) Measurement of density

Measurement was made in the same manner as in Example 1-(4)-(d). As a result, the density was 0.887 g/cm³. In addition, the annealing treatment of the sample was not carried out.

(b) Measurement of molecular weight distribution

Measurement was carried out in the same manner as in Example 1-(4)-(f), and as a result, a ratio Mw/Mn of a weight-average molecular weight to a number-average molecular weight was 3.05, and the weight-average molecular weight (Mw) was 114,000.

(c) Analysis of structure by NMR

The measurement of $^{13}$C-NMR [measurement temperature =130° C., solvent 1,2,4-trichlorobenzene/heavy benzene (molar ratio=8/2), and 100 MHz] was carried out. As a result, any absorption was not observed at 8.15 ppm of a methyl group in the vicinity of quaternary carbon which was observed in an LDPE.

(d) Measurement of activation energy (Ea) of melt flow

Measurement was carried out in the same manner as in Example 1-(4)-(g), and as a result, an activation energy (Ea) was 12.8 kcal/mol.

(e) Measurement of solid viscoelasticity: Measurement of β-relaxation peak (area)

(1) In general, when the temperature dispersion of the solid viscoelasticity of the polyethylene is measured, as dispersion peaks of its temperature dispersion behavior, there are mainly observed (a) an α-relaxation (at about 60° C.) caused by molecular motion in a crystal region, (b) a β-relaxation (at about −50 to −20° C.) which is the so-called main dispersion caused by the segment motion of the main chain containing branch points in an amorphous region, and (c) a γ-relaxation (at about −130 to −100° C.) which is caused by the amorphous region or the irregular portions of crystals.

In the meantime, the β-relaxation which is the main dispersion cannot be observed in a usual ethylene homopolymer, but it can be observed in an ethylene/an α-olefin copolymer or a polyethylene having a long chain branch. Hence, much attention was here paid to the β-relaxation which was the main dispersion, and the comparison was made.

(2) With regard to the solid viscoelasticity of a sample, a storage elastic modulus (E'), a loss elastic modulus (E") and a dissipation ratio (tanδ) were calculated on the basis of the temperature dispersion behavior in a temperature range of −150 to 200° C. under conditions of a frequency of 1 Hz and a strain quantity of 0.15% by the use of an RSA-II model made by Leometric Co., Ltd. (FIG. 6).

Figure 6:
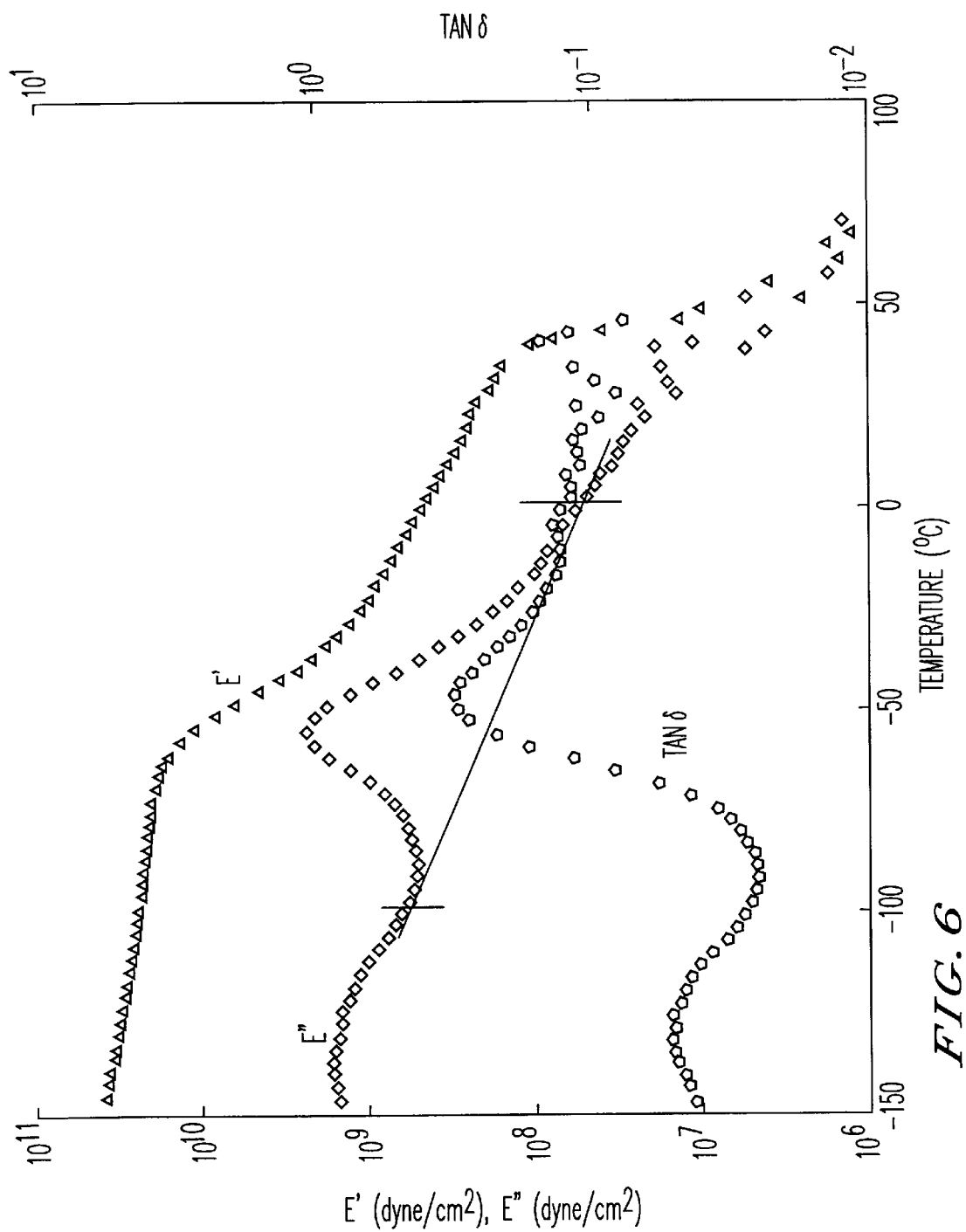
FIG. 6 shows the temperature dispersion behavior of solid viscoelasticity of the polyethylene obtained in Example 13.

(3) From the temperature dispersion behavior of the solid viscoelasticity shown in FIG. 6, the β-relaxation peak of a loss elastic modulus (E") curve is obtained by determining a temperature range (−100 to 0° C.), reading its area by a digitizer, and then referring to a graphic measurement program (MEAS1). The size of this area was calculated on the basis of a plotted drawing having an abscissa axis temperature of −150 to 100° C. and an ordinate axis E', E" of 1×10⁶ to 1×10¹¹ dyne/cm² (5 decay) obtained by the above-mentioned measuring device. As a result, the area of the β-relaxation peak was 23.1.

Furthermore, a β-relaxation peak temperature was −56.5° C., and at this temperature, the storage elastic modulus (E') was 9.96×10⁹ dyne/cm², the loss elastic modulus (E") was 2.1×10⁹ dyne/cm², and the dissipation ratio (tanδ) was 0.211.

EXAMPLES 14, 15 AND COMPARATIVE EXAMPLES 3, 4

The polymerization of ethylene was carried out under conditions shown in Table 9 to prepare a polyethylene, and its evaluation was then made. The results are shown in Table 10. Furthermore, the measured values of solid viscoelasticity are shown in Table 11.

Figure 7:
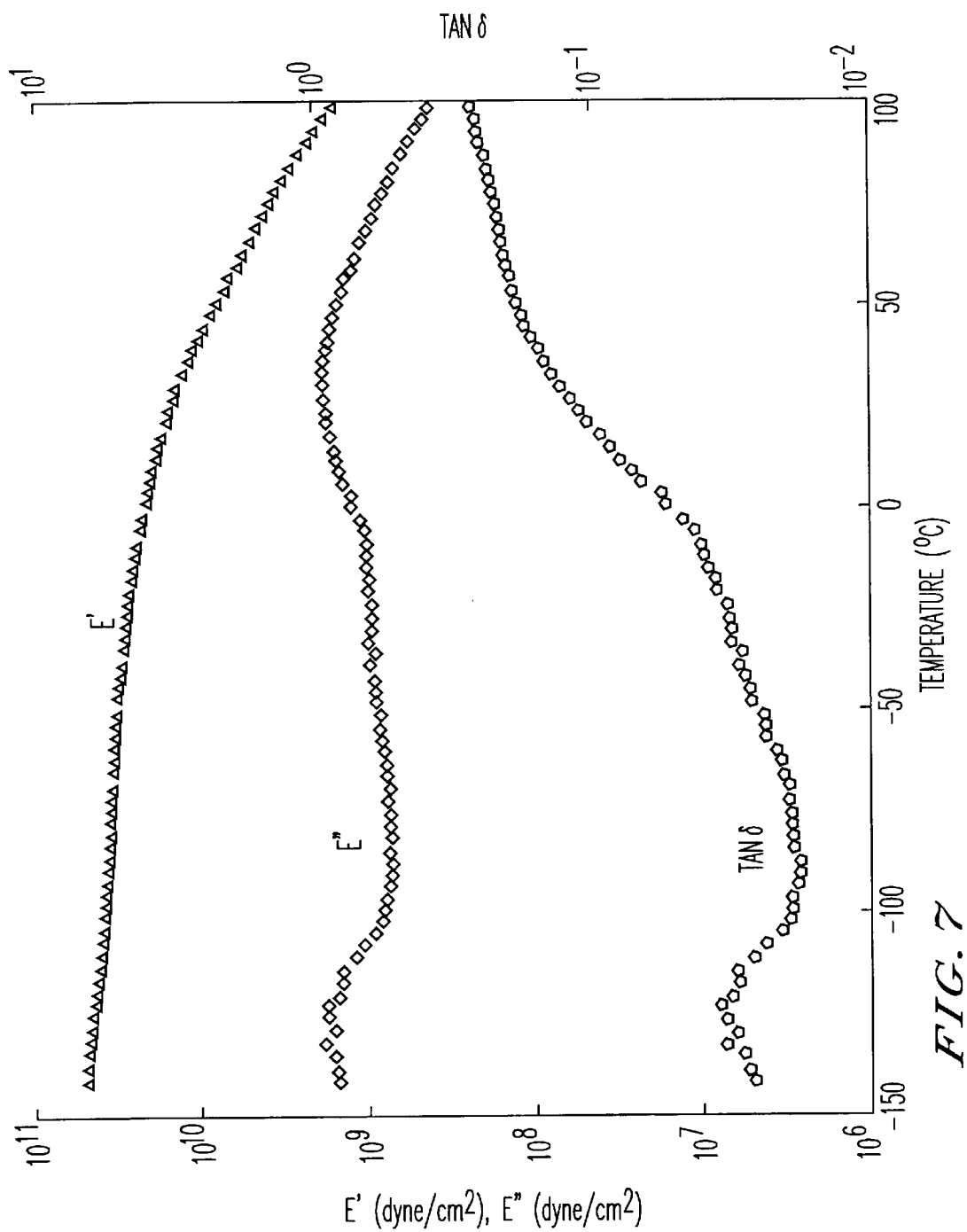
FIG. 7 shows the temperature dispersion behavior of solid viscoelasticity of the polyethylene obtained in Comparative Example 3.

FIG. 7 shows the temperature dispersion behavior of the solid viscoelasticity of the polyethylene (the straight-chain polyethylene) of Comparative Example 3.

As understood from this drawing, the β-relaxation peak which was the main dispersion was not observed.

TABLE 9

| | (I) | | | |
|---|---|---|---|---|
| | Toluene (ml) | MAO[1] (mmol) | Transition Metal Component Kind | (mmol) |
| Example 14 | 100 | 20 | Titanium component[2] | 0.1 |
| | | | Zirconium component[3] | 0.00067 |
| Example 15 | 400 | 10 | Titanium component[2] | 0.05 |
| | | | Titanium component[4] | 0.002 |
| Comp. Ex. 3 | 100 | 20 | Zirconium component[3] | 0.00067 |
| Comp. Ex. 4 | 400 | 10 | Titanium component[4] | 0.002 |

| | (II) | | | |
|---|---|---|---|---|
| | Ethylene Pressure (kg/cm²G) | Temperature (° C.) | Time (min) | Yield (g) |
| Example 14 | Atmospheric pressure | 60 | 70 | 15.4 |

TABLE 9-continued

| | | | | |
|---|---|---|---|---|
| Example 15 | 6 | 70 | 60 | 59.6 |
| Comp. Ex. 3 | Atmospheric pressure | 60 | 70 | 13.2 |
| Comp. Ex. 4 | 6 | 70 | 60 | 25.0 |

(Notes) [1]MAO: Methylaluminoxane prepared in Example 13-(1).
[2]Titanium catalytic component prepared in Example 13-(2).
[3]Ethylenebisindenylzirconium dichloride.
[4](Tertiary butylamido)dimethyl(tetramethyl-$\eta^5$-cyclopentadienyl) silanetitanium dichloride.

TABLE 10

| (I) | | | | |
|---|---|---|---|---|
| | Density (g/cm$^3$) | Weight-Average Molecular Weight [Mw] | Molecular Weight Distribution [Mw/Mn] | Structure Analysis by NMR |
| Example 14 | 0.889 | 258,000 | 5.0 | A |
| Example 15 | 0.925 | 148,500 | 2.9 | A |
| Comp. Ex. 3 | 0.960 | 232,000 | 6.9 | A |
| Comp. Ex. 4 | 0.958 | 86,000 | 3.0 | A |

| (II) | | | |
|---|---|---|---|
| | Melting Point (° C.) | Activation Energy of Melt Flow [Ea] (kcal/mol) | Area of β-relaxation Peak |
| Example 14 | 70, 121 | 13.5 | 22.8 |
| Example 15 | 118.5 | 12.0 | 1.6 |
| Comp. Ex. 3 | 132.0 | 6.3 | — |
| Comp. Ex. 4 | 129.0 | 7.5 | — |

(Note) A: No absorption was present at 8.15 ppm.

TABLE 11

| | Temp. of β-relaxation Peak (° C.) | Storage Elastic Modulus (E') (dyne/cm$^2$) | Loss Elastic Modulus (E") (dyne/cm$^2$) | Dissipation Ratio (tanδ) |
|---|---|---|---|---|
| Example 14 | −53.4 | 9.8 × 10$^9$ | 1.95 × 10$^9$ | 0.199 |
| Example 15 | −11.6 | 1.14 × 10$^{10}$ | 7.9 × 10$^8$ | 0.07 |

EXAMPLE 16

(1) Preparation of methylaluminoxane (MAO)

The same procedure as in Example 1-(1) was repeated to obtain 6.7 g of a catalytic product (methylaluminoxane).

(2) Preparation of catalytic component

A titanium catalytic component was prepared in the same manner as in Example 1-(2).

(3) Preparation of polyethylene

Under a nitrogen atmosphere, 400 ml of toluene and 0.25 mml of a trisobutylaluminum in toluene (2 mols/l) were placed in a 1-liter pressure-resistant autoclave equipped with a stirrer, followed by stirring at 20° C. for 5 minutes. Afterward, 10 mmol of methylaluminoxane prepared in the above-mentioned (1) was added thereto, and the solution was then heated up to 70° C. Next, 1.5 ml of the titanium catalytic component prepared in the above-mentioned (2) and 2 μmol of (tertiary butylamido)dimethyl(tetramethyl-$\eta^5$-cyclopentadienyl)silanetitanium dichloride were added to the solution, and ethylene was then fed under a partial pressure of 6 kg/cm$^3$G to start polymerization. The reaction was carried out at 70° C. for 30 minutes, while the total pressure was constantly maintained.

(4) Evaluation of polyethylene (a) Evaluation of thermal behavior

Measurement was carried out in the same manner as in Example 1-(4)-(c), and as a result, crystallization enthalpy (ΔH) was 131 J/g, and the melting point (Tm) was 118.5° C.

(d) Measurement of density

Measurement was made in the same manner as in Example 1-(4)-(d), and as a result, density was 0.925 g/cm$^3$. In addition, the annealing treatment of the sample was not carried out.

(c) Measurement of molecular weight distribution

Measurement was carried out in the same manner as in Example 1-(4)-(f), and as a result, a ratio Mw/Mn of a weight-average molecular weight to a number-average molecular weight was 2.85.

(d) Measurement of intrinsic viscosity

An intrinsic viscosity was measured in decalin at 135° C., and as a result, the intrinsic viscosity [η] was 2.41 dl/g.

In this connection, physical properties of the polyethylene are shown in Table 12.

EXAMPLE 17

The same procedure as in Example 16-(3) was repeated except that the titanium catalytic component prepared in Example 16-(2) was replaced with 0.01 imol of titanocene dichloride, polymerization temperature was set to 80° C. and an ethylene feed pressure was set to 6.2 kg/cm$^3$G, thereby preparing a polyethylene.

Mechanical properties and evaluation results are shown in Tables 12 and 13.

EXAMPLE 18

Under a nitrogen atmosphere, 400 ml of toluene and 0.25 mml of a trisobutylaluminum solution in toluene (2 mols/l) were placed in a 1-liter pressure-resistant glass autoclave equipped with a stirrer, followed by stirring at 20° C. for 5 minutes. Afterward, 10 mmol of methylaluminoxane prepared in Example 16-(1) was added thereto, and the solution was then heated up to 70° C. Next, 0.01 mmol of titanocene dichloride was added to the solution, and ethylene was then fed under a partial pressure of 4 kg/cm$^3$G to start polymerization. The reaction was carried out at 70° C. for 20 minutes, while the total pressure was constantly maintained. Afterward, while the solution was maintained at 70° C., pressure was released, and a part of the resultant polymerization reaction product was taken out with a syringe and then thrown into methanol. As a result, the formation of a white polymer was confirmed.

Furthermore, 2 micromols of (tertiary butylamido)-dimethyl(tetramethyl-$\eta^5$-cyclopentadienyl)silanetitanium dichloride was added to the reaction system, and ethylene was then fed under a partial pressure of 6 kg/cm$^3$G and polymerization was carried out at 70° C. for 30 minutes, while the total pressure was constantly maintained. After the completion of the polymerization, the polymer was collected in the same way as in Example 16-(3).

Mechanical properties and evaluation results are shown in Tables 12 and 13.

EXAMPLE 19

The same procedure as in Example 16-(3) was carried out except that aluminoxane was replaced with 25 μmol of anilinium tetrakis(pentafluorophenyl)borate and the titanium compound prepared in Example 16-(2) was replaced with 0.01 mmol of titanocene dichloride, thereby preparing a polyethylene. The results are shown in Table 13.

EXAMPLE 20

The same procedure as in Example 16-(3) was carried out except that polymerization time was set to 15 minutes. Afterward, the pressure of unreacted ethylene was released, and the remaining ethylene was then removed by the use of nitrogen. Next, a hydrogen pressure of 6 kg/cm$^2$G was applied, and while the pressure was maintained, reaction was carried out for 5 hours. After the completion of the hydrogenation treatment, the pressure was released, and the same procedure as in Example 16-(3) was repeated to obtain the polyethylene. The results are shown in Table 13.

EXAMPLE 21

The same procedure as in Example 16-(3) was carried out except that (tertiary butylamido)dimethyl(tetramethyl-$\eta^5$-cyclopentadienyl)silanetitanium dichloride was replaced with 0.1 micromol of ethylenebisindenylzirconium dichloride [Et(Ind)$_2$ZrCl$_2$], thereby preparing a polyethylene.

Mechanical properties and evaluation results are shown in Tables 12 and 13.

COMPARATIVE EXAMPLE 5

The same procedure as in Example 16-(3) was carried out except that the titanium compound prepared in Example 16-(2) was not used, thereby preparing a polyethylene. The results are shown in Table 13.

TABLE 12

|  | Modulus of Elasticity (kg/cm$^2$) | Breaking Strength (kg/cm$^2$) | Breaking Extension (%) |
|---|---|---|---|
| Example 16 | 3,900 | 480 | 640 |
| Example 17 | 10,600 | 330 | 670 |
| Example 18 | 13,100 | 330 | 950 |
| Example 19 | 6,800 | 330 | 750 |

TABLE 13

(I)

|  | Yield (g) | Melting Point (° C.) | Density (g/cm$^3$) |
|---|---|---|---|
| Example 16 | 45.7 | 118.5 | 0.925 |
| Example 17 | 46.0 | 135.0 | 0.952 |
| Example 18 | 37.0 | 132.3 | 0.958 |
| Example 19 | 18.4 | 133.6 | 0.945 |
| Example 20 | 22.9 | 118.3 | 0.924 |
| Example 21 | 45.6 | 127.2 | 0.940 |
| Comp. Ex. 5 | 30.8 | 138.0 | 0.962 |

(II)

|  | Intrinsic Viscosity (dl/g) | Molecular Weight Distribution Mw/Mn | ΔH (J/g) |
|---|---|---|---|
| Example 16 | 2.41 | 2.85 | 131 |
| Example 17 | 1.98 | 3.23 | 208 |
| Example 18 | 2.80 | 12.1 | 211 |
| Example 19 | 1.77 | 12.1 | 196 |
| Example 20 | 2.41 | 2.84 | 131 |
| Example 21 | 1.44 | 3.24 | 178 |
| Comp. Ex. 5 | 2.92 | 2.33 | 189 |

Evaluation 1 of polymer

The melt viscosity [η] and the shear rate ω dependence of the polyethylene obtained in Example 16 were obtained in the following manner, whereby non-Newtonian properties were evaluated.

Figure 8:
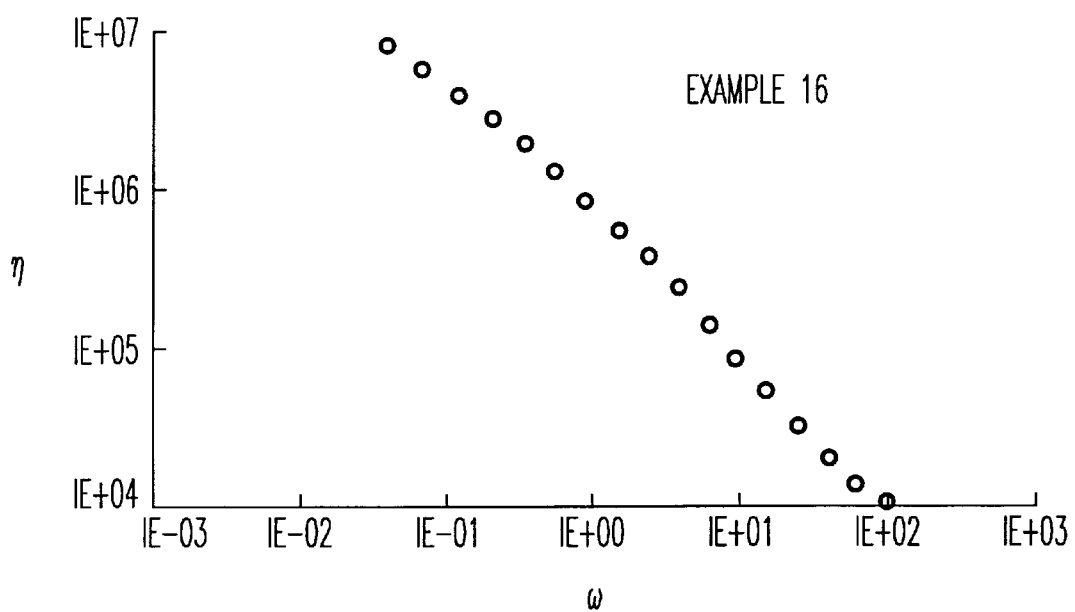
FIG. 8 is a graph showing the shear rate dependence of the melt viscosity of the polyethylene obtained in Example 16.

As a device, an RMS E-605 model made by Rheometrics Co., Ltd. was employed, and sinusoidal vibration was given at 190° C. in a strain quantity of 10% to measure dynamic viscoelastic properties. The results are shown in FIG. 8.

Evaluation 2 of polymer

The viscosities of the polyethylenes of Examples 16 to 21 and Comparative Example 5 were measured in a dilute solution state, and a Huggins coefficient k was then calculated in accordance with the viscosity equation $$\eta_{sp}/c=[\eta]+k[\eta]^2c.$$

Reduced viscosities $\eta_{sp}/c$ were measured changing the polymer concentration C in a decalin solvent at 135° C. at 5 or more points in a range in which a linear relation was recognized. A linear coefficient of correlation was 0.995 or more. Here, [η] is a intrinsic viscosity. The results are shown in Table 14.

TABLE 14

|  | k |
|---|---|
| Example 16 | 0.515 |
| Example 17 | 0.726 |
| Example 18 | 0.524 |
| Example 19 | 0.619 |
| Example 20 | 0.514 |
| Example 21 | 0.456 |
| Comp. Ex. 5 | 0.340 |

Evaluation 1 of catalyst

The ethylene polymerization properties of the titanium catalyst of Example 16 and titanocene dichloride of Example 17 were evaluated by carrying out polymerization under the undermentioned conditions, and then determining terminal vinyl groups.

Titanium catalyst of Example 16

The same procedure as in Example 16-(3) was repeated except that (tertiary butylamido)dimethyl(tetramethyl-$\eta^5$-cyclopentadienyl)silanetitanium dichloride was not used, thereby preparing a polyethylene.

Titanocene dichloride of Example 17

The same procedure as in Example 17 was repeated except that (tertiary butylamido)dimethyl(tetramethyl-$\eta^5$-cyclopentadienyl)silanetitanium dichloride was not used, thereby preparing a polyethylene.

(Measurement of terminal vinyl groups)

A pressed sheet having a thickness of 100 μm was formed, and a transmitted infrared absorption spectrum was measured. The number n of terminal vinyl groups was calculated on the basis of an absorbance ($A_{907}$) based on the terminal vinyl groups in the vicinity of 907 cm$^{-1}$, a film thickness (t) and a resin density (d) in accordance with the equation $$n=0.114A_{907}/[d \cdot T]$$

wherein d=g/ml, T=mm, and n=the number of the vinyl groups with respect to 100 carbon atoms.

As a result, the number of terminal vinyl groups was 4.5 groups/1,000 carbon atoms in the case of the titanium catalyst of Example 16, and 0.04 group/1,000 carbon atoms in the case of the titanocene dichloride of Example 17.

Evaluation 2 of catalyst (Evaluation of Copolymerization Properties)

Figure 9:
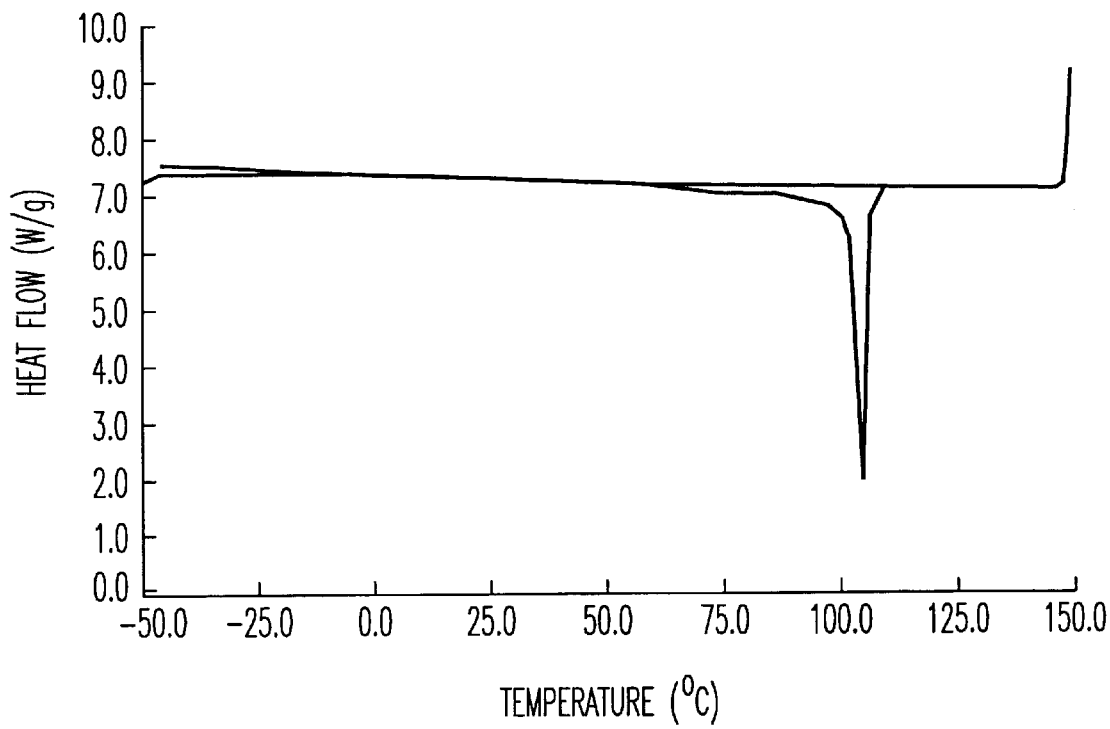
FIG. 9 is a graph showing the measured results (ΔH) of temperature drop by a differential scanning calorimeter obtained in No. 3 of Catalyst Evaluation 2.
Figure 10:
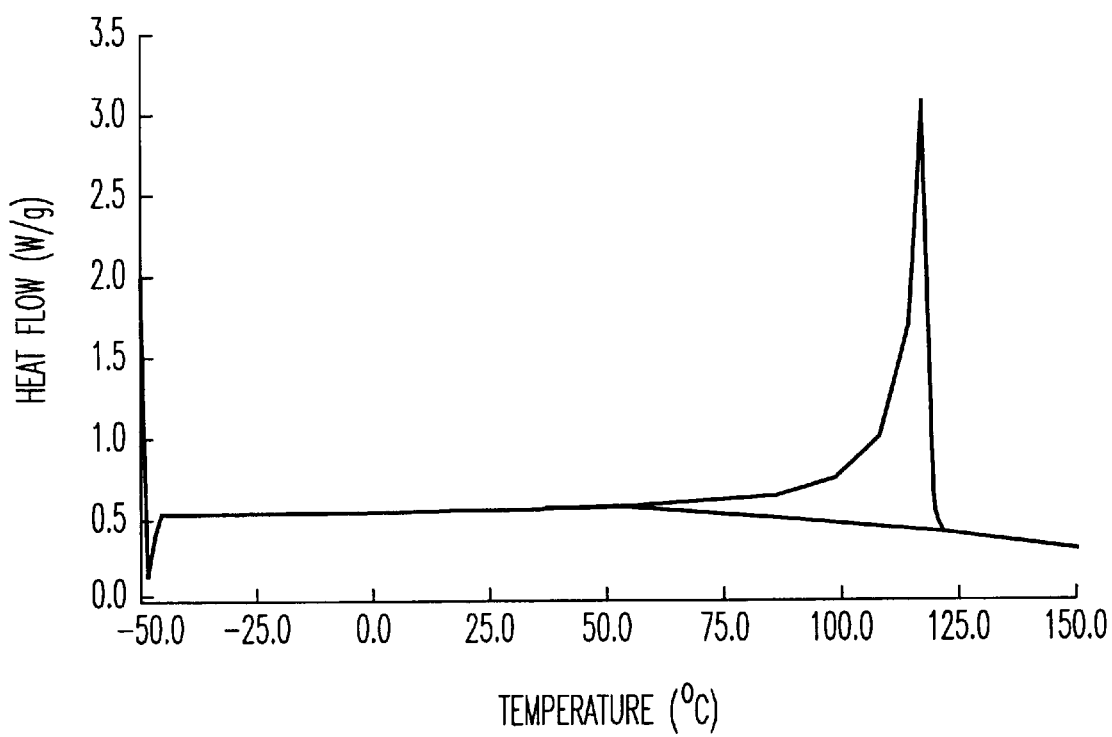
FIG. 10 is a graph showing the measured results (Tm) of temperature rerise by the differential scanning calorimeter obtained in No. 3 of Catalyst Evaluation 2.

The copolymerization of ethylene and 1-octene was carried out in the presence of (tertiary butylamido)dimethyl (tetramethyl-$\eta^5$-cyclopentadienyl)silanetitanium dichloride (I) used in Example 16 and ethylenebisindenylzirconium dichloride (II) used in Example 21 under conditions shown in Table 15, and the crystallization enthalpy (ΔH) and the melting point (Tm) of the resultant copolymer were then measured. The measured results of the copolymer obtained in No. 3 by the use of a differential scanning calorimeter at a time when it was cooled are in FIG. 9, and the measured results at a time when it was heated are shown in FIG. 10.

TABLE 15

|  | No. 1 | No. 2 | No. 3 |
|---|---|---|---|
|  | (I) | | |
| Toluene (ml) | 400 | 400 | 400 |
| TIBA[4] (mmol) | 0.5 | 0.5 | 0.5 |
| MAO (mmol) | 10 | 10 | 10 |
| Metallic | (I) | (I) | (II) |
| Compound (μmol) | 2 | 2 | 0.2 |
| Temperature (° C.) | 70 | 80 | 70 |
| Monomer Charge | | | |
| Ratio[3] [M] | 0.231 | 0.248 | 0.231 |
| Time (min) | 10 | 10 | 10 |
|  | (II) | | |
| Yield (g) | 16.5 | 19.2 | 29.3 |
| TM[4] (° C.) | 93.6 | 90.4 | 116.5 |
| ΔH[5] (J/g) | 75 | 61 | 130 |
| ΔH · Tm | 7020 | 5514 | 15145 |
| ΔH · Tm calculated in accordance with a general equation[6] | 17492 | 17107 | 17492 |

[1] TIBA: Triisobutylaluminum.
[2] MAO: Methylaluminoxane prepared in Example 16-(1).
[3] This was calculated on the basis of the weight of ethylene dissolved at polymerization temperature in a mixed solvent prepared from 400 ml of toluene and 7.15 g of 1-octene at 25° C.
[4] Tm: Melting point, which was measured in the same manner as in Example 16-(4).
[5] (ΔH): Crystallization enthalpy, which was measured in the same manner as in Example 16-(4).
[6] ΔH · Tm: This was calculated in accordance with 27,000–21,600 [M]$^{0.56}$.

The copolymerization was accomplished in accordance with Example 16-(3), but the metallic compounds (I) and (II) were added after ethylene was dissolved to a saturation state at the polymerization temperature, whereby the polymerization was started.

Concretely, evaluation was made by the use of the following device and method.

That is to say, as a polymerization reactor, there was used a pressure-resistant stainless steel autoclave having a volume of 1.76 liters and an inner diameter of 114 mm. This autoclave was equipped with an anchor blade (thickness=1.5 mm) as a stirrer, and a space between the end of the blade and the inner wall of the reactor was 17 mm at the closest position. In addition, the area of one surface of the blade was about 13 cm². The blade, when used, was fixed in such a state that 70% or more of the blade area might be immersed in a solvent.

As the procedure of the evaluation, the above-mentioned autoclave was sufficiently dried, and 400 ml (volume at 25° C.) of dry toluene (moisture content=5 ppm or less) was thrown into the autoclave at room temperature under a nitrogen atmosphere and a predetermined amount by weight of 1-octene (water content=5 ppm or less) was further thrown. In addition, as a catalytic component, an organic metal compound (e.g., aluminoxane, an alkylaluminum or the like) was thrown thereinto. Afterward, the solution was stirred at room temperature for 3 minutes. Next, the solution was heated up to polymerization temperature in a sealing state, and after pressure had reached a constant level, ethylene was introduced into the autoclave. Then, the feed of ethylene was stopped, and a saturation state was confirmed by a fact that any pressure did not drop. At this time, a stirring velocity was constantly 500 rpm. While this condition was maintained, other catalytic components were added thereto, thereby initiating copolymerization.

After the initiation of the copolymerization, it was necessary that the flow rate of ethylene should be controlled to 3 normal l/min. or less under a predetermined pressure and the temperature should be within ±2° C. of a predetermined polymerization temperature.

If such a control is not accomplished, it is required that the amount of the catalyst is changed so as to make the evaluation again.

After the copolymerization had been carried out for a certain time, the feed of ethylene was stopped, and the pressure was immediately released to remove unreacted ethylene. Afterward, deactivation was done with methanol.

In this case, the total amount of the solvent in the catalytic components was adjusted so as to be 1% or less based on the total volume of toluene and 1-octene which were the polymerization solvents.

EXAMPLE 22

A resin composition comprising 80 parts by weight of an ethylene-1-butene copolymer (density=0.922 g/cm³) and 20 parts by weight of the polyethylene (density=0.887 g/cm³) obtained in Example 1 was molded at a blow ratio of 2.7 by inflation molding to form a film.

The moldability of the film was good.

Possibility of Industrial Utilization

A polyethylene of the present invention is derived from an ethylene monomer alone and does not contain any quaternary carbon in the main chain of the polymer, and it is different from a usual HDPE, L-LDPE and LDPE. The polyethylene is characterized in that the activation energy of melt flow can be controlled, working properties are excellent, and physical properties such as density, melting point and crystallinity can be controlled mainly in the state of a homopolymer. Furthermore, the polyethylene subjected to a hydrogenation treatment not only has the above-mentioned characteristics but also is excellent in thermal stability.

Furthermore, according to a process for preparing the polyethylene of the present invention, the polyethylene can efficiently be prepared in which the activation energy of melt flow and the relation between a Huggins coefficient and an intrinsic viscosity can be controlled and non-Newtonian properties are improved and working properties are excellent.

We claim:

1. A polyethylene derived from an ethylene monomer in which (1) a quaternary carbon atom is not present in a polymeric main chain; (2) the activation energy (Ea) of the melt flow is in the range of 8–20 kcal/mol.; (3) a Huggins coefficient (k) and an intrinsic viscosity (η) which are decided by the relation between a polymer concentration and a reduced viscosity measured at a temperature of 135 °C. in a decalin solvent meet the relationship of the equation:

$$k \geq 0.2 + 0.0743 \times (\eta);$$

and (4) in the measurement of a loss elastic modulus, a β-relaxation peak is present in the range of 0 to −100° C.

2. The polyethylene according to claim 1, wherein a density (D) is in the range of 0.86 to 0.95 g/cm$^3$, and a crystallization enthalpy (ΔH) and a melting point (Tm) measured by a differential scanning calorimeter (DSC) meet the equation $$0 \leq \Delta H \leq 250$$

and the equation $$0.02 \times \Delta H + 116 \leq Tm \leq 0.02 \times \Delta H + 126$$

and in the measurement of a loss elastic modulus, a β-relaxation peak is present in the range of 0 to −100° C.

3. A polyethylene which is derived from an ethylene monomer and in which (1) a quaternary carbon atom is not present in a polymeric main chain; (2) the activation energy (Ea) of the melt flow is in the range of 8–20 kcal/mol.; and (3) the molar ratio of a methyl group in a region of 0.8–1.0 ppm to a methylene group in a region of 1.2–1.4 ppm observed by a proton nuclear magnetic resonance spectrum method ($^1$H-NMR) is in the range of 0.005–0.1, and a melting point (Tm) and the molar ratio observed by a differential scanning calorimeter (DSC) meet the equation:

$$Tm \geq 131 - 1340.$$

4. A polyethylene which is derived from an ethylene monomer and in which (1) a quaternary carbon atom is not present in a polymeric main chain; (2) the activation energy (Ea) of melt flow is in the range of 8–20 kcal/mol.; and (3) the relation between a weight-average molecular weight (Mw) in terms of the polyethylene measured by a gel permeation chromatography method and a die swell ratio (DR) meet the equation:

$$DR > 0.5 + 0.125 \times \log Mw.$$

5. A polyethylene which is derived from an ethylene monomer and in which (1) any quaternary carbon atom is not present in a polymeric main chain; (2) the activation energy (Ea) of melt flow is in the range of 8–20 kcal/mol.; and (3) in the measurement of a loss elastic modulus, a β-relaxation peak is present in the range of 0 to −100° C.

6. The polyethylene according to claim 1, wherein a weight-average molecular weight (Mw) in terms of the polyethylene measured by a gel permeation chromatography method is in the range of 5,000 to 2,000,000.

7. The polyethylene according to claim 1, wherein a ratio Mw/Mn of a weight-average molecular weight (Mw) and a number-average molecular weight (Mn) in terms of the polyethylene measured by the gel permeation chromatography method is in the range of 1.5 to 70.

8. The polyethylene according to claim 1, wherein a resin density (D) is in a range of 0.85 to 0.96 g/cm$^3$.

9. The polyethylene according to claim 1, which has been subjected to a hydrogenation treatment.

10. A thermoplastic resin composition which comprises the polyethylene described in claim 1 and a thermoplastic resin other than said polyethylene, wherein said thermoplastic resin composition comprises 2–500 parts by weight of said thermoplastic resin other than said polyethylene based on 100 parts by weight of said polyethylene.

11. The polyethylene according to claim 2, wherein a weight-average molecular weight (Mw) in terms of the polyethylene measured by a gel permeation chromatography method is in the range of 5,000 to 2,000,000.

12. The polyethylene according to claim 3, wherein a weight-average molecular weight (Mw) in terms of the polyethylene measured by a gel permeation chromatography method is in the range of 5,000 to 2,000,000.

13. The polyethylene according to claim 4, wherein a weight-average molecular weight (Mw) in terms of the polyethylene measured by a gel permeation chromatography method is in the range of 5,000 to 2,000,000.

14. The polyethylene according to claim 5, wherein a weight-average molecular weight (Mw) in terms of the polyethylene measured by a gel permeation chromatography method is in the range of 5,000 to 2,000,000.

15. A process for preparing a polyethylene by homopolymerizing ethylene in the presence of a transition metal compound (a), a transition metal compound (b) and a compound (c) simultaneously, said transition metal compound (a) satisfying the equation:

$$0 \leq \Delta H \cdot Tm \leq 27000 - 21600[M]^{0.56}$$

wherein [M] is a monomer charge ratio of 1-octene/(ethylene+1-octene), (ΔH) is the crystallization enthalpy and (Tm) is the melting point each of an ethylene/1-octene copolymer, when ethylene and 1-octene are copolymerized in the presence of the transition metal compound (a) in a medium which, based on 400 ml of toluene, contains 0.5 mmol. of triisobutylaluminum, 10 mmol. of methylaluminoxane, 2 μmol. or 0.2 μmol. of the transition metal compound (a) at 70° C. or 80° C. for 10 minutes, and being characterized by having the following formula:

  (I)

  (III)

(VI)

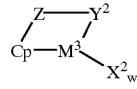

or (XIII)

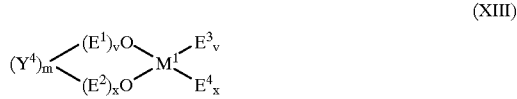

wherein M$^1$ represents titanium, zirconium, hafnium, vanadium, niobium or chromium, M$^3$ represents titanium, zirconium or hafnium; and Cp represents a cyclopentadienyl group, a substituted cyclopentadienyl group, an indenyl group, a substituted indenyl group, a tetrahydroindenyl group, a substituted tetrahydroindenyl group, a fluorenyl group or a substituted fluorenyl group; a part of the carbon atoms in the cyclopentadienyl group may be substituted by a hetero-atom; R$^1$, R$^2$ and R$^3$ each independently represents a σ-bond ligand or a chelate ligand, and the σ-bond ligand is selected from the group consisting of a hydrogen atom, a halogen atom, an alkyl group having 1 to 20 carbon atoms, an alkoxy group having 1 to 20 carbon atoms, an aryl group, an alkylaryl group or an arylalkyl group each having 6 to 20 carbon atoms, an acyloxy group having 1 to 20 carbon atoms, an allyl group, a substituted allyl group, and a substituent containing a silicon atom; the chelate ligand is selected from the group consisting of an acetylacetonato group and a substituted acetylacetonato group; A represents a cross-linkage by a covalent bond; a, b and c each is independently 0 or an integer of 1 to 4, wherein a+b+c=3 in formula (I) and a+b=2 in formula (III), and e is 0 or an integer of 1 to 6; two or more of $R^1$, $R^2$ and $R^3$ may bond to each other to form a ring; in formula (II) and (III), the two Cps may be the same or different from each other; $X^2$ represents hydrogen, halogen, $C_{1-20}$-alkyl, aryl, $C_6$–$C_{20}$-alkylaryl, $C_6$–$C_{20}$-arylalkyl or $C_{1-20}$-alkoxy; Z is $SiR^7{}_2$, $CR^7{}_2$, $SiR^7SiR^7{}_2$, $CR^7{}_2CR^7{}_2$, $CR^7{}_2CR^7{}_2CR^7{}_2$, $CR^7{=}CR^7$, $CR^7{}_2SiR^7{}_2$ or $GeR^7{}_2$, wherein $R^7$ is hydrogen, alkyl having 20 or less non-hydrogen atoms, aryl, silyl, halogenated silyl, halogenated aryl or a combination thereof; and $Y^2$ is —N($R^8$)—, —O—, —S— or —P($R^8$)—, wherein $R^8$ is $C_{1-10}$-alkyl, $C_{6-10}$-aryl or a condensed ring with one or more $R^7$s such that it has at most 30 non-hydrogen atoms, w=1 or 2; $E^1$ and $E^2$ are each $C_{1-20}$-hydrocarbon and each form a bridging group between $Y^4$ and $M^1$, $E^3$ and $E^4$ are each a σ-bond ligand, a chelate ligand or a Lewis base which are the same or different from each other; $v^1$ and $x^1$ are each 0 or are 1 or 2 with $v^1+x^1$=an integer of the valence of $M^1-2$, and $Y^4$ is a $C_{1-20}$-hydrocarbon group;

said transition metal compound (b) being capable of forming a terminal vinyl group when ethylene is homopolymerized in the presence of the transition metal compound (b) in a medium which, based on 400 ml. of toluene, contains 0.5 mmol. triisobutylaluminum, 10 mmol. of methylaluminoxane, and 0.05 mnuol or 0.01 mmol of the transition metal compound (b) at 70° C. or 80° C. for 30 minutes, and being:

(i) a compound having a —OR group wherein R is an alkyl group, an aryl group, an alkylaryl group, an arylalkyl group, a cycloalkyl group, a halogenated alkyl group or a halogenated aryl group each having 1 to 20 carbon atoms, (ii) $Cp_2M^1R^1{}_aR^2{}_b$ ... (II)

(iii) $(Cp-A_e-Cp)M^1R^1{}_aR^2{}_b$ ... (III)

wherein Cp, A, $M^1$, $R^1$, $R^2$, a, b and e are as defined above; and said compound (c) being capable of forming an ionic complex with the transition metal compound (a) or (b) or their derivative.

16. The process for preparing a polyethylene according to claim 15, wherein the polyethylene is such that a Huggins coefficient (k) and an intrinsic viscosity (η) measured at a temperature of 135° C. in a decalin solvent meet the relationship of the equation:

$k \geq 0.2 + 0.0743 \times (\eta)$.

17. The process for preparing a polyethylene according to claim 15, wherein the molar ratio of the component (a)/component (b) is in the range of 1/1000 to 1000/1.

18. A process for preparing a polyethylene, which comprises:

homopolymerizing ethylene in the presence of a transition metal compound (b) and a compound (c) simultaneously, thereby obtaining a polymerization system;

adding a transition metal compound (a) to said polymerization system; and continuing the homopolymerization of ethylene;

said transition metal compound (a) satisfying the equation:

$0 \leq \Delta H \cdot Tm \leq 27000 - 21600 [M]^{0.56}$ wherein [M] is a monomer charge ratio of 1-octene/(ethylene+1-octene), (ΔH) is the crystallization enthalpy and (Tm) is the melting point each of an ethylene/1-octene copolymer, when ethylene and 1-octene are copolymerized in the presence of the transition metal compound (a) in a medium which, based on 400 ml of toluene, contains 0.5 mmol. of triisobutylaluminum, 10 mmol. of methylaluminoxane, 2 μmol. or 0.2 μmol. of the transition metal compound (a) at 70° C. or 80° C. for 10 minutes, and being characterized by having the following formula:

  (I)

  (III)

(VI)

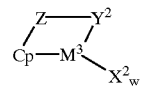

or (XIII)

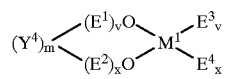

wherein $M^1$ represents titanium, zirconium, hafnium, vanadium, niobium or chromium, $M^3$ represents titanium, zirconium or hafnium; and Cp represents a cyclopentadienyl group, a substituted cyclopentadienyl group, an indenyl group, a substituted indenyl group, a tetrahydroindenyl group, a substituted tetrahydroindenyl group, a fluorenyl group or a substituted fluorenyl group; a part of the carbon atoms in the cyclopentadienyl group may be substituted by a hetero-atom; $R^1$, $R^2$ and $R^3$ each independently represents a σ-bond ligand or a chelate ligand, and the σ-bond ligand is selected from the group consisting of a hydrogen atom, a halogen atom, an alkyl group having 1 to 20 carbon atoms, an alkoxy group having 1 to 20 carbon atoms, an aryl group, an alkylaryl group or an arylalkyl group each having 6 to 20 carbon atoms, an acyloxy group having 1 to 20 carbon atoms, an allyl group, a substituted allyl group, and a substituent containing a silicon atom; the chelate ligand is selected from the group consisting of an acetylacetonato group and a substituted acetylacetonato group; A represents a cross-linkage by a covalent bond; a, b and c each is independently 0 or an integer of 1 to 4, wherein a+b+c=3 in formula (I) and a+b=2 in formula (III), and e is 0 or an integer of 1 to 6; two or more of $R^1$, $R^2$ and $R^3$ may bond to each other to form a ring; in formula (II) and (III), the two Cps may be the same or different from each other; $X^2$ represents hydrogen, halogen, $C_{1-20}$-alkyl, aryl, $C_6$–$C_{20}$-alkylaryl, $C_6$–$C_{20}$-arylalkyl or $C_{1-20}$-alkoxy; Z is $SiR^7{}_2$, $CR^7{}_2$, $SiR^7SiR^7{}_2$, $CR^7{}_2 CR^7{}_2$, $CR^7{}_2 CR^7{}_2 Cr^7{}_2$, $CR^7{=}CR^7$, $CR^7{}_2SiR^7{}_2$ or $GeR^7{}_2$, wherein $R^7$ is hydrogen, alkyl having 20 or less non-hydrogen atoms, aryl, silyl, halogenated silyl, halogenated aryl or a combination thereof; and $Y^2$ is —N($R^8$)—, —O—, —S— or —P($R^8$)—, wherein $R^8$ is $C_{1-10}$-alkyl, $C_{6-10}$-aryl or a condensed ring with one or more $R^7$s such that it has at most 30 non-hydrogen atoms, w=1 or 2; $E^1$ and $E^2$ are each $C_{1-20}$-hydrocarbon and each form a bridging group between $Y^4$ and $M^1$, $E^3$ and $E^4$ are each a σ-bond ligand, a chelate ligand or a Lewis base which are the same or different from each other; $v^1$ and $x^1$ are each 0 or are 1 or 2 with $v^1+x^1$=an integer of the valence of $M^1-2$, and $Y^4$ is a $C_{1-20}$-hydrocarbon group;

said transition metal compound (b) being capable of forming a terminal vinyl group when ethylene is homopolymerized in the presence of the transition metal compound (b) in a medium which, based on 400 ml. of toluene, contains 0.5 mmol. triisobutylaluminum, 10 mmol. of methylaluminoxane, and 0.05 mmol or 0.01 mmol of the transition metal compound (b) at 70° C. or 80° C. for 30 minutes, and being:

(i) a compound having a —OR group wherein R is an alkyl group, an aryl group, an alkylaryl group, an arylalkyl group, a cycloalkyl group, a halogenated alkyl group or a halogenated aryl group each having 1 to 20 carbon atoms, (ii) $Cp_2M^1R^1_aR^2_b$ . . . (II)

(iii) $(Cp—A_e—Cp)M^1R^1_aR^2_b$ . . . (III)

wherein Cp, A, $M^1$, $R^1$, $R^2$, a, b and e are as defined above; and said compound (c) being capable of forming an ionic complex with the transition metal compound (a) or (b) or their derivative.

19. The process for preparing a polyethylene according to claim 18, wherein the molar ratio of the component (a)/component (b) is in the range of 1/1000 to 1000/1.

20. A process for preparing a polyethylene by homopolymerizing ethylene in the presence of a catalyst comprising a transition metal compound (a), a transition metal compound (b) and a compound (c), said transition metal compound (a) satisfying the equation:

$$0 \leq \Delta H \cdot Tm \leq 27000 - 21600[M]^{0.56}$$

wherein [M] is a monomer charge ratio of 1-octene/(ethylene+1-octene), ($\Delta H$) is the crystallization enthalpy and (Tm) is the melting point each of an ethylene/1-octene copolymer, when ethylene and 1-octene are copolymerized in the presence of the transition metal compound (a) in a medium which, based on 400 ml of toluene, contains 0.5 mmol. of triisobutylaluminum, 10 mmol. of methylaluminoxane, 2 μmol. or 0.2 μmol. of the transition metal compound (a) at 70° C. or 80° C. for 10 minutes, and being characterized by having the following formula:

$(Cp—A_e—Cp)M^1R^1_aR^2_b$ (III)

or

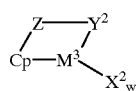 (VI)

wherein Cp in both formulas is a cyclic unsaturated hydrocarbon group or a chain unsaturated hydrocarbon group; A is a bridging group, $M^1$ is titanium, zirconium, hafnium, vanadium, niobium or chromium, $R^1$ and $R^2$ are each independently a σ-bond ligand or a chelating ligand, a and b each independently are zero or an integer of 1 to 4 and e is zero or an integer of 1 to 6; $M^3$ is titanium, zirconium or hafnium, $X^2$ is hydrogen, halogen, $C_{1-20}$ alkyl, aryl, alkylaryl or $C_6-C_{20}$-arylalkyl or $C_{1-20}$-alkoxy, Z is $SiR^7_2$, $CR^7_2$, $SiR^7_2SiR^7_2$, $CR^7_2CR^7_2$, $CR^7_2CR^7_2CR^7_2$, $CR^7=CR^7$, $CR^7_2SiR^7_2$ or $GeR^7_2$, and $Y^2$ is —N($R^8$)—, —O—, —S— or —P($R^8$)—, wherein $R^7$ is no more than 20 non-hydrogen atoms, aryl, silyl, halogenated alkyl, halogenated aryl or a combination thereof and $R^8$ is $C_{1-10}$-alkyl or a $C_{6-10}$-aryl group, $R^8$ is a condensed ring of one or more groups $R^7$ and containing 30 or less non-hydrogen atoms and w is one or two;

said transition metal compound (b) being capable of forming a terminal vinyl group when ethylene is homopolymerized in the presence of the transition metal compound (b) in a medium which, based on 400 ml. of toluene, contains 0.5 mmol. triisobutylaluminum, 10 mmol. of methylaluminoxane, and 0.05 mmol or 0.01 mmol of the transition metal compound (b) at 70° C. or 80° C. for 30 minutes, and being:

(i) a compound having a —OR group wherein R is an alkyl group, an aryl group, an alkylaryl group, an arylalkyl group, a cycloalkyl group, a halogenated alkyl group or a halogenated aryl group each having 1 to 20 carbon atoms, (ii) $Cp_2M^1R^1_aR^2_b$ . . . (II)

(iii) $(Cp—A_e—Cp)M^1R^1_aR^2_b$ . . . (III)

wherein Cp, A, $M^1$, $R^1$, $R^2$, a, b and e are as defined above; and said compound (c) being capable of forming an ionic complex with the transition metal compound (a) or (b) or their derivative.

21. A polyethylene derived from an ethylene monomer in which (1) a quaternary carbon atom is not present in a polymeric main chain; (2) the activation energy (Ea) of the melt flow is in the range of 8 to 20 kcal/mol; (3) a Huggins coefficient (k) and an intrinsic viscosity (η) which are decided by the relation between a polymer concentration and a reduced viscosity measured at a temperature of 135° C. in a decalin solvent meet the relationship of the equation $$k \geq 0.2 + 0.0743 \times (\eta);$$

(4) in the measurement of a loss elastic modulus, a β-relaxation peak is present in the range of 0 to −100° C.; and (5) the density (D) is within the range of 0.86 to 0.95 g/cm³, and a crystallization enthalpy ($\Delta H$) and a melting point (Tm) measured by differential scanning calorimetry (DSC) satisfies the equation $$0 \leq \Delta H \leq 250$$

and the equation $$0.02 \times \Delta H + 116 < Tm < 0.02 \times \Delta H + 126.$$

22. A polyethylene which is derived from an ethylene monomer and in which (1) the polymer exhibits no absorption at 8.15 ppm in its $^{13}$C-NMR spectrum; (2) the activation energy (Ea) of the melt flow is in the range of 8–20 kcal/mol.; (3) a Huggins coefficient (k) and an intrinsic viscosity (η) which are decided by the relation between a polymer concentration and a reduced viscosity measured at a temperature of 135 ° C. in a decalin solvent meet the relationship of the equation:

$$k \geq 0.2 + 0.0743 \times (\eta);$$

and (4) in the measurement of a loss elastic modulus, a β-relaxation peak is present in the range of 0 to −100° C.

23. A polyethylene which is derived from an ethylene monomer and in which (1) the polymer exhibits no absorption at 8.15 ppm in the $^{13}$C-NMR spectrum; (2) the activation energy (Ea) of melt flow is in the range of 8–20 kcal/mol.; and (3) the molar ratio of a methyl group in a region of 0.8–1.0 ppm to a methylene group in a region of 1.2–1.4 ppm observed by a proton nuclear magnetic resonance spectrum method ($^1$H-NMR) is in the range of 0.005–0.1, and a melting point (Tm) and the molar ratio observed by a differential scanning calorimeter (DSC) meet the equation:

$$Tm \geq 131 - 1340.$$

24. A polyethylene which is derived from an ethylene monomer and in which (1) the polymer exhibits no absorption at 8.15 ppm in the $^{13}$C-NMR spectrum; (2) the activation energy (Ea) of melt flow is in the range of 8–20 kcal/mol.; and (3) the relation between a weight-average molecular weight (Mw) in terms of the polyethylene measured by a gel permeation chromatography method and a die swell ratio (DR) meet the equation:

$$DR > 0.5 + 0.125 \times \log Mw.$$

25. A polyethylene which is derived from an ethylene monomer and in which (1) the polymer exhibits no absorption at 8.15 ppm in the $^{13}$C-NMR spectrum; (2) the activation energy (Ea) of melt flow is in the range of 8–20 kcal/mol.; and (3) in the measurement of a loss elastic modulus, a β-relaxation peak is present in the range of 0 to −100° C.

* * * * *